(12) United States Patent
Ajiki et al.

(10) Patent No.: US 8,070,337 B2
(45) Date of Patent: *Dec. 6, 2011

(54) VEHICLE LAMP

(75) Inventors: Shuichi Ajiki, Tokyo (JP); Koichi Masuyama, Tokyo (JP); Naoya Sone, Tokyo (JP); Sadayuki Konishi, Tokyo (JP); Yasuo Toko, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 346 days.

This patent is subject to a terminal disclaimer.

(21) Appl. No.: 12/329,859

(22) Filed: Dec. 8, 2008

(65) Prior Publication Data

US 2009/0147529 A1 Jun. 11, 2009

(30) Foreign Application Priority Data

Dec. 7, 2007 (JP) ................................. 2007-316885
Mar. 24, 2008 (JP) ................................. 2008-075421
Mar. 27, 2008 (JP) ................................. 2008-083858

(51) Int. Cl.
*F21V 9/00* (2006.01)

(52) U.S. Cl. ........ 362/511; 362/538; 362/521; 362/522; 362/606; 362/620

(58) Field of Classification Search .................. 362/511, 362/536, 538, 600–634, 459–549

See application file for complete search history.

(56) References Cited

U.S. PATENT DOCUMENTS 4,562,519 A 12/1985 Deves
(Continued)

FOREIGN PATENT DOCUMENTS

JP 2001076510 3/2001
(Continued)

*Primary Examiner* — Jong-Suk (James) Lee
*Assistant Examiner* — Stanley Weinberg
(74) *Attorney, Agent, or Firm* — Kenealy Vaidya LLP

(57) ABSTRACT

A vehicle lamp can include a light source unit including a light guide plate with a light emission surface, and a point or line light source opposed to one end face of the light guide plate. The light guide plate can be made of a transparent plate-like material. A convex projection lens can be configured to focus light emitted from the light source unit and project the light forward in a direction of light illumination. The light guide plate can have a prism array on a rear surface thereof extending with a serrated cross section from the one end face to the opposite end face of the light guide plate, and in a direction parallel with the end face. The prism array can include a plurality of prism surfaces, with each prism surface being obliquely formed so that when light enters the light guide plate from the light source side and impinges thereon, a substantial amount of the light can be totally reflected into small angles of incidence to the emission surface. The projection lens can be disposed such that a focus thereof on a light source unit side is located on the light emission surface of the light guide plate.

35 Claims, 35 Drawing Sheets

U.S. PATENT DOCUMENTS

| | | | |
|---|---|---|---|
| 5,095,477 A * | 3/1992 | Shimozawa | 369/112.26 |
| 6,471,383 B1 * | 10/2002 | Oyama et al. | 362/517 |
| 7,204,627 B2 * | 4/2007 | Ishida | 362/509 |
| 7,244,056 B2 | 7/2007 | Koike | |
| 2004/0114390 A1 * | 6/2004 | Yamamura | 362/538 |
| 2006/0044825 A1 | 3/2006 | Sa | |
| 2006/0087861 A1 * | 4/2006 | Tessnow et al. | 362/538 |
| 2007/0223247 A1 * | 9/2007 | Lee et al. | 362/606 |
| 2008/0014995 A1 * | 1/2008 | Noba | 455/566 |
| 2008/0024737 A1 * | 1/2008 | Iwasaki | 353/98 |

FOREIGN PATENT DOCUMENTS

| | | |
|---|---|---|
| JP | 2006509343 | 3/2006 |
| JP | 2008226542 | 9/2008 |

* cited by examiner

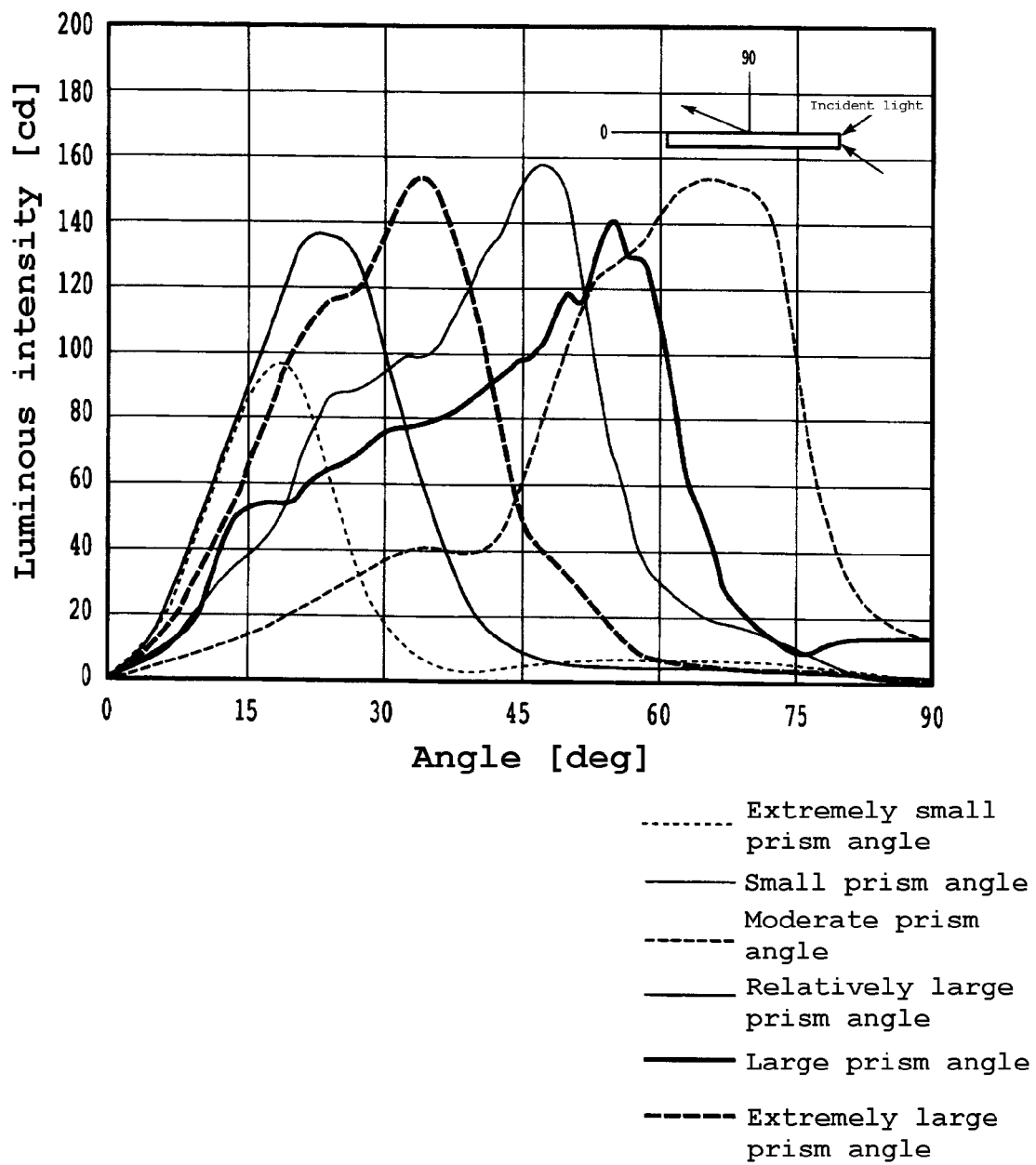

VEHICLE LAMP

This application claims the priority benefit under 35 U.S.C. §119 of Japanese Patent Application Nos. 2007-316885 filed on Dec. 7, 2007, 2008-075421 filed on Mar. 24, 2008, and 2008-083858 filed on Mar. 27, 2008 which are hereby incorporated in their entirety by reference.

BACKGROUND

1. Technical Field

The presently disclosed subject matter relates to a vehicle lamp such as a headlamp, an auxiliary light, a fog lamp, or other light which is composed of a light source unit using a plurality of point or line light sources and possibly a convex lens. Also, the presently disclosed subject matter relates to a vehicle headlamp which has a daytime running light function.

2. Description of the Related Art

Vehicle lamps using a light guide plate have been known heretofore. Examples thereof include a vehicle lamp or a headlamp as disclosed in Japanese Translation of PCT Patent Application No. 2006-509343 (corresponding to WO 2004/052682 or US 2006044825A1), and a common projector type headlamp as disclosed in Japanese Patent Application Laid-Open No. 2001-076510.

FIG. 1 shows the configuration of the vehicle lamp as disclosed in Japanese Translation of PCT Patent Application No. 2006-509343.

In FIG. 1, the vehicle lamp 1 can include a housing 2, a light-transmitting cover member 3, a light guide plate 4, a light source 5, and a reflection plate 4d (see also FIG. 2). The housing 2 has an opening 2a configured to emit light therethrough. The light-transmitting cover member 3 has a light incident surface 3a and a light emission surface 3b, and is fixed to the housing 2 so as to enclose the opening 2a of the housing 2. The light guide plate 4 is formed in a plate-like shape and is disposed inside the housing 2. With reference to FIG. 2, the light guide plate 4 has a light incident surface 4a configured to let light in, formed on a lateral side, and a light emission surface 4b formed on the front side facing toward the cover member 3. The light guide plate 4 is also provided with a scatter pattern 4c configured to scatter the light incident on the light incident surface 4a toward the light emission surface 4b. The light source 5 is arranged next to the light incident surface 4a of the light guide plate 4, and emits light toward the light incident surface 4a. The reflection plate 4d is arranged on the rear surface of the light guide plate 4, and can reflect light toward the front side of the light guide plate 4.

The light incident surface 3a and/or the light emission surface 3b of the cover member 3 can have lens patterns 3c configured to impart a certain pattern to emission light.

In this vehicle lamp 1, as shown in FIG. 2, the light emitted from the light source 5 can enter the light guide plate 4 through the lateral side (light incident surface) 4a. Traveling through the interior of the light guide plate 4 with total reflections, the light is scattered by the scatter pattern 4c formed on the rear surface of the light guide plate 4, and is projected from the front side (light emission surface) 4b of the light guide plate 4.

The light emitted in front of the light guide plate 4 illuminates the front area in a desired pattern through the cover member 3 which has the lens patterns 3c.

The light source 5 can include a plurality of light emitting diodes (LEDs). A lens or other member can be arranged in front of this light source 5 in order to provide a desired light distribution characteristic.

FIG. 3 shows the configuration of the common projector type headlamp as disclosed in Japanese Patent Application Laid-Open No. 2001-076510. The headlamp 6 can include a light bulb 7 serving as a light source, a reflector 8, a projection lens 9, and a shielding member 9a.

The reflector 8 can include an elliptic reflection surface having a first focus (rear side focus) where the bulb 7 is disposed and a major axis horizontally extending forward in the direction of light illumination. The inner surface thereof can serve as the reflection surface.

The projection lens 9 includes a convex lens, such as an aspheric lens, having a light-source side focus (rear side focus) at or near which the shielding member 9a is disposed.

The shielding member 9a is configured to impart a light distribution pattern for forming a low beam pattern of light emitted forward in the direction of light illumination. The shielding member 9a can include an upper edge with a predetermined shape configured to form a cutoff line in the light distribution pattern.

In the headlamp 6 configured as described above, light emitted from the bulb 7 can form a high luminous image (a high brightness image or a collected light image) having an inverted light distribution pattern (horizontally and vertically inverted) near the focus 9b of the projection lens 9 directly or after being reflected by the reflector 8. This high luminous image can be projected forward in the direction of light illumination while reversed by the projection lens 9.

In this case, part of the high luminous image can be shielded by the shielding member 9a so that a cutoff line C can be formed by the upper edge of the shielding member 9a (see FIG. 4). Then, the high luminous image can be projected forward as a low beam It should be noted that the light distribution pattern shown in FIG. 4 for a right-side traveling vehicle has the cutoff line C for illuminating light also the area on the right-upper side.

In this case, the reflector 8 has a deformed elliptic cross section in order for light emitted from the bulb 7 to enter the projection lens 9 as much as possible. The bulb 7 is disposed near the one focus of the ellipse and the light incident surface of the projection lens 9 is disposed near the other focus of the ellipse. Accordingly, by properly designing the shape of the reflector 8, various light distribution patterns can be formed in accordance with the intended applications.

In the vehicle lamp 1 as disclosed in Japanese Translation of PCT Patent Application No. 2006-509343, light is scattered with the scatter pattern 4c before taken out of the light guide plate 4. Accordingly, the illuminated light can have a proper directional characteristic near the complete scattered light. The lens pattern 3c as used herein, thus, might not provide a suitable light distribution pattern having a desired luminous intensity as a vehicle light such as a headlamp and a vehicle auxiliary lamp such as a fog lamp, or having a bright-dark boundary.

Furthermore, a light distribution pattern can be formed by a plurality of separate lens patterns 3c. This can complicate the optical configuration of each individual lens pattern 3c. For example, some lens patterns are irradiated with the scattered light of the light guide plate 4 from peripheral areas other than the focal position. This can make it difficult to produce a given distribution pattern or cutoff line forward through the lens patterns 3c.

The projector type headlamp as disclosed in Japanese Patent Application Laid-Open No. 2001-076510 uses the reflector 8 as in the previous case. This kind of reflector 8 can form a light distribution pattern near the focus 9b of the projection lens 9, which is then projected onto a road by the projection lens 9. Accordingly, in some cases the headlamp 6 can include the shielding member 9a inside the lamp. This can enlarge the headlamp 6 as a whole, resulting in increased weight and enlarged depth.

Furthermore, the reflector 8 used in this type of headlamp 6 should be designed in accordance with a desired shape of the light emitting portion of a bulb 7. This can increase the time required for designing such a reflector.

SUMMARY

The presently disclosed subject matter was devised in view of these and other problems, characteristics, and features, and in association with the conventional art. According to an aspect of the presently disclosed subject matter, a vehicle lamp can create a desired distribution pattern easily with a simple configuration while having a thin body and light weight.

According to another aspect of the presently disclosed subject matter, a vehicle lamp can include a light source unit including a light guide plate with a light emission surface on its surface, and a point or line light source opposed to one end face of the light guide plate. The light guide plate can be made of a plate-like material transparent in the visible light region. A convex projection lens can be configured to focus light emitted from the light source unit and to project the light forward in the direction of light illumination. In this configuration, the light guide plate can have a prism array on its rear surface extending with a serrated cross section from the one end face of the light guide plate to the opposite end face, and in a direction parallel with the end face (or in a corrugate configuration laterally). The prism array can include a plurality of prism surfaces, with each prism surface being obliquely formed so that when light enters the light guide plate from the light source side and impinges thereon, the light is totally reflected into small angles of incidence to the emission surface. Furthermore, on the rear surface of the light guide plate, a reflection sheet may be provided to reflect light that may not be totally reflected by the prism surfaces but is, instead refracted by or transmitted through the prism surface, so that the light is reflected back into the light guide plate. The projection lens can be disposed such that a focus thereof on the side of the light source unit can be located on or near the light emission surface of the light guide plate of the light source unit.

In a vehicle lamp according to the presently disclosed subject matter, the projection lens can include, at least in part, a cylindrical lens having an axis extending in a lateral direction.

In a vehicle lamp according to the presently disclosed subject matter, the projection lens can include convex lenses at both ends and a cylindrical lens therebetween.

In a vehicle lamp according to the presently disclosed subject matter, the projection lens can include convex portions protruding laterally outward at both ends and a cylindrical lens therebetween.

In a vehicle lamp according to the presently disclosed subject matter, each prism surface of the prism array and the light emission surface of the light guide plate can form an angle of 0 degrees to 45 degrees.

In a vehicle lamp according to the presently disclosed subject matter, the light emission surface of the light guide plate can be formed of a shape corresponding to a desired cutoff pattern for a headlamp.

In a vehicle lamp according to the presently disclosed subject matter, the end face on the light source side of the light guide plate can be disposed on the cutoff pattern side for a headlamp.

A vehicle lamp according to the presently disclosed subject matter can include a light guide part formed in the area adjoining to the edge of the light guide plate on the light source side, such as on the surface and rear surface of the light guide plate, the light guide part can be configured to reflect light from the light guide plate.

A vehicle headlamp according to the presently disclosed subject matter can include a reflection sheet configured to reflect light from the surface of the light guide plate back into the light guide plate, having a shape corresponding to a desired cutoff pattern for a headlamp, which can be formed in the area adjoining to the edge of the light guide plate on the light source side, such as on the surface of the light guide plate.

In a vehicle lamp according to the presently disclosed subject matter, the light guide plate can be formed to correct the spherical aberration of the projection lens.

In a vehicle lamp according to the presently disclosed subject matter, the light guide plate can be curved to correct the spherical aberration of the projection lens.

A vehicle lamp according to the presently disclosed subject matter can include an optical sheet configured so that the direction of the maximum luminous intensity of the light emitted from the light guide plate coincides with the direction of the optical axis of the projection lens, with the optical sheet being disposed near the light emission surface of the light guide plate.

In a vehicle lamp according to the presently disclosed subject matter, the light guide plate can be disposed obliquely with respect to an optical axis of the projection lens by a predetermined angle in order to maximize the light entering the projection lens.

In a vehicle lamp according to the presently disclosed subject matter, the projection lens can have two or more optical axes parallel with each other and can be formed of a solid of revolution around the associated optical axis serving as a center axis.

In a vehicle lamp according to the presently disclosed subject matter, the light source unit can have a plurality of light sources, and at least part of the light sources can be disposed on the associated optical axes of the projection lens.

In a vehicle lamp according to the presently disclosed subject matter, the light guide plate can include a plurality of light guide plate parts divided by the respective optical axes of the projection lens. In this case, the respective light guide plate parts can be formed in the form of a trapezoid having a wider side on the light emission side than on the light source side.

In a vehicle lamp according to the presently disclosed subject matter, lateral sides of each light guide plate part can have a substantial parabolic or elliptic shape.

According to still another aspect of the presently disclosed subject matter, a vehicle lamp can include: a light source unit including a light guide plate with a light emission surface on its surface, a point or line light source opposed to one end face of the light guide plate, and a brightness control element arranged on the surface and/or rear surface of the light guide plate, the light guide plate can be made of a plate- or wedge-like material transparent in the visible light region; a convex projection lens can be configured to focus light emitted from the light emission surface of the light guide plate and to project the same forward in the light illumination direction; and at least one additional light source disposed between the light source unit and the projection lens, or below the light source unit. Light from the foregoing additional light source can be reflected at the light source unit and projected forward in the direction of light illumination through the projection lens, thereby forming a second light distribution pattern different from a predetermined light distribution pattern.

In a vehicle lamp according to the presently disclosed subject matter, the light from the additional light source can form a day-time running light (DRL) distribution pattern on the projection-lens-side surface of the light source unit.

In a vehicle lamp according to the presently disclosed subject matter, the light source unit can be disposed obliquely with respect to an optical axis of the projection lens so that the direction of a maximum luminous intensity of the light emitted from the light guide plate can coincide with the direction of the optical axis of the projection lens.

In a vehicle lamp according to the presently disclosed subject matter, the projection lens can include, at least in part, a cylindrical lens having an axis extending in a lateral direction.

In a vehicle lamp according to the presently disclosed subject matter, the projection lens can include convex lenses at both ends and a cylindrical lens therebetween, the cylindrical lens can have an axis extending in a lateral direction, and the additional light source can be disposed on a plane perpendicular to the axis of the cylindrical lens, the plane can pass through a border between the cylindrical lens and either one of the convex lenses.

In a vehicle lamp according to the presently disclosed subject matter, the light emission surface of the light guide plate can have a shape corresponding to a cutoff pattern.

A vehicle lamp according to the presently disclosed subject matter can include: a light guide part configured to reduce brightness variations of light from the light source, the light guide part being formed in an area adjoining to edges of the light guide plate on the light source side, such as on the surface and rear surface of the light guide plate; and a reflection sheet or light shielding sheet can be configured to reflect light from the surface of the light guide plate back into the light guide plate, the sheet can have a shape corresponding to a cutoff pattern and can be formed on the surface of the light guide plate in the area adjoining to the edge on the light source side. In this vehicle headlamp, the reflection sheet or light shielding sheet, or a casing for retaining the same, can have a reflecting surface on the projection lens side, the reflecting surface configured to reflect the light from the additional light source toward the projection lens.

Another vehicle lamp according to the presently disclosed subject matter can include: a light guide part configured to reduce brightness variations of light from the light source, the light guide part being formed in an area adjoining to edges of the light guide plate on the light source side, such as on the surface and rear surface thereof; and a reflection sheet or light shielding sheet configured to reflect light from the surface of the light guide plate back into the light guide plate, the sheet having a shape corresponding to a cutoff pattern and being disposed on the edge of the surface of the light guide plate on the light source side. In this vehicle lamp, the reflection sheet or light shielding sheet is configured so as to be retractable from the surface of the light guide plate.

In a vehicle lamp according to the presently disclosed subject matter, the light guide plate can be formed with a curve corresponding to an aberration of the projection lens.

Another vehicle lamp according to the presently disclosed subject matter can project a high luminance pattern or a high brightness pattern formed on the light emission surface of the surface light source unit by the projection lens in front of the vehicle.

Such a high luminance pattern or a high brightness pattern can be formed on the light emission surface by the following process.

That is, the light emitted from the light source can enter the light guide plate through the one end face, and then, can enter the light emission surface or rear surface of the light guide plate. The light having entered the light emission surface can be refracted and emitted toward the projection lens, or to be totally reflected, in accordance with the angle of incidence to the emission surface. The totally reflected light can reach the rear surface of the light guide plate. On the rear surface thereof, there is formed the prism array. Accordingly, the light having reached the rear surface can be totally reflected or refracted in accordance with the angle of incidence to the prism surface. When totally reflected by the prism surface, the light can be directed such that the angle of incidence to the emission surface becomes small.

In this case, the angle of incidence can be determined by the angle of the prism surface. Accordingly, by adjusting the angle of the prism surface, the angle of incidence to the emission surface can be set to an angle smaller than a critical angle even when the light is totally reflected by the rear surface one time, or the light can be projected by a plurality of reflections. Adjusting the angle of prism surface can control the intensity distribution of light from the emission surface so that a desired high luminous pattern can be formed on the light emission surface.

When the angle of the prism surface to the light emission surface is set to 45 degrees or smaller, almost all of the light can be totally reflected. In addition to this, even the light having been refracted (transmitted) by (through) the prism surface can be reflected by the reflection sheet, and accordingly, the reflected light can enter the rear surface of the light guide plate back into the light guide plate. This can suppress the light loss.

This can eliminate the need for a reflecting mirror 8, thereby reducing the entire size of the lamp while providing lower cost associated with manufacture of the lamp.

If the projection lens includes a cylindrical lens having an axis extending in a lateral direction, it might lack light-gathering capability with respect to the lateral direction. The projection lens, however, can be arranged laterally across a sufficiently wide area with respect to the light source unit. This can improve the incident efficiency from the light source unit, thereby forming a light distribution pattern of higher brightness.

The light transmitted through the projection lens is somewhat diffused to the right and left by the effect of the cylindrical lens. This can produce a horizontally wide distribution pattern, which can reduce brightness variations between light sources if the light sources are point sources laterally spaced from one another.

The projection lens can include convex lenses at both ends and a cylindrical lens therebetween. The light to be diffused and entering the light guide plate obliquely toward the outside, can be refracted or reflected by the convex portions and converged at the forward center area in the direction of light illumination, thereby forming a spot light beam.

This can increase the luminous intensity near the center of the light distribution pattern.

When the angle between each prism surface of the prism array and the surface of the light guide plate is set within the range of from 0 degrees to 45 degrees, the vertical range of emission light can be equal to an opening angle of approximately 70 degrees, i.e., the range between the light guide plate and the projection lens.

Accordingly, the light emitted from the light guide plate can reliably enter the projection lens to improve the incident efficiency from the projection lens, thereby forming a light distribution pattern of higher brightness.

The light emission surface of the light guide plate can have a shape corresponding to the desired cutoff pattern. In this case, the light source unit can form a cutoff pattern with ease. This can eliminate the need for a light shielding member configured to form such a cutoff pattern, thereby configuring the vehicle lamp with a simplified structure and lower costs.

When the end face on the light source side of the light guide plate is disposed on the cutoff pattern side, the bright-dark boundary of the cutoff line formed by the cutoff pattern can be close to the light source. This can provide high brightness as well as a favorable light distribution pattern.

When the light guide part configured to reflect light from the light guide plate is provided in the area adjoining to the edge on the light source side, such as on the surface and rear surface of the light guide plate, the light guide part can repeat reflections between the surface and rear surface of the light guide plate, in the area adjoining the edge of the light guide plate on the light source side, thereby reducing brightness variations ascribable to distances between a plurality of point sources arranged in a row. This can make it possible to form the predetermined light distribution pattern with more uniform brightness.

When the vehicle lamp includes a reflection sheet configured to reflect light from the surface of the light guide plate back into the light guide plate, having a shape corresponding to a desired cutoff pattern, which may be formed in the area adjoining the edge on the light source side, such as on the surface of the light guide plate, the cutoff pattern can be provided to the distribution pattern in accordance with the shape of the reflection sheet. The light shielded by this cutoff pattern can be reflected by the reflection sheet back into the light guide plate, thereby improving the efficient use of the light from the light source.

When the light guide plate is formed to correct the spherical aberration of the projection lens, the spherical aberration of the projection lens can be corrected thereby, to reduce the adverse effect of the spherical aberration. In an exemplary embodiment, the light guide plate can be curved to correct the spherical aberration of the projection lens. Furthermore, the adverse effect of the spherical aberration can be less than what is typically known, and the vehicle headlamp can employ a less expensive projection lens that can have a relatively large spherical aberration.

In one exemplary embodiment, an optical sheet can be configured so that the direction of the maximum luminous intensity of the light emitted from the light guide plate coincides with the direction of the optical axis of the projection lens. Alternatively, in another exemplary embodiment, the light guide plate can be disposed obliquely with respect to the optical axis of the projection lens by a predetermined angle so that the direction of the maximum luminous intensity of the light emitted from the light guide plate coincides with the direction of the optical axis of the projection lens. In these examples, the direction of reflected light with the maximum luminous intensity by the rear surface prism array of the light guide plate can be matched to the optical axis of the projection lens. This can increase the light amount entering the projection lens and can increase the luminous intensity of the illumination pattern.

When the light guide plate is disposed obliquely with respect to the optical axis of the projection lens by a predetermined angle, even with the relatively large light guide plate, the dimension can be reduced by an amount as a function of the inclination. This can make the brightness control element relatively high in resolution.

When the two or more optical axes are provided for the projection lens formed of a solid of revolution around the associated optical axis as a center axis, the foci can be located on the respective optical axes. Accordingly, the light emission surface of the light guide plate can be designed to have a high brightness area corresponding to the respective foci. This configuration can form a high brightness distribution pattern as a whole. Even when the luminous intensity of the light source is low, the vehicle light can form a sufficiently high brightness distribution pattern similar to the case where the multiple vehicle lamps may have been required for the same brightness.

When the light source unit has a plurality of light sources and at least part of the light sources is disposed on the associated optical axes of the projection lens, the light from the high brightness area formed on the emission surface of the light guide plate at every light source can be effectively directed to and enter the projection lens to contribute the formation of the light distribution pattern. Accordingly, a brighter distribution pattern can be formed.

When the light guide plate includes light guide plate parts divided by the respective optical axes of the projection lens, and the respective light guide plate parts can be formed in the form of a trapezoid having a wider side on the light emission side than on the light source side, the light emitted from the respective light sources is likely to enter the lateral side of the light guide plate parts by an angle of incidence smaller than the critical angle. Accordingly, the incident light can be totally reflected by the lateral side of the light guide plate parts, thereby being directed toward the corresponding area of the projection lens. Therefore, a substantial or total amount of light might not enter the area of the projection lens corresponding to the adjacent optical axes. This means that the light emitted from the light guide plate might not be diffused in the lateral direction, but can be directed along the optical axis in the direction of light illumination. Accordingly, a lighter distribution pattern can be formed.

When the lateral sides of each light guide plate part has a substantial parabolic or elliptic shape, the light emitted from the respective light sources and entering the lateral sides of the light guide plate parts can be totally reflected by the lateral side more effectively so as to travel toward the corresponding projection lens.

With the above-described simple structure, a vehicle lamp according to the presently disclosed subject matter can form a desired distribution pattern easily and has a thin and light weight body.

Furthermore, according to the foregoing configuration, the light source of the light source unit is driven to emit light when the vehicle lamp is in ordinary use. The light emitted from the light source of the light source unit can enter the light guide plate through the one end face, can be repeatedly reflected at the inner surfaces of the light guide plate, and then emerge out of the surface of the light guide plate.

The light incident on the rear surface and surface of the light guide plate from inside can be controlled by the brightness control element as to the brightness distribution at the light emission surface. The resulting light can be transmitted through the surface of the light guide plate and projected toward the projection lens.

The brightness distribution on the light emission surface can thus be projected to the front of the vehicle through the projection lens, thereby providing illumination light of predetermined light distribution pattern that is suitable, for example, for a low beam light of a headlamp or a fog lamp.

When an additional light source is driven to emit light, the projection lens side surface of the light source unit is irradiated with the light from the additional light source. This light from the additional light source can provide a second illumination distribution. The light incident on the light emission surface can enter the light guide plate of the light source unit. Some portion of the light can be totally reflected by the brightness control element on the rear surface of the light guide plate. The remaining large portion of the light can be refracted and transmitted through the brightness control element on the rear surface, and can be reflected from a reflection sheet on the rear surface of the light source unit back into the light guide plate. The return light can be refracted and transmitted through the light emission surface to form a second brightness distribution, can travel toward the projection lens, and can converge and project forward in the direction of light illumination through the projection lens. This can create the second light distribution pattern different from the predetermined light distribution pattern of the light from the light source unit.

As mentioned above, the light with which the additional light source irradiates the projection lens side of the light source unit can undergo the effect of the brightness control element. The light guide plate can have a small thickness when compared with the size of the second illumination distribution produced by the additional light source. Since the light refracted by the brightness control element can travel a small distance in the directions parallel to the light emission surface, the effect of the brightness control element can be cancelled out easily by adjusting the position and size of the second illumination distribution.

The effect of the brightness control element on the direction of the light of the second illumination distribution can also be cancelled out by adjusting the orientation of the additional light source. For example, the light from the additional light source can be reflected by the light source unit in an upper direction than without the brightness distribution element (when flat), deviating above from the projection lens. In this example, the additional light source can be rotated about the focal line of the projection lens, moving the optical axis of the additional light source downward, so that the reflection from the light source unit can impinge on the projection lens. If the light deviates below, on the other hand, the additional light source can be rotated in the opposite direction.

As above, irradiating the light source unit with the second illumination distribution and using it as a reflection plate can easily produce the second light distribution pattern different from the predetermined light distribution pattern for a low beam, fog lamp, or the like.

If the second brightness distribution has the DRL distribution pattern, it can be easily possible to provide the light distribution pattern optimum for DRL which is different from the predetermined light distribution pattern.

The light source unit can be arranged obliquely with respect to the optical axis of the projection lens so that the direction of the maximum luminous intensity of the light emitted from the light guide plate coincides with the direction of the optical axis of the projection lens. In this case, the light source unit can emit light with the direction of the maximum luminous intensity of the light emitted from the light guide plate along the optical axis of the projection lens. This can maximize the brightness of the illumination light.

The oblique arrangement of the light guide plate can also reduce the dimension in the oblique direction even if the light guide plate has a relatively large size. This can make the brightness control element relatively high in resolution.

If the projection lens includes, at least in part, a cylindrical lens having an axis extending in a lateral direction, it might not have the ability to gather light in the lateral direction. The projection lens, however, can be arranged laterally across a sufficiently wide area with respect to the light source unit. This can improve the incident efficiency from the light source unit, thereby forming a light distribution pattern of higher brightness.

The light transmitted through the projection lens is somewhat diffused to the right and left by the effect of the cylindrical lens. This can produce a horizontally wide distribution pattern, which can reduce brightness variations between light sources if the light sources are point sources laterally spaced from one another.

The projection lens can include convex lenses at both ends and a cylindrical lens therebetween, the cylindrical lens having an axis extending in a lateral direction. Additional light sources can be arranged on respective planes perpendicular to the axis of the cylindrical lens, the planes passing through borders between the cylindrical lens and the respective convex lenses. In this case, the additional light sources are disposed on the center axes of the respective convex lenses. Light beams emitted from the additional light sources can be reflected at the light source unit, incident on the projection lens, and refracted inward through these convex portions.

This can increase the luminous intensity near the center of the light distribution pattern.

If the light emission surface of the light guide plate has a shape corresponding to a desired cutoff pattern, the light source unit can form the cutoff pattern. This can eliminate the need for a light shielding member for forming the cutoff pattern, so that the vehicle headlamp can be configured easily with lower costs.

The light guide part configured to reduce brightness variations of light from the light source can be formed in the area adjoining to the edges of the surface and rear surface of the light guide plate on the light source side. The reflection sheet or light shielding sheet configured to reflect light from the surface of the light guide plate back into the light guide plate, and having a shape corresponding to a desired cutoff pattern, can be formed on the surface of the light guide plate in the area adjoining to the edge on the light source side. In this case, the light guide part can repeat reflections between the surface and rear surface of the light guide plate, in the area adjoining to the edge of the light guide plate on the light source side, thereby reducing brightness variations ascribable to distances between a plurality of point sources arranged in a row. This can make it possible to form the predetermined light distribution pattern with more uniform brightness. The reflection sheet or light shielding sheet can also produce the cutoff pattern based on its own shape, over the predetermined light distribution pattern.

The reflection sheet or light shielding sheet, or a casing for retaining the same, can have a reflecting surface on the projection lens side. When the additional light source produces a second light distribution pattern, this reflecting surface can be used to provide a second brightness distribution without the foregoing cutoff. That is, it is possible to create a DRL or other second light distribution pattern which even includes light beams above the horizontal level.

The reflection sheet or light shielding sheet may be configured to be retractable from the surface of the light guide plate. When the additional light source produces a second light distribution pattern, this reflection sheet or light shielding sheet can be retracted from the surface of the light guide plate so that the entire light source unit is available for reflection purpose. This can make it possible to create a DRL or other second light distribution pattern which even includes light beams above the horizontal level.

If the light guide plate is formed with a curve corresponding to an aberration of the projection lens, then the aberration of the projection lens such as a spherical aberration can be corrected by the configuration of the curved surface of the light guide plate. This can reduce the effect of the spherical aberration. This effect can apply not only to the predetermined light distribution pattern but to the second light distribution pattern of the additional light source as well.

As above, according to the disclosed subject matter, it can be possible to provide a low-profile lightweight vehicle headlamp of simple configuration which can easily create a predetermined light distribution pattern suitable, for example, for a low beam or fog lamp and a second light distribution pattern suitable for a DRL.

BRIEF DESCRIPTION OF THE DRAWINGS

These and other characteristics, features, and advantages of the presently disclosed subject matter will become clear from the following description with reference to the accompanying drawings, wherein:

FIG. 9 is a graph showing a vertical directional characteristic of the light guide plate of the light source unit of FIG. 5, with respect to a prism angle;

DETAILED DESCRIPTION OF EXEMPLARY EMBODIMENTS

A description will now be made below to vehicle headlamps of the presently disclosed subject matter with reference to the accompanying drawings in accordance with exemplary embodiments.

Figure 5:
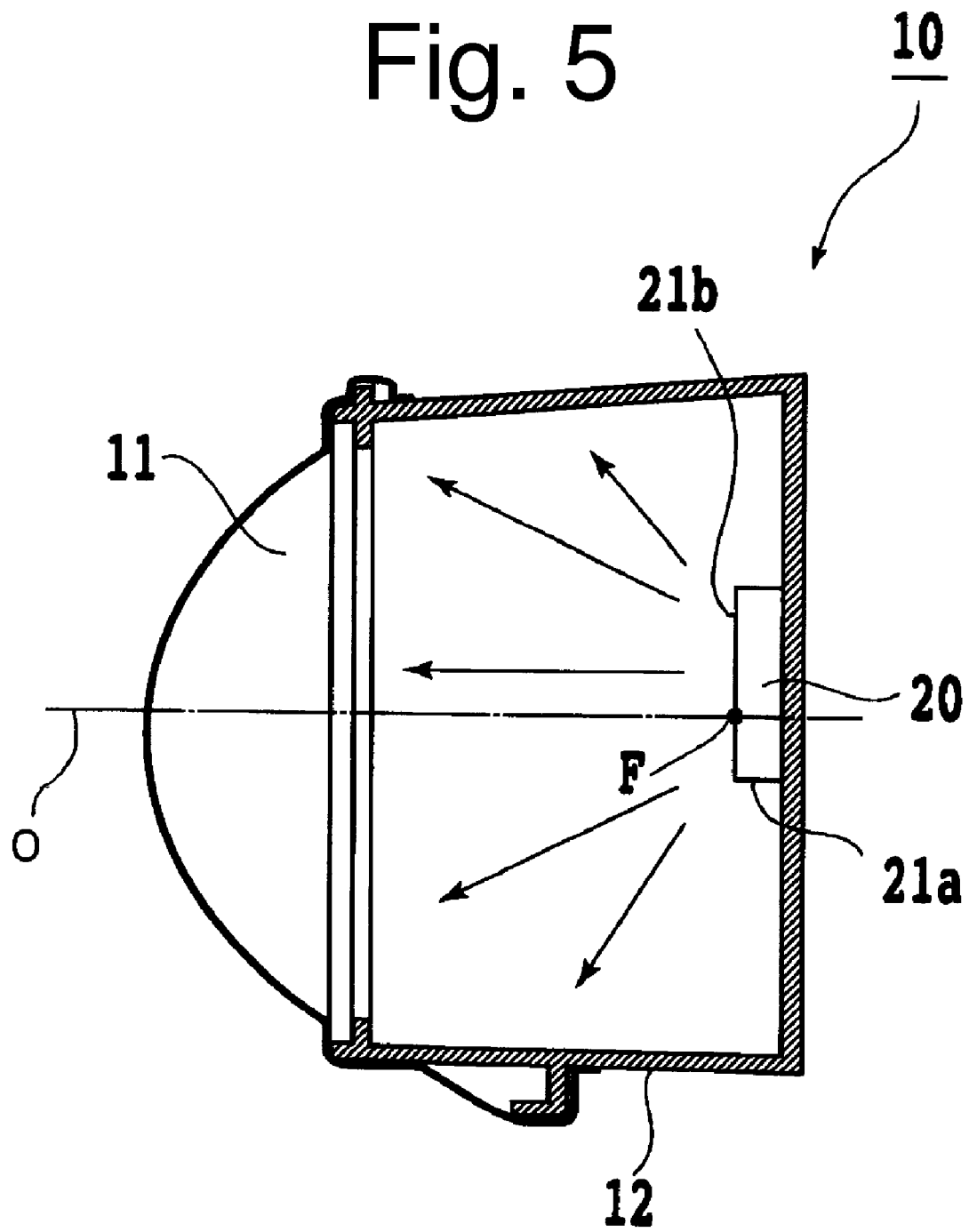
FIG. 5 is a schematic longitudinal cross-sectional view showing the configuration of a first exemplary embodiment of a vehicle headlamp made in accordance with principles of the disclosed subject matter.

FIG. 5 shows the configuration of a first exemplary embodiment of a vehicle headlamp made in accordance with principles of the presently disclosed subject matter.

In FIG. 5, the vehicle headlamp 10 can include a light source unit 20, and a projection lens 11 configured to converge light from the light source unit 20.

The configuration of the light source unit 20 will be described later. The light source unit 20 can be disposed near the center of the rear end of the box-shaped casing 12, which is opened to the front of the vehicle headlamp 10, so as to emit light forward in the direction of light illumination.

The projection lens 11 can be made of a convex lens, and is disposed so that its focal position F on the side of the light source unit 20 falls on the light emission surface of the light source unit 20. The focal position F can lie on the optical axis O.

Figure 6:
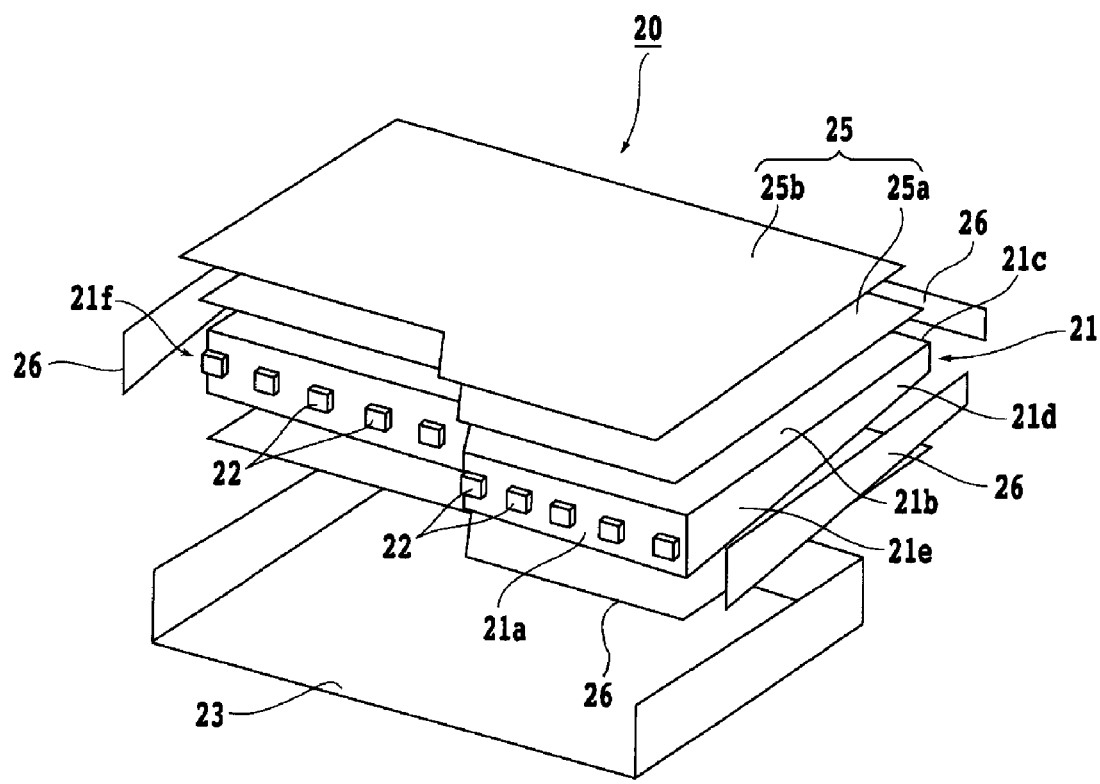
FIG. 6 is an enlarged, exploded perspective view showing a light source unit of the vehicle headlamp of FIG. 5.

As shown in FIG. 6, the light source unit 20 is composed of a light guide plate 21 and a plurality of LEDs 22 each serving as a light source.

In the shown case, the light guide plate 21 can be formed as a flat plate made of an optically transparent material, i.e., a material that is transparent to visible light.

For example, the above light guide plate 21 can be made of glass or a transparent resin that is commonly used for optical applications, such as polycarbonate or acrylic resin.

The light guide plate 21 can have an incident surface 21a at one end, or front end face in FIG. 6, and a light emission surface 21b at the top. The rear surface (bottom) and both the right and left sides can be covered with a casing 23 which is made of a lightproof material.

In the depicted embodiment, the light guide plate 21 can be shaped into a wedge-like section so that it gradually decreases in thickness from the foregoing incident surface 21a (light entering side) to the opposite end face (light projection side). However, the presently disclosed subject matter is not limited to this, and the light guide plate 21 can be formed with a constant thickness.

For improved incidence efficiency, the incident surface 21a of the light guide plate 21 can have a fine pattern consisting, or comprising, of rows of prismatic or circular configurations, for example. Alternatively, it may be given surface roughening.

The light emission surface 21b of the light guide plate 21 can have a prismatic or lenticular configuration for the purpose of providing enhanced brightness or well-ordered light distribution.

As shown in FIG. 6, the light emission surface 21b of the light guide plate 21 can also be shaped so as to correspond to the light distribution pattern to be projected, i.e., to a reduced inversion of this light distribution pattern. For example, the light emission surface 21b can be shaped to the cutoff pattern of a low beam of the vehicle headlamp.

For that purpose, the front end face 21a of the light guide plate 21 can be formed into a step near the center as shown in FIG. 6.

Figure 7A:
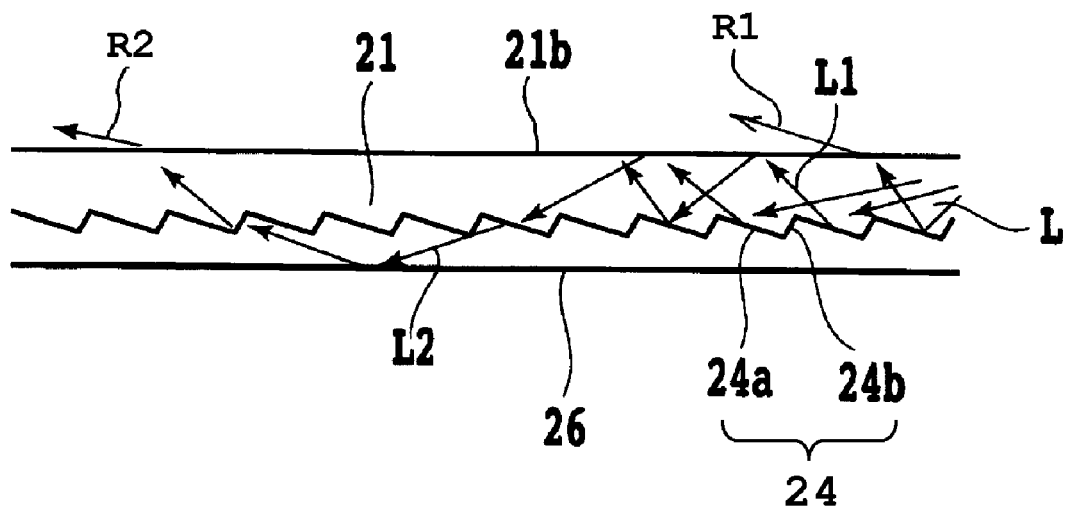
FIGS. 7A and 7B each are partial enlarged longitudinal cross-sectional views showing a light guide plate of the light source unit of FIG. 6.
Figure 7B:
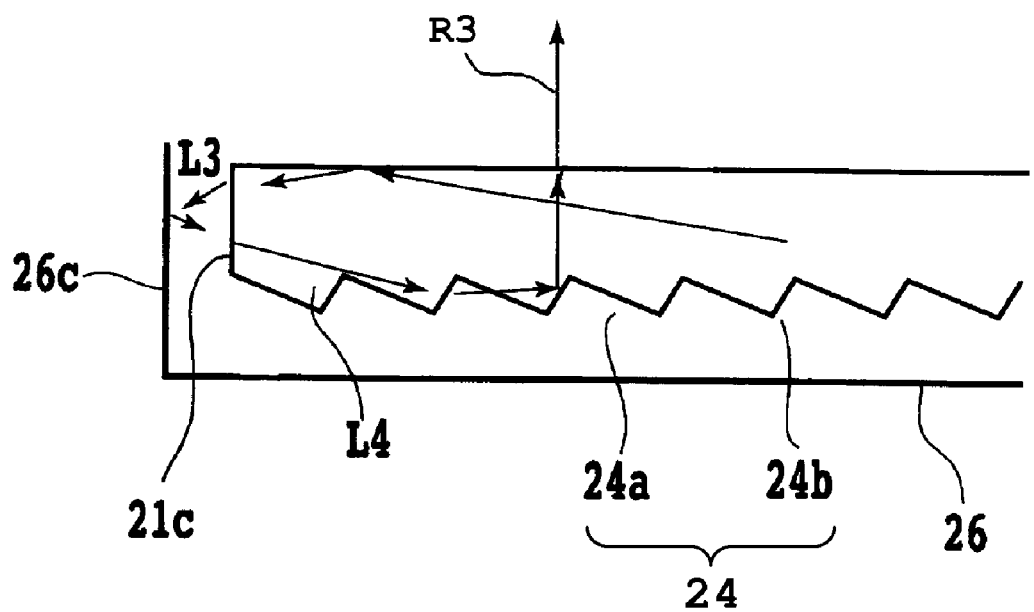

Furthermore, the light guide plate 21 can also have a prism array 24 on the rear surface (bottom) as shown in FIGS. 7A and 7B.

For example, this prism array 24 can be formed to extend with a serrated cross section from the incident surface 21a to the opposite end face, and in a corrugate configuration laterally.

The individual prism surfaces 24a of the prism array 24 can be obliquely formed so that when light enters the light guide plate 21 from the incident surface 21a and impinges on the prism surfaces 24a, the light is totally reflected into small angles of incidence to the emission surface.

Consequently, as shown in FIGS. 7A and 7B, a large portion of the light L that enters the light guide plate 21 can be reflected repeatedly, being totally reflected at the inner surfaces 24a of the prisms of the prism array 24 and being totally reflected at the top of the light guide plate 21.

This reflected light gradually decreases in the angle of incidence with respect to the light emission surface 21b of the light guide plate 21, and emerges as emission light R1 upward from the light emission surface 21b of the light guide plate 21 when the angle of incidence falls below the critical angle.

Some of the light L within the light guide plate 21 can be light L2 transmitting through the rear surface thereof because of the incident angle to the prism surface 24a being smaller than the critical angle. Even in this case, the transmitting light L2 to the rear surface can be reflected by the reflection sheet 26 back into the light guide plate. Accordingly, when the reflection sheet is made of a high reflectance material such as a silver reflection sheet or a formed resin sheet, the optical loss can be derived from a single source, such as the absorbance of the reflection sheet. Alternatively, the reflection sheet 26 can be configured as a reflecting film.

The light guide plate 21 can be manufactured by injection molding, press molding, or extrusion molding the above transparent resin material using a mold having a predetermined cavity shape. Alternatively, the light guide plate 21 can be manufactured by press molding of glass using a die having a predetermined cavity shape.

Furthermore, the prism array 24 of the light guide plate 21 can be manufactured by processing a plate material produced by injection molding or extrusion molding of the above transparent resin material.

In order to enhance the brightness and/or adjust the light distribution characteristic of the light to be emitted from the surface, the light guide plate 21 may have an optical sheet or sheets 25 (in the case shown in FIG. 6, two optical sheets 25a and 25b) on the surface.

Through the optical effect of the optical sheets 25, the light emitted from the light emission surface 21b of the light guide plate 21 can be adjusted in direction and in directional characteristic appropriately, whereby the light emitted from the light guide plate 21 can be guided toward the projection lens 11 with reliability.

The directional characteristic of the light guide plate 21 can be set so that the emitted light can be directed within the opening angle range with respect to the projection lens 11. Taking the diameter of the projection lens 11 into consideration, the opening angle can be set to about 70 degrees in general.

These optical sheets 25a and 25b can be prism sheets, diffusion films, or the like that are used in typical surface light source units.

The prism sheets can be manufactured by the following methods, including forming a film of a thermoplastic transparent resin, commonly used for optical applications, into the prismatic configuration by press molding or extrusion molding in a mold. Alternatively, they can be manufactured by forming a film made of an ultraviolet-curing transparent resin, commonly used for optical applications, into the prismatic configuration by using 2P or other molding techniques.

The diffusion films can be manufactured by the following methods, including extrusion molding a film of a thermoplastic transparent resin, commonly used for optical applications, and depositing resin or glass beads having a different refractive index on either one or both sides of the film. Alternatively, they can be manufactured by mixing a thermoplastic transparent resin, commonly used for optical application, with resin or glass beads having a different refractive index, and molding it into a film by extrusion molding or the like.

The light guide plate 21 can also have reflecting films 26 on the rear surface 21d. One feature of the reflecting films 26 can be the return of light that might leak out of the rear surface and lateral sides into the light guide plate 21, thereby improving the use efficiency of the light from the light source LEDs 22. If necessary, the reflecting films 26 can be disposed so as to be adjacent to or abutting the end face 21c opposite from the incident surface 21a, and both the right and left sides 21e and 21f of the light guide plate 21, respectively.

The reflecting films 26 can be made of a film of silver or other high-reflectance white sheets.

The high-reflectance white sheet can be manufactured by the known methods, employing: a high-reflectance metal film produced by depositing a film of silver, aluminum, or other high-reflectance metal on a surface of a extruded resin member by sputtering; a film or plate of polycarbonate resin or the like with a visible light diffusing and reflecting agent such as titanium oxide added thereto; or a resin film or resin plate that contains small pores dispersed by using a supercritical fluid, by micro foam molding, by foam molding with the aid of chemical foaming agents, and the like.

When the inner surfaces of the casing 23 are formed as reflecting surfaces, at least part of the inner surfaces of this casing 23 can be utilized for the reflecting films 26.

For example, in order to make the inner surfaces of the casing 23 into reflecting surfaces, a thin film of high-reflectivity metal can be deposited on the inner surfaces of the resin or metal casing 23 directly by vacuum deposition or sputtering.

The LEDs 22 can be opposed to the incident surface 21a of the light guide plate 21 in a row.

The LEDs 22 need not be arranged at regular intervals, but are arranged at appropriate intervals along the incident surface 21a of the light guide plate 21 so that the light emission surface 21b of the light guide plate 21 can provide a predetermined brightness distribution.

While the LEDs 22 can be arranged in a single row in the shown example, they are not limited to this arrangement but can be arranged in a plurality of rows.

Furthermore, the LEDs 22 each can be an LED package composed of a single or a plurality of LED chip(s).

The vehicle headlamp 10 of the present exemplary embodiment is configured as described above, and a drive voltage is applied to the LEDs 22 of the light source unit 20 from a not-shown external drive circuit. The LEDs 22 can be thereby driven to emit light.

The light emitted from the LEDs 22 can enter the light guide plate 21 through the incident surface 21a. The light can be reflected at the surface, rear surface, and both lateral sides of this light guide plate 21 and returned into the light guide plate by the reflecting sheets 26 repeatedly before emitted toward the projection lens 11 from the emission surface 21b as light beams R1 and R2 (see FIG. 7A). Then, the remaining light L3 can travel to the opposite end face 21c to be emitted therefrom (see FIG. 7B).

The light L3 from the end face 21c can be reflected by the reflection sheet 26c to be back into the light guide plate 21. The returned light L4 can be adjusted between the prism surface 24a and the tapered surface 24b of the prism array 24 so that the angle of incidence to the taper surface 24b becomes large. When the angle of incidence to the taper surface 24b exceeds the critical angle, the light can be totally reflected to be projected as light R3 from the light emission surface 21b, whereby the light emission surface 21 can emit light with high brightness.

The emission shape on the light emission surface 21b of this light guide plate 21 can be projected forward in the direction of light illumination through the projection lens 11.

The emission shape on this light emission surface 21b can be magnified and inverted when projected forward in the direction of light illumination.

As shown in FIG. 6, the light emission surface (top surface) 21b of the light guide plate 21 can be shaped to form the cutoff pattern at the edge on the side of the incident surface 21a. This can create the emission shape corresponding to the light distribution pattern that is suitable for the passing-by beam of the vehicle headlamp.

Accordingly, this emission shape can be projected forward in the direction of light illumination through the projection lens 11, whereby the light distribution pattern suitable for the low beam of the vehicle is formed.

In this instance, the light emission surface 21b of the light guide plate 21 in the light source unit 20 can have the emission shape corresponding to the light distribution pattern. This can eliminate the need for a reflecting surface configured to create a light distribution pattern or a light shielding member configured to form the cutoff line as in vehicle headlamps of a conventional projector type.

Consequently, the entire vehicle headlamp 10 is significantly reduced in length in the front-to-rear direction, so that it can be configured with a smaller size and lighter weight.

The absence of need for the light shielding member can contribute to a small parts count, with a significant reduction in parts cost and assembly cost.

The light emission surface 21b of the light guide plate 21 can be shaped to the cutoff pattern at the side of the incident surface 21a. This makes it possible for the light emission surface 21b to provide high brightness at the side of the incident surface 21a easily.

As a result, the cutoff line or bright-dark boundary of the light distribution pattern formed on the side of this incident surface 21a can be projected clearly with high brightness.

The LEDs 22 can be arranged at smaller intervals in the area where higher brightness is desired in the light distribution pattern. This can facilitate providing high brightness.

Figure 8:
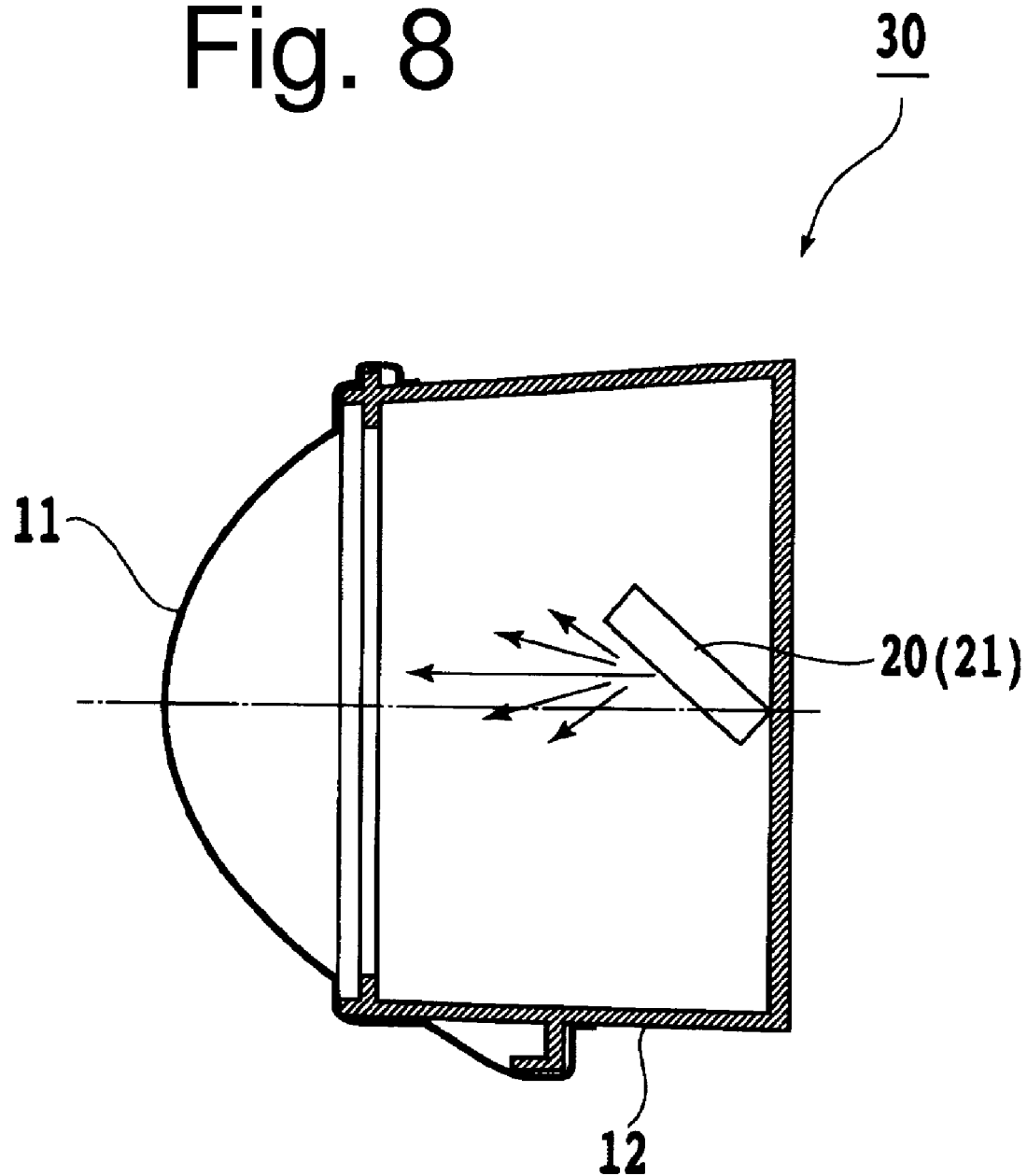
FIG. 8 is a schematic longitudinal cross-sectional view showing the configuration of a second exemplary embodiment of a vehicle headlamp made in accordance with principles of the disclosed subject matter.

FIG. 8 shows the configuration of the vehicle headlamp according to a second exemplary embodiment of the presently disclosed subject matter.

In FIG. 8, the vehicle headlamp 30 can have the same configuration as that of the vehicle headlamp 10 shown in FIG. 5. The same or similar components will thus be designated with the same reference numerals and the descriptions thereof will be omitted here. In addition to this, some components being the same or similar components as those in the previous exemplary embodiment are omitted in the drawings for facilitating the understanding of the presently subject matter.

One difference in the vehicle headlamp 30 can be the arrangement of the light source unit 20 configured obliquely with respect to the optical axis of the projection lens 11.

The light source unit 20 of the present exemplary embodiment can be obliquely arranged so that the reflected light created by the prism array 24 of the source plate 21 is emitted in the direction coincident with the optical axis of the projection lens 11. In this case, the light source unit 20 can be inclined with the top edge forward.

The light source unit 20 can be situated so that the focal position of the projection lens 11 on the side of the light source unit 20 comes near the position where the incident surface 21a of the light guide plate 21 forms a cutoff line.

In general, light emitted from the light source unit 20, but not entering the projection lens 11, might not contribute to the formation of the light distribution pattern. Accordingly, the light utilization efficiency from the light source unit 20 can be lowered.

In view of this, the directional characteristic of the light source unit 20, or that of the light guide plate 21, can be set so that the emitted light from the light guide plate 21 is directed within the angle range (opening angle range) between the light guide plate 21 and the projection lens 11. Taking the diameter of the projection lens 11 into consideration, the opening angle can be set to about 70 degrees in general.

In the above light guide plate 21, the prism angle of the prism array 24 (inclination angle of the prism inner surface facing to the light incident surface 12a) and the directional characteristic of the emitted light can be related to each other. Computational simulation has been performed on the vertical directional characteristic of the light guide plate 21 while varying the prism angle of from 2 degrees to 45 degrees, and the results shown in the graph of FIG. 9 were obtained.

As shown in FIG. 9, the smaller the prism angle is, the narrower the directional characteristic can be. The larger the prism angle is, the wider the directional characteristic can be, and the direction of the maximum luminous intensity of the light emitted from the light guide plate can vary.

Accordingly, the vehicle headlamp 10 shown in FIG. 5 can use an optical sheet 25 configured to guide the light from the light source unit 20 to the projection lens 11. Alternatively, the light emission surface 21b of the light guide plate 21 can be processed to have a prism having a desired prism angle of, for example, 60 to 110 degrees, extending laterally. This can adjust the directional characteristic to coincide with the direction to the projection lens. However, alternatively, the light source unit 20 of the vehicle headlamp 30 of FIG. 8 can be obliquely disposed with respect to the optical axis of the projection lens 21 so as to allow the emission light to be directed to the projection lens.

Figure 10A:
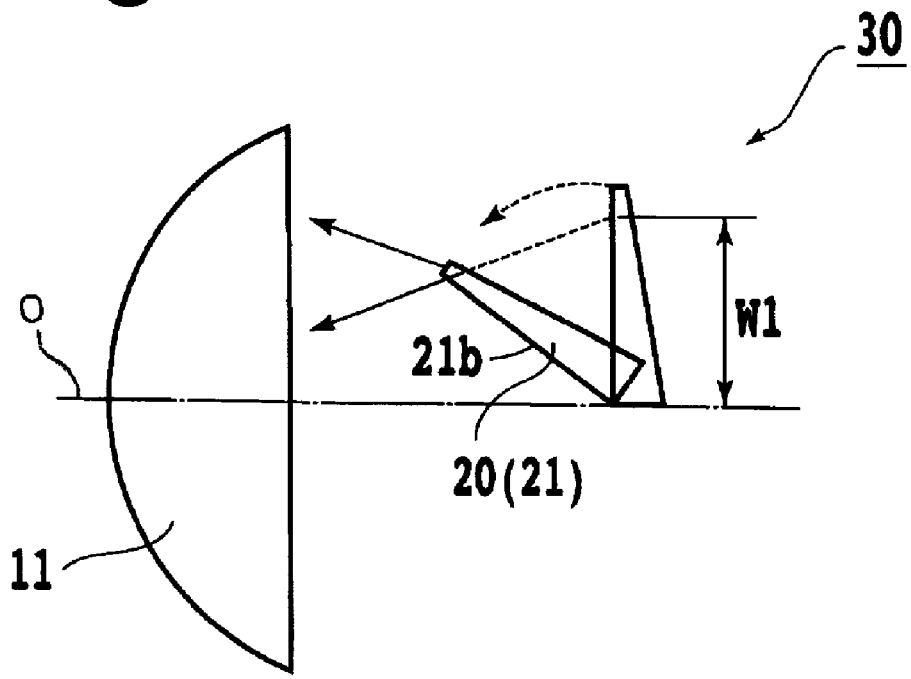
FIGS. 10A and 10B are schematic cross-sectional views illustrating the light source unit of the vehicle headlamp of FIG. 8 being arranged obliquely, FIG. 10A being a case when the light guide plate has a narrow directional characteristic and FIG. 10B being a case when the light guide plate has a wide directional characteristic.

The above configuration can be suitable when the directional characteristic of the light guide plate 21 is narrow. The apparent vertical width W1 of the light guide plate 21 can be reduced, as shown in FIG. 10A, by disposing the light source unit 20 obliquely. In addition to this, the light guide plate 21 can be more close to the projection lens. This can ensure the entrance of the emission light from the light guide plate 21 into the projection lens 11, thereby improving the light utilization efficiency. The decrease in apparent vertical width W1 can facilitate the formation of vertically narrower light distribution pattern with ease, which would be suitable for the headlamp or fog lamp use.

Figure 10B:
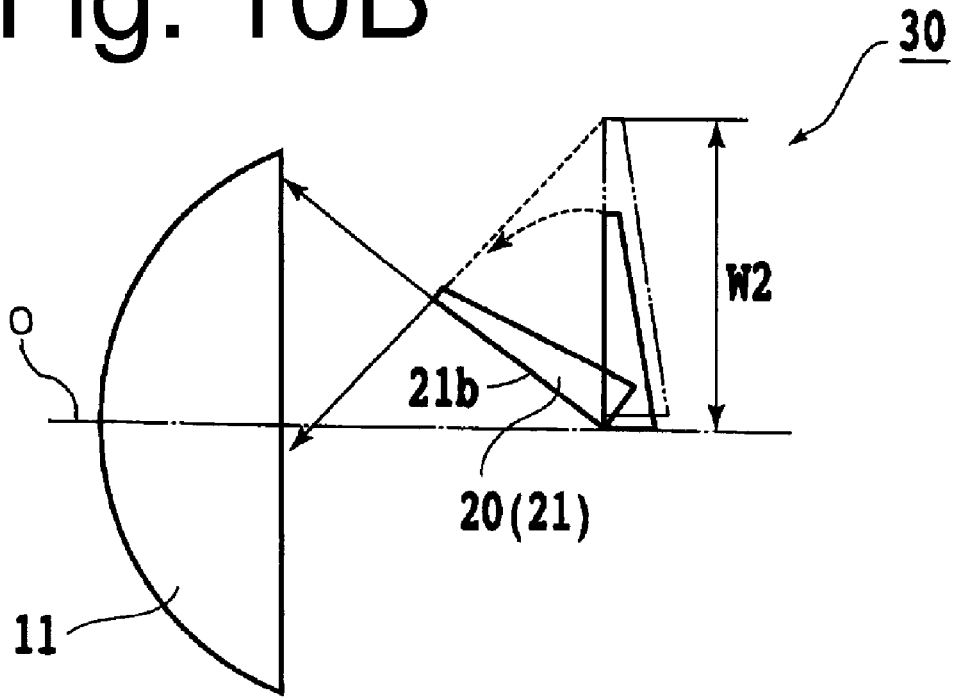

On the other hand, when the directional characteristic is wide, as shown in FIG. 10B, the apparent vertical width W2 can be large. In this case, the configuration of the first exemplary embodiment can be employed.

In this vehicle headlamp 30 configured as above, like the vehicle headlamp 10, a relatively expensive optical sheet 25 need not be used. This can reduce the overall cost.

In addition to this, since the light source unit 20 can be obliquely disposed, the light guide plate 21 can be disposed closer to the projection lens. This can improve the incidence efficiency to the projection lens 11.

Furthermore, since the light source unit 20 can be obliquely disposed, it can occupy a smaller inner space of the casing 23. This means that a larger light guide plate 21 can be employed with the same occupied height. Accordingly, the apparent vertical width of the light guide plate 21 can be reduced and a vertically narrower light distribution pattern can easily be obtained.

Figure 11A:
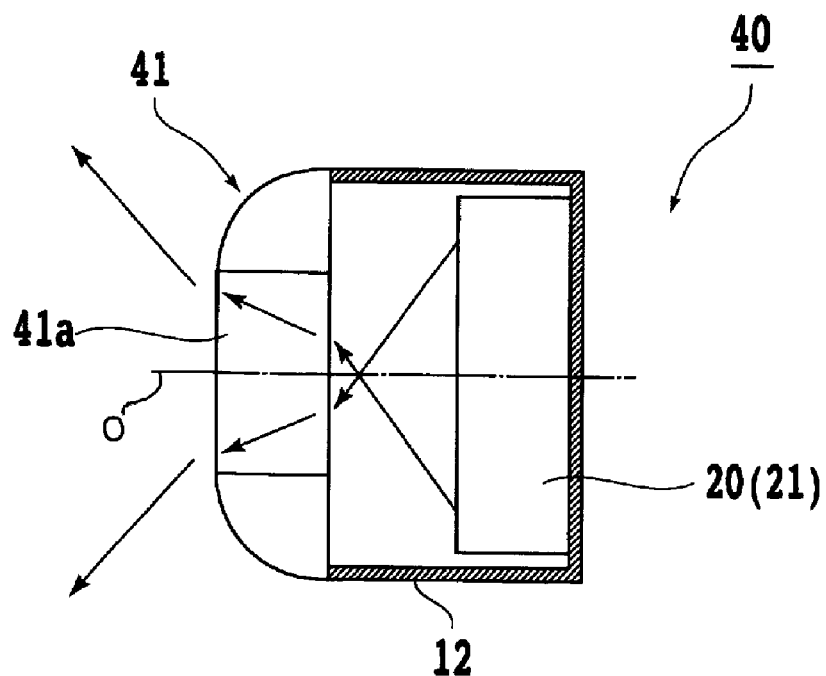
FIGS. 11A and 11B are a schematic cross-sectional view and a schematic longitudinal cross-sectional view, respectively, showing the configuration of a third exemplary embodiment of a vehicle headlamp made in accordance with principles of the presently disclosed subject matter.
Figure 11B:
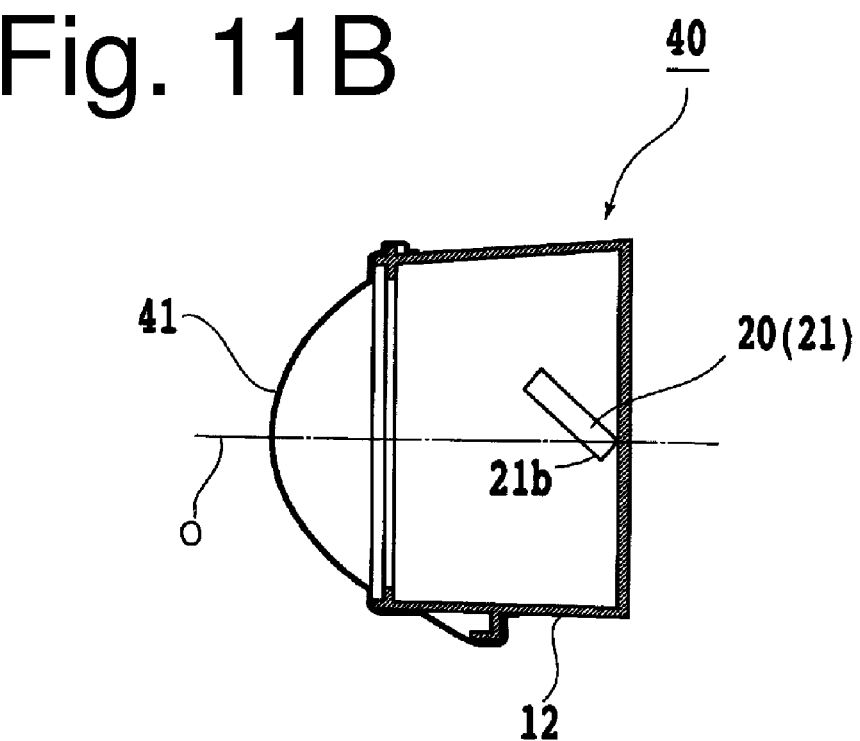

FIGS. 11A and 11B show the configuration of a vehicle headlamp according to a third exemplary embodiment of the presently disclosed subject matter.

In FIGS. 11A and 11B, the vehicle headlamp 40 can have the same configuration as that of the vehicle headlamp 30 shown in FIG. 8 is. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

One difference in the vehicle headlamp 40 can be the provision of the laterally long projection lens 41 corresponding to the laterally long light source unit 20.

The projection lens 41 can include two lenses and a cylindrical lens 41a. The lenses can be formed by splitting the foregoing projection lens 11, i.e., a convex lens into two at the center, and are separated from each other according to the lateral length of the light guide plate 21. The cylindrical lens 41a can connect these two convex lenses.

The vehicle headlamp 40 having such a configuration can provide the same operation as that of the vehicle headlamp 30 shown in FIG. 8.

The projection lens 41 can include the cylindrical lens 41a with a laterally-oblong incident surface. This can improve the incidence efficiency onto the projection lens from the light guide plate 21.

Figure 12:
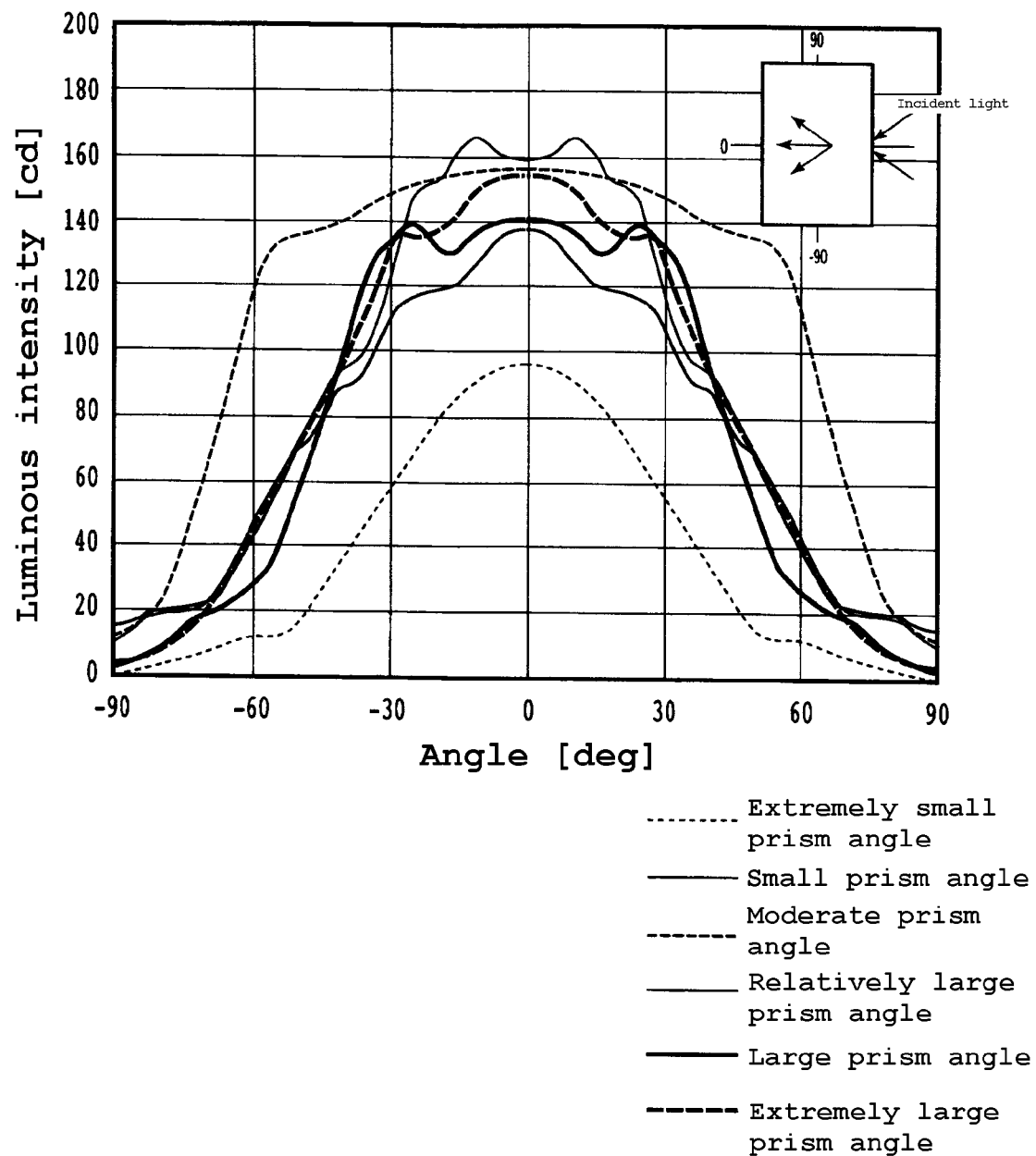
FIG. 12 is a graph showing a horizontal directional characteristic of the light guide plate of the light source unit of FIG. 6, with respect to a prism angle.

FIG. 12 shows the results of the computational simulation on the horizontal directional characteristic of the light guide plate 21 while varying the prism angle of 2 to 45 degrees. As shown in FIG. 12, the prism array 24 can be oriented parallel to the light incident surface 21a, and accordingly, it can lack light-gathering capability with respect to the lateral direction. Namely, since the light guide plate 21 can emit light expanded horizontally, the laterally wide cylindrical lens 21a can be effectively utilized for enhancing the incident efficiency to the projection lens from the light guide plate 21.

The light entering the cylindrical lens 41a can be expanded horizontally as shown in FIG. 11A, forming a horizontally wide light distribution pattern. This can reduce brightness variations between light source LEDs in the light distribution pattern. The light entering the convex lenses at the respective ends of the projection lens 41 can be refracted to the inside in the horizontal direction and projected forward in the direction of light illumination. This can enhance the luminous intensity at and near the center of the light distribution pattern.

Figure 13A:
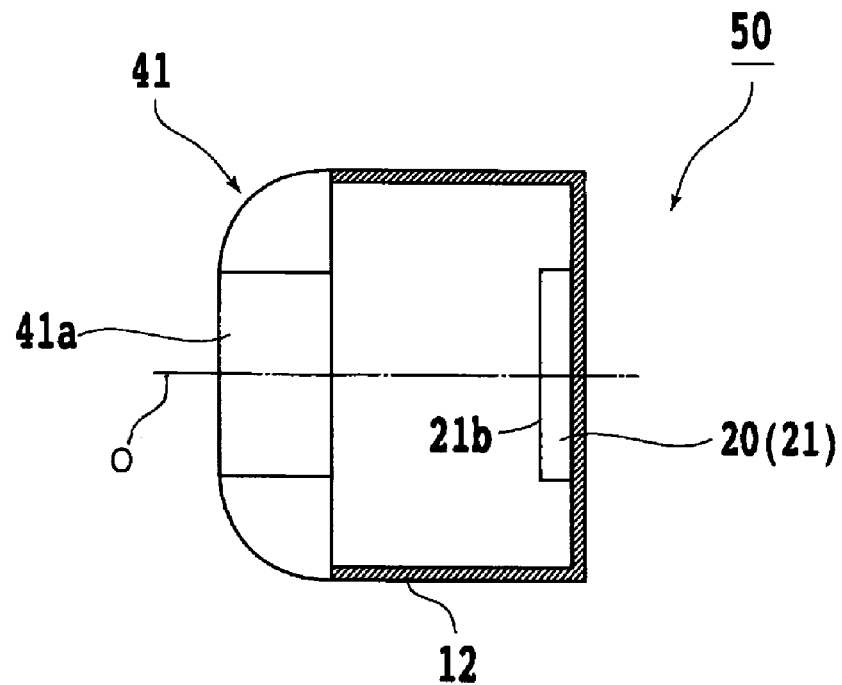
FIGS. 13A and 13B are a schematic cross-sectional view and a schematic longitudinal cross-sectional view, respectively, showing the configuration of a fourth exemplary embodiment of a vehicle headlamp made in accordance with principles of the presently disclosed subject matter.
Figure 13B:
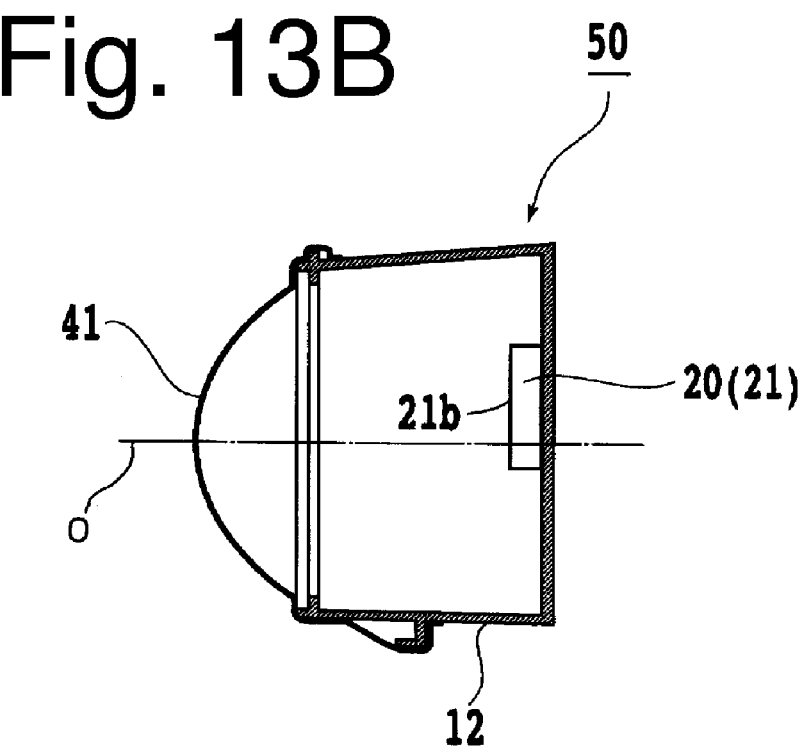

FIGS. 13A and 13B show the configuration of the vehicle headlamp according to a fourth exemplary embodiment of the presently disclosed subject matter.

In FIGS. 13A and 13B, the vehicle headlamp 50 can have the same configuration as that of the vehicle headlamp 40 shown in FIG. 11. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

One difference in the vehicle headlamp 50 can be, when compared with the vehicle headlamp 40 of FIG. 11, the vertical arrangement of the light source unit 20.

The vehicle headlamp 50 having such a configuration can provide the same operation as that of the vehicle headlamp 40 shown in FIGS. 11A and 11B. In addition to this, the light emitted from the light emission surface 21b of the light guide plate 21 of the light source unit 20 can have an adjusted directional characteristic by the optical sheet 25, thereby entering the projection lens 41.

Figure 14A:
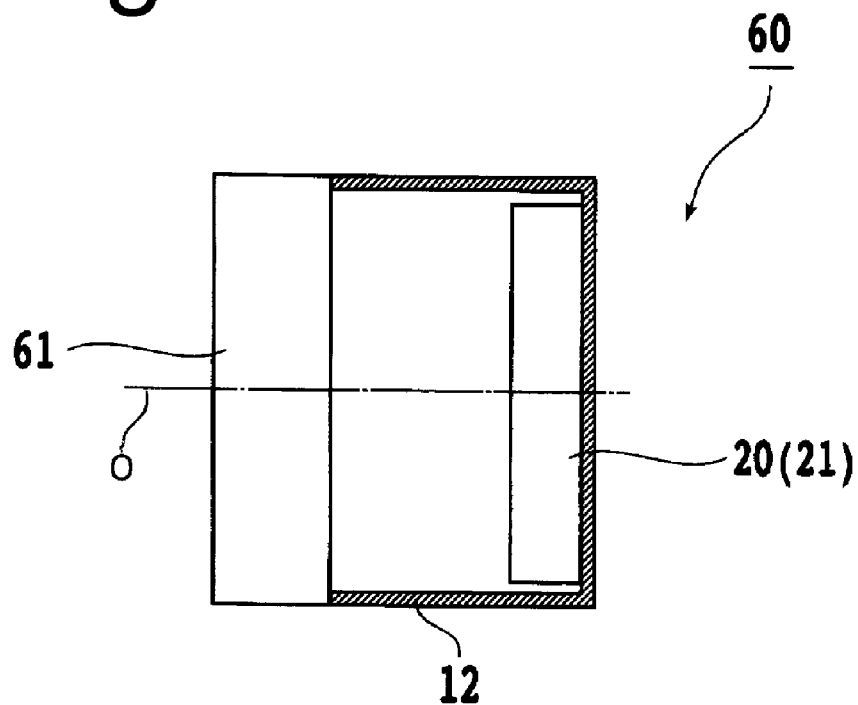
FIGS. 14A and 14B are a schematic cross-sectional view and a schematic longitudinal cross-sectional view, respectively, showing the configuration of a fifth exemplary embodiment of a vehicle headlamp made in accordance with principles of the presently disclosed subject matter.
Figure 14B:
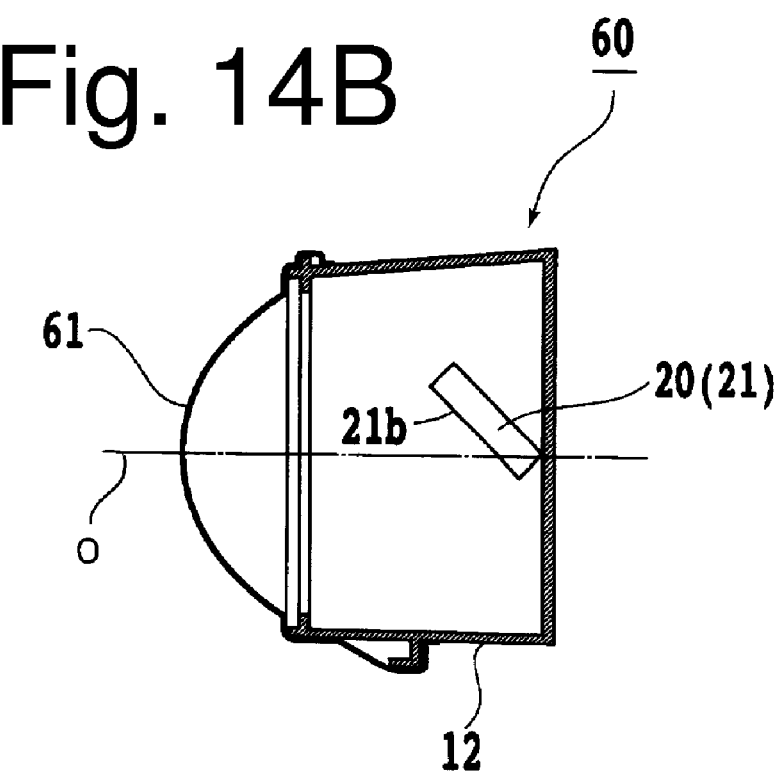

FIGS. 14A and 14B show the configuration of the vehicle headlamp according to a fifth exemplary embodiment of the presently disclosed subject matter.

In FIGS. 14A and 14B, the vehicle headlamp 60 can have the same configuration as that of the vehicle headlamp 40 shown in FIGS. 11A and 11B. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

The difference in the vehicle headlamp 60 can be, when compared with the vehicle headlamp 40 of FIGS. 11A and 11B, the provision of the projection lens 61 in place of the projection lens 41. The projection lens 61 can include a single element, such as a cylindrical lens having an axis extending horizontally.

The vehicle headlamp 60 having such a configuration can provide the same operation as that of the vehicle headlamp 40 shown in FIGS. 11A and 11B.

The projection lens 61 has no convex lens near either right or left end. Accordingly, the light emitted laterally from the light guide plate 21 is not converged to near the center of the light distribution pattern, but is reflected by internal reflection, contributing to the formation of the light distribution pattern.

This makes it possible to provide a desired light distribution pattern for a fog lamp and the like where the maximum luminous intensity is not of particular significance.

Figure 15A:
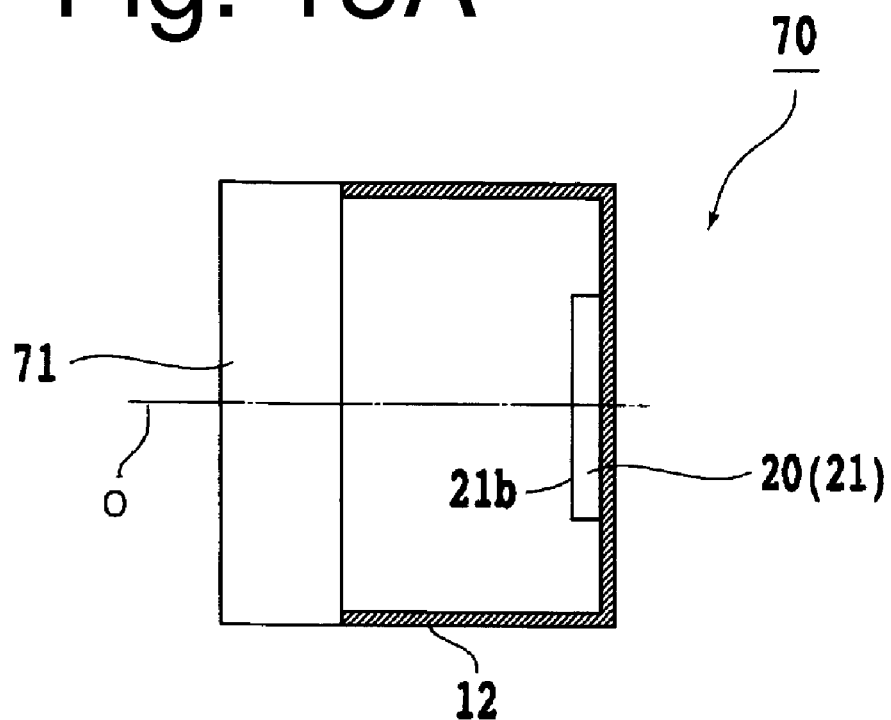
FIGS. 15A and 15B are a schematic cross-sectional view and a schematic longitudinal cross-sectional view, respectively, showing the configuration of a sixth exemplary embodiment of a vehicle headlamp made in accordance with principles of the presently disclosed subject matter.
Figure 15B:
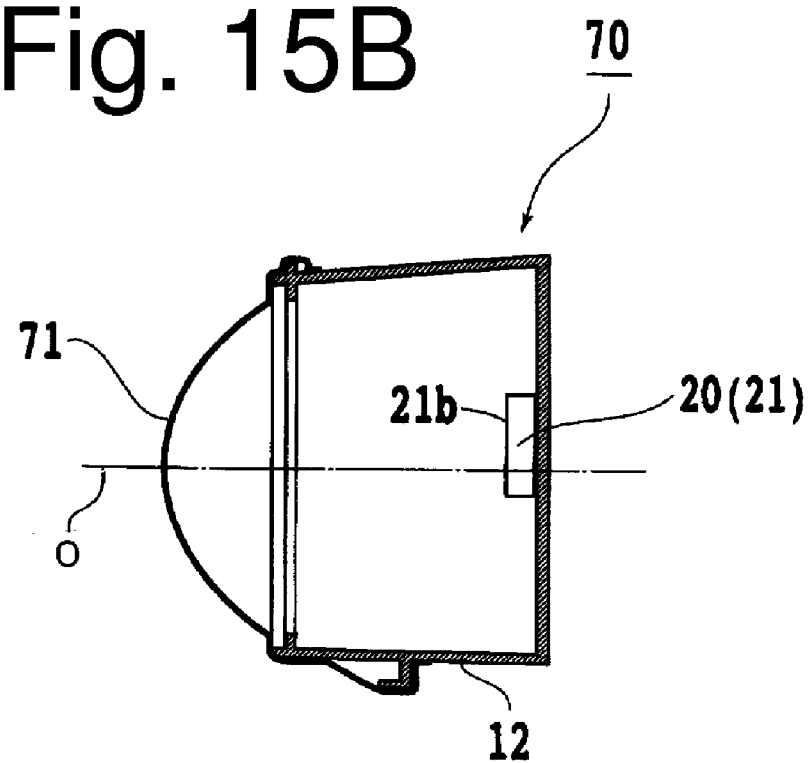

FIGS. 15A and 15B show the configuration of the vehicle headlamp according to a sixth exemplary embodiment of the presently disclosed subject matter.

In FIGS. 15A and 15B, the vehicle headlamp 70 can have the same configuration as that of the vehicle headlamp 60 shown in FIGS. 14A and 14B. The same or similar components will thus be designated with the same numerals and the descriptions thereof will be omitted here. In addition to this, some components being the same or similar components as those in the previous exemplary embodiments are omitted in the drawings for facilitating the understanding of the presently subject matter.

One difference in the vehicle headlamp 70 can be, when compared with the vehicle headlamp 60 of FIGS. 14A and 14B, the vertical arrangement of the light source unit 20.

The vehicle headlamp 70 having such a configuration can provide the same operation as that of the vehicle headlamp 60 shown in FIGS. 14A and 14B. In addition to this, the light emitted from the light emission surface 21b of the light guide plate 21 of the light source unit 20 can have an adjusted directional characteristic by the optical sheet 25, thereby entering the projection lens 71.

Figure 16:
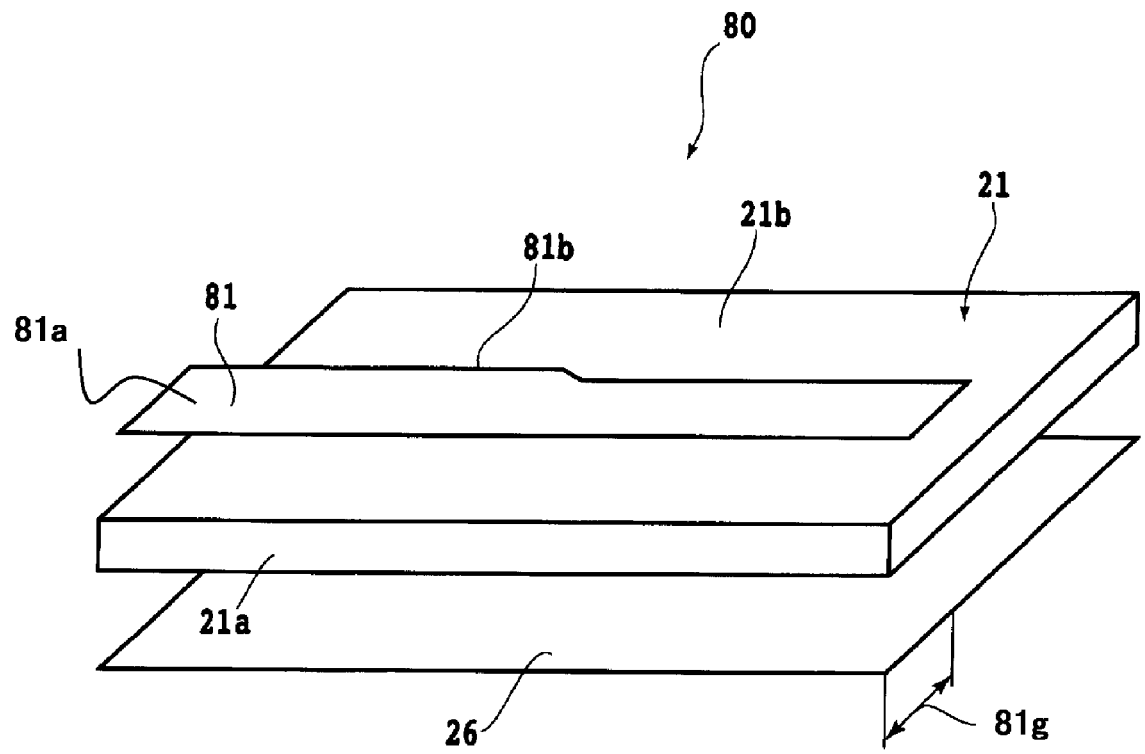
FIG. 16 is a schematic perspective view showing the configuration of a light source unit in a seventh exemplary embodiment of a vehicle headlamp made in accordance with principles of the presently disclosed subject matter.

FIG. 16 shows the configuration of the vehicle headlamp according to a seventh exemplary embodiment of the presently disclosed subject matter.

In FIG. 16, the vehicle headlamp can have the same configuration as those of the vehicle headlamps shown in FIGS. 5, 8, 11A, 11B, 13A, 13B, 14A and 14B. One difference in the vehicle headlamp can be the provision of the light source unit 80 in place of the light source unit 20.

When compared with the light source unit 20 of FIG. 6, the light emission surface 21b of the light source unit 80 does not have a shape corresponding to the cutoff pattern, but has a light guide part 81 with a predetermined width provided in the edge area on the side of the light incident surface 21a.

This light guide part 81 can be formed by a reflection sheet 81a which is placed on the surface of the light guide plate 21 in that area.

The reflection sheet 81a can have an edge 81b opposite to the light incident surface 21a, and the edge being can be formed to have a shape corresponding to the cutoff line.

In the light source unit 80 of the vehicle headlamp with this configuration, the light entering the light guide plate 21 via the light incident surface 21a can be repeatedly reflected by the light guide part 81 between the reflection sheet 81a and the rear surface of the light guide plate 21 or the reflection film 26. Specifically, between portion 81g of the reflection film 26 (which corresponds to the width of the light guide part 81) and the light guide part 81. In this manner, the incident light can be sufficiently diffused, in particular, in the horizontal directions inside the light guide plate 21. This can reduce the brightness variations ascribable to distances between the LEDs 22, and a desired cutoff pattern can be formed by the outline of the edge 81b of the reflection sheet 81a with ease.

Figure 17A:
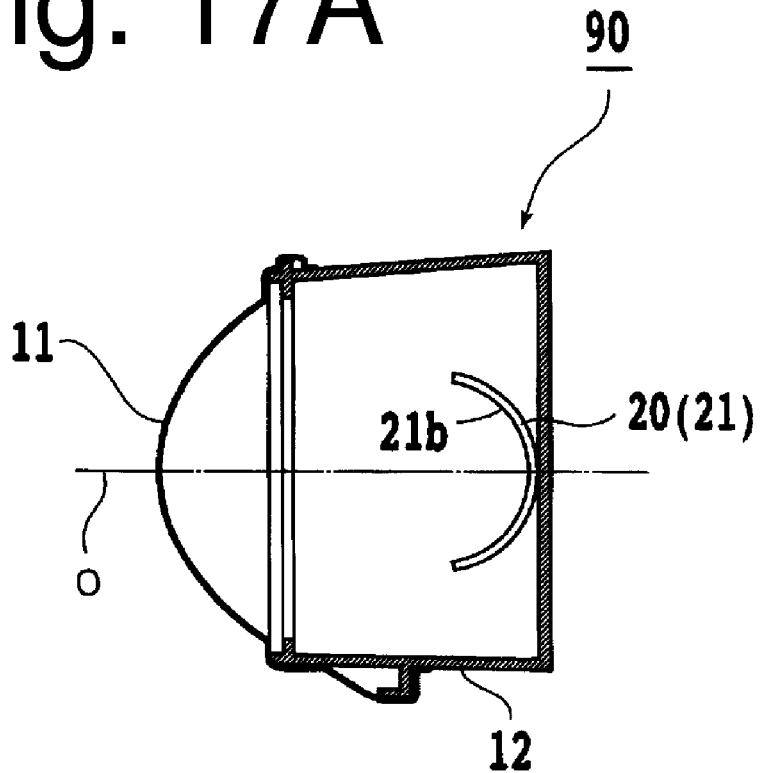
FIGS. 17A and 17B are a schematic cross-sectional view and a schematic longitudinal cross-sectional view, respectively, showing the configuration of an eighth exemplary embodiment of a vehicle headlamp made in accordance with principles of the presently disclosed subject matter.
Figure 17B:
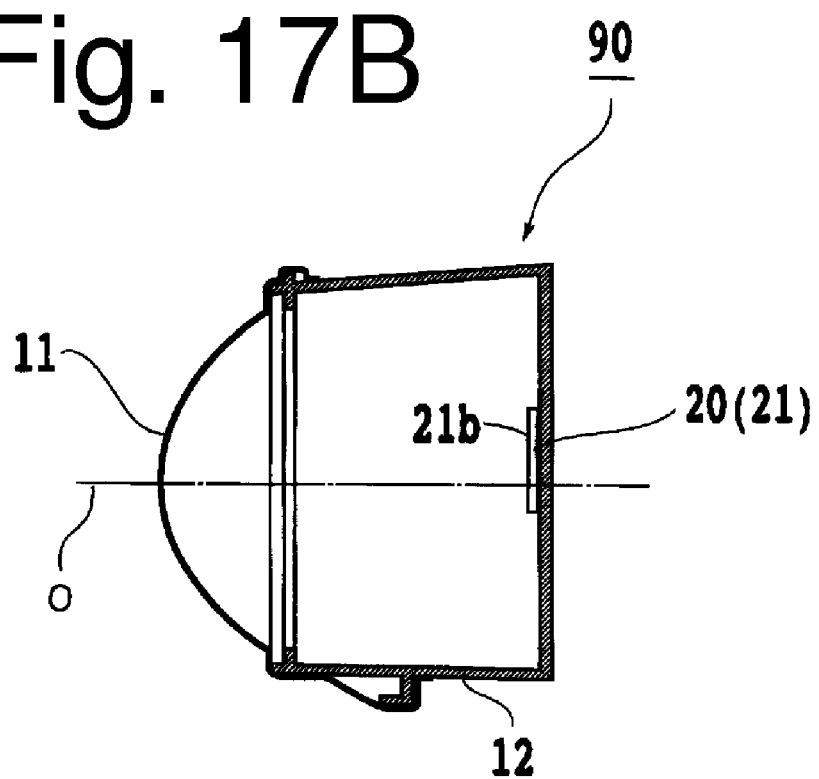

FIGS. 17A and 17B show the configuration of the vehicle headlamp according to an eighth exemplary embodiment of the presently disclosed subject matter.

In FIGS. 17A and 17B, the vehicle headlamp 90 can have the same configuration as that of the vehicle headlamp 10 shown in FIG. 5. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

In the vehicle headlamp 90, the light source unit 20 can have the light guide plate 21 curved to correct the spherical aberration of the projection lens 11 configured to project the image of the light emission surface 21b in accordance with the direction of the spherical aberration with respect to the horizontal direction.

The vehicle headlamp 90 having such a configuration can provide the same operation as that of the vehicle headlamp 10 shown in FIG. 5. In addition to this, the vehicle headlamp 90 can have a curved light guide plate 21 corresponding to the spherical aberration of the projection lens 11. Accordingly, the curvature of the light guide plate 21 can correct the spherical aberration of the projection lens 11.

This means that the light distribution pattern of light emitted from the light guide plate 21 and projected by the projection lens 11 forward in the direction of light illumination can be formed with less adverse effect of the spherical aberration of the projection lens 11.

Alternatively, taking the correction effect of the spherical aberration by the curvature of the light guide plate 21 into consideration, the projection lens can be allowed to have the spherical aberration to some extent. This means the vehicle headlamp 90 can employ relatively cheap projection lenses. This configuration thus can reduce the parts cost.

Figure 18A:
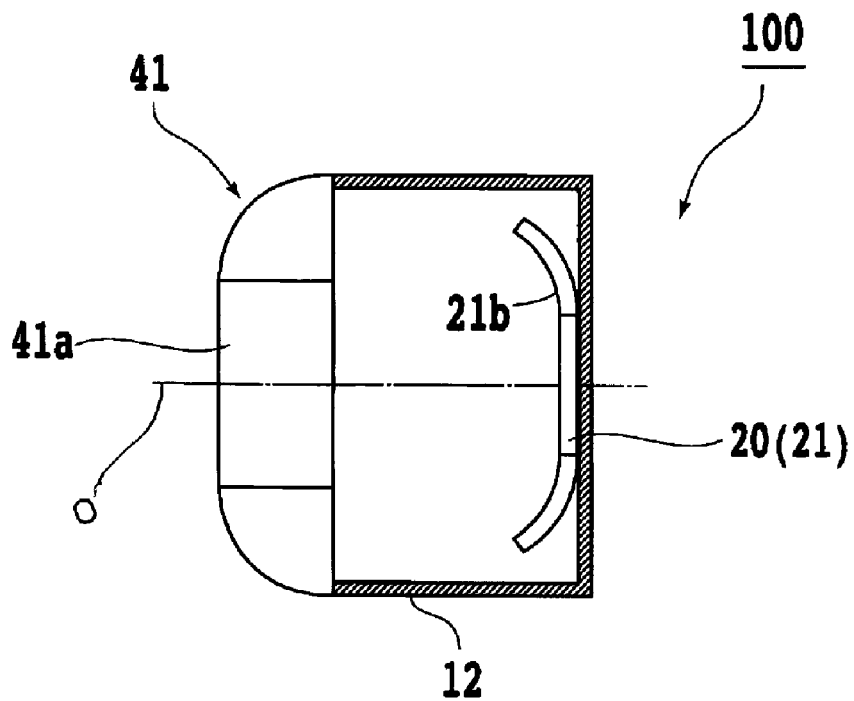
FIGS. 18A and 18B are a schematic cross-sectional view and a schematic longitudinal cross-sectional view, respectively, showing the configuration of a ninth exemplary embodiment of a vehicle headlamp made in accordance with principles of the presently disclosed subject matter.
Figure 18B:
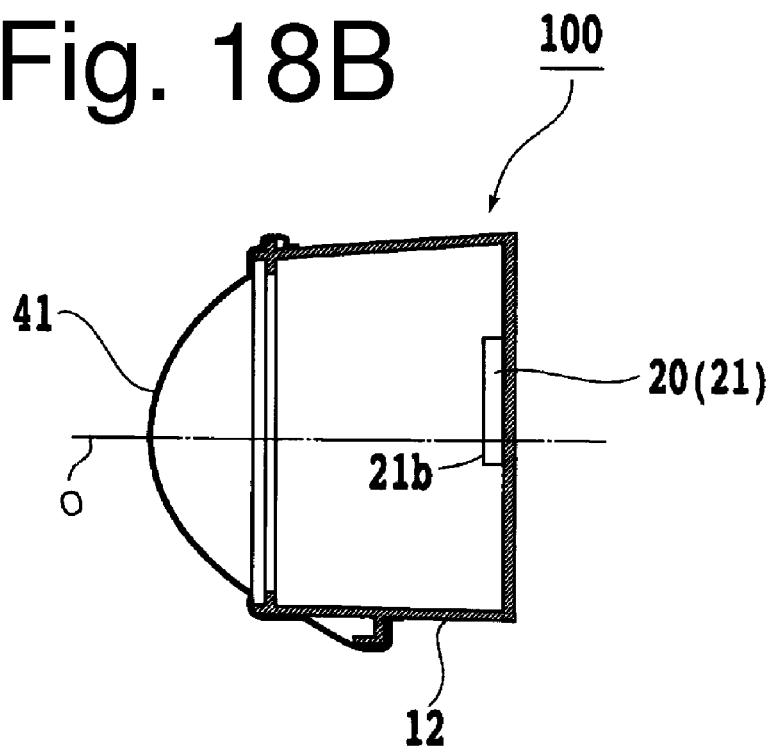
Figure 19A:
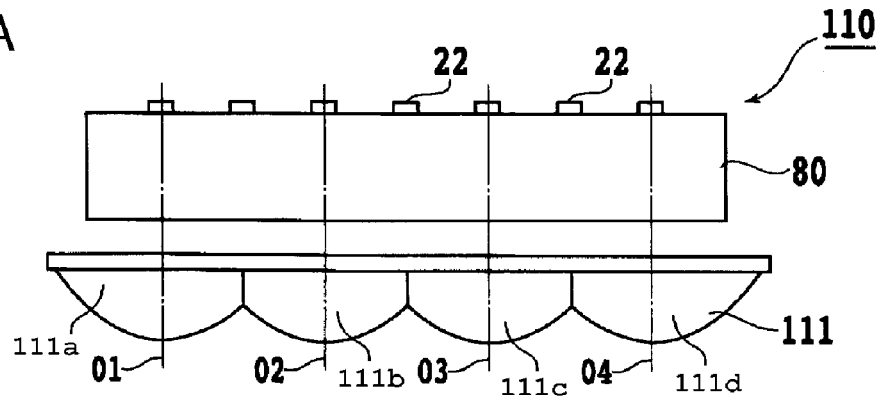
FIGS. 19A, 19B, 19C, and 19D are a schematic plan view, a schematic front view, a schematic bottom view, and a schematic cross-sectional view, respectively, showing the configuration of a tenth exemplary embodiment of a vehicle headlamp made in accordance with principles of the presently disclosed subject matter.
Figure 19B:
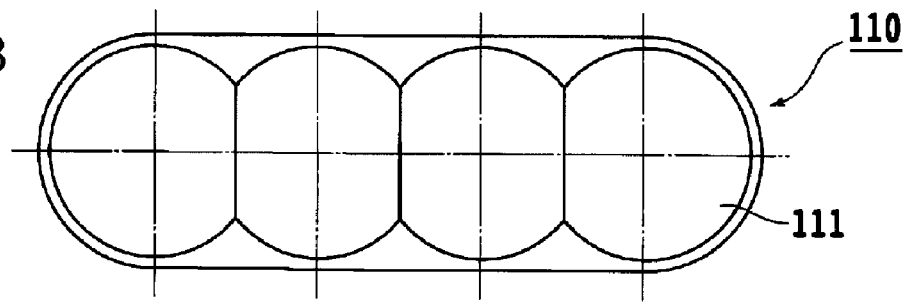
Figure 19C:
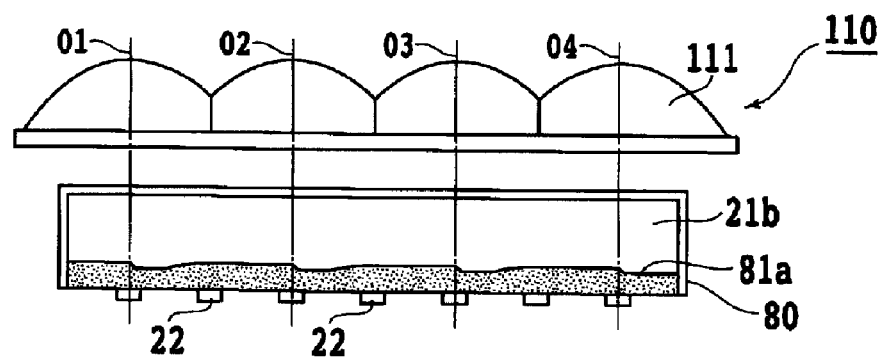
Figure 19D:
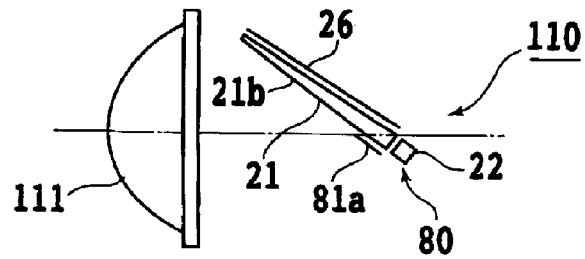
Figure 20A:
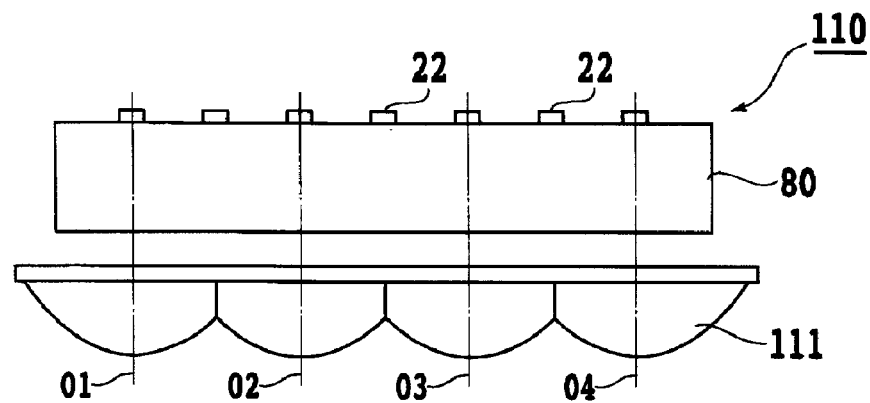
FIGS. 20A, 20B, 20C, and 20D are a schematic plan view, a schematic front view, a schematic bottom view, and a schematic cross-sectional view, respectively, showing a variation of the sixth exemplary embodiment of FIG. 15.
Figure 20B:
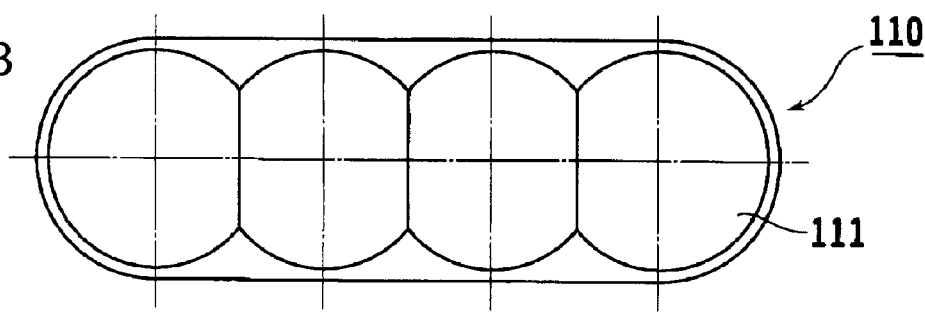
Figure 20C:
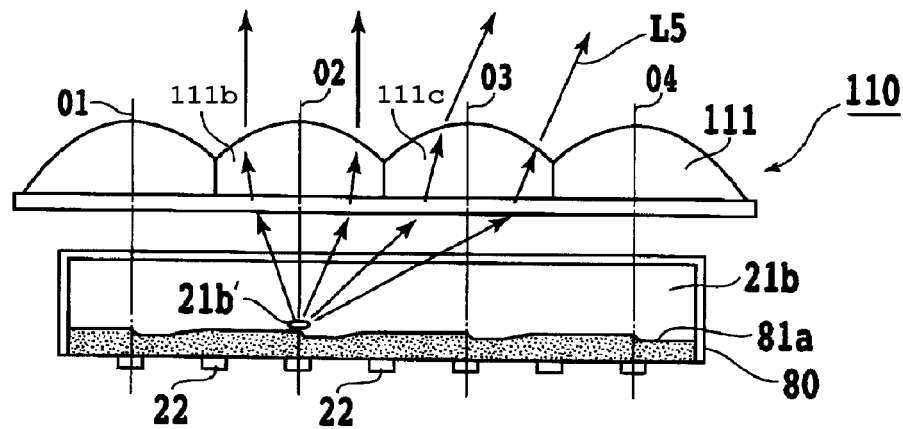
Figure 20D:
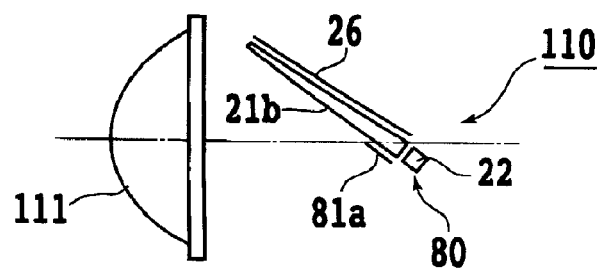

FIGS. 18A and 18B show the configuration of the vehicle headlamp according to a ninth exemplary embodiment of the presently disclosed subject matter.

In FIGS. 18A and 18B, the vehicle headlamp 100 can have the same configuration as that of the vehicle headlamp 50 shown in FIGS. 13A and 13B. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 50 of FIGS. 13A and 13B, in the vehicle headlamp 100 the light source unit 20 can have the light guide plate 21 curved to correct the spherical aberration of the projection lens 41 configured to project the image of the light emission surface 21b in accordance with the direction of the spherical aberration with respect to the horizontal direction.

The vehicle headlamp 100 having such a configuration can provide the same operation as that of the vehicle headlamp 50 shown in FIGS. 13A and 13B. In addition to this, the vehicle headlamp 100 can have the light guide plate 21 curved in a manner corresponding to the spherical aberration of the projection lens 41. Accordingly, the curvature of the light guide plate 21 can correct the spherical aberration of the projection lens 41.

This means that the light distribution pattern of light emitted from the light guide plate 21 and projected by the projection lens 41 forward in the direction of light illumination can be formed with less adverse effect of the spherical aberration of the projection lens 41.

Alternatively, taking the correction effect of the spherical aberration by the curvature of the light guide plate 21 into consideration, the projection lens can be allowed to have the spherical aberration to some extent. This means the vehicle headlamp 100 can employ relatively cheap projection lenses. This configuration thus can reduce the parts cost.

FIGS. 19A, 19B, 19C, and 19D show the configuration of the vehicle headlamp according to a tenth exemplary embodiment of the presently disclosed subject matter.

In FIGS. 19A, 19B, 19C, and 19D, the vehicle headlamp 110 can have the combined configuration of the vehicle headlamp 40 of FIGS. 11A and 11B with the light source unit 80 of FIG. 16. In these figures, the same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 40 of FIGS. 11A and 11B, the vehicle headlamp 110 can include the light source unit 80 and a projection lens 111 in place of the projection lens 11.

The projection lens 111 can have, for example, four optical axes O1, O2, O3, and O4 in place of the optical axis O in the projection lens 11 of the vehicle headlamp 40 in FIGS. 11A and 11B.

The projection lens 111 can be a collective body that includes four solids of revolution defined around the respective optical axes O1, O2, O3, and O4 (convex lens parts). In this illustrated example, the projection lens 111 can include four single convex lens portions 111a, 111b, 111c, and 111d that can be combined to partially overlap with each other.

Accordingly, the LEDs 22 of the light source unit 80 can be arranged on the respective optical axes O1, O2, O3, and O4 and at the intermediate positions between the optical axes O1, O2, O3, and O4.

The vehicle headlamp 110 having such a configuration can provide the same operation as that of the vehicle headlamp 40 shown in FIGS. 11A and 11B. The image of the light emission surface 21b of the light guide plate 21 of the light source unit 80 can be adjusted (shielded and reflected) by the reflection sheet 81a and the reflection film 26, and projected forward in the direction of light illumination by the respective convex lens portions 111a, 111b, 111c, and 111d of the projection lens 111 to thereby form the light distribution pattern.

The LEDs 22 serving as light sources can be arranged at the corresponding positions in association with the optical axes O1, O2, O3, and O4 of the respective convex lens portions 111a, 111b, 111c, and 111d. Furthermore, the areas of the light emission surface 21b intersecting with the respective optical axes O1, O2, O3, and O4 can be set to the high brightness areas. In this manner, the light from a plurality of LEDs 22 can be effectively projected forward in the direction of light illumination to form the desired light distribution pattern.

Accordingly, when compared with the vehicle headlamp 40 of FIGS. 11A and 11B, the vehicle headlamp 110 of FIGS. 19A, 19B, 19C, and 19D can provide high brightness the same degree as that obtained by the same number (four in this case) of single vehicle headlamps 40. This can easily form the light distribution pattern with high brightness, thereby achieving a desired maximum luminous intensity for a headlamp easily.

In the present exemplary embodiment, the areas intersecting with the respective optical axes O1, O2, O3, and O4 of the light emission surface 21b can serve as high brightness areas. Accordingly, when the LEDs 22 are arranged with respect to the respective optical axes O1, O2, O3, and O4, a high brightness distribution pattern can be easily formed.

In the vehicle headlamp 110 of the above configuration, as shown in FIGS. 20A, 20B, 20C, and 20D, on each of the optical axes O1, O2, O3, and O4 the LED 22 can be arranged as a light source. In this exemplary embodiment, as shown in the cross-sectional view of FIG. 20C, the light from the high brightness area 21b' on the light emission surface 21b of the light guide plate 21 formed by the LED 22 on the optical axis O2 can, for example, not only enter the corresponding convex lens portion 111b, but also can enter the adjacent convex lens portion 111c.

Figure 21:
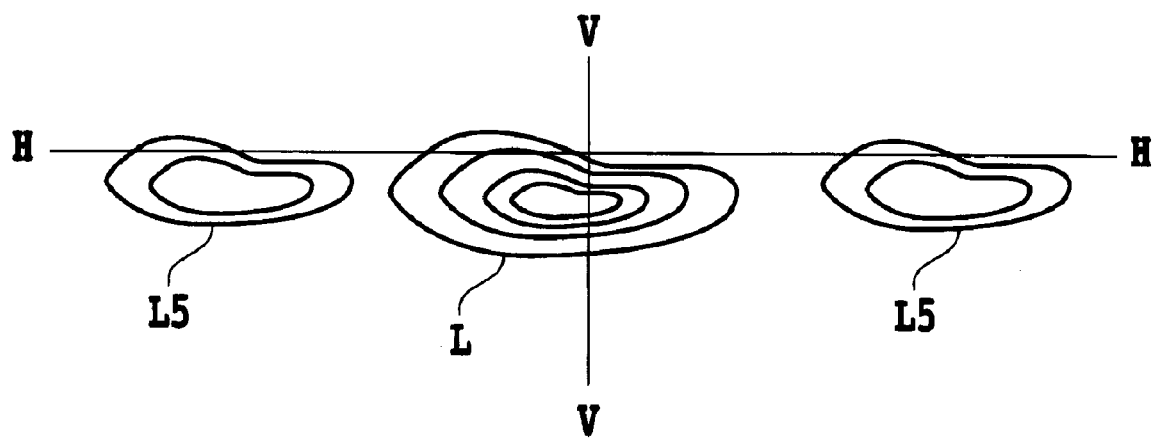
FIG. 21 is a graph showing an exemplary light distribution pattern of the vehicle headlamp of FIG. 16.

In this case, the emission light L5 from the adjacent convex lens portion 111c can deviate laterally with respect to the direction of light illumination. This can change the desired light distribution pattern to the light distribution pattern as shown in FIG. 21 in which the emission light L5 from the adjacent convex lens portion can form separate pattern L5 from the center pattern L in the shown light distribution pattern.

In view of this, the vehicle headlamp 110 of FIGS. 19A, 19B, 19C, and 19D can include additional LEDs 22 at the intermediate positions between the respective optical axes O1, O2, O3, and O4 in order to form the light distribution pattern in a continuous form.

FIGS. 22A, 22B, 22C, and 22D show the configuration of the vehicle headlamp according to an eleventh exemplary embodiment of the presently disclosed subject matter.

In FIGS. 22A, 22B, 22C, and 22D, the vehicle headlamp 120 can have a similar configuration as that of the vehicle headlamp 110 of FIGS. 19A, 19B, 19C, and 19D. In these figures, the same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 110 of FIGS. 19A, 19B, 19C, and 19D, the vehicle headlamp 120 can include separate light guide plates 81A, 81B, 81C, and 81D in association with the respective optical axes O1, O2, O3, and O4 in place of the light guide plate 21 of the light source unit 80. The LEDs 22 can be arranged on the respective optical axes O1, O2, O3, and O4.

Figure 22A:
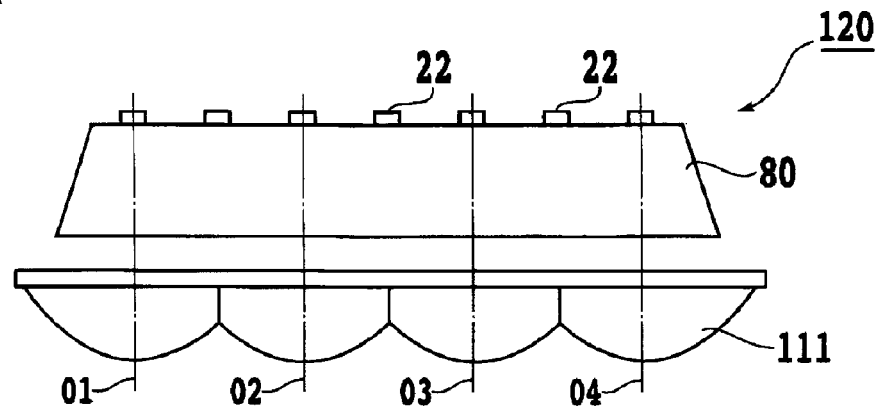
FIGS. 22A, 22B, 22C, and 22D are a schematic plan view, a schematic front view, a schematic bottom view, and a schematic cross-sectional view, respectively, showing the configuration of an eleventh exemplary embodiment of a vehicle headlamp made in accordance with principles of the presently disclosed subject matter.
Figure 22B:
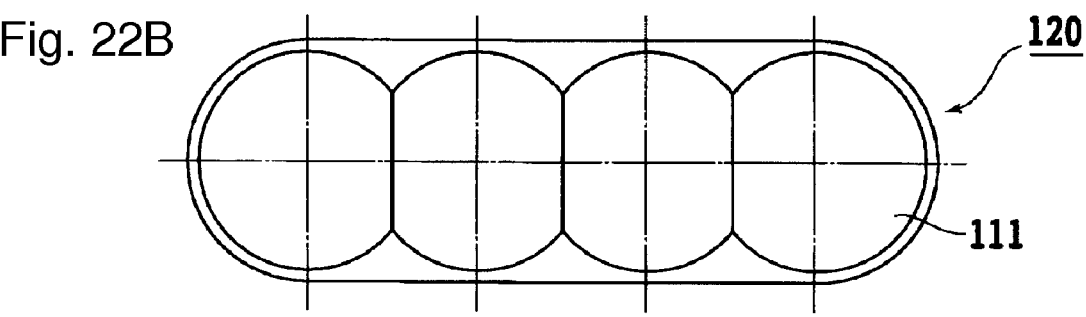
Figure 22C:
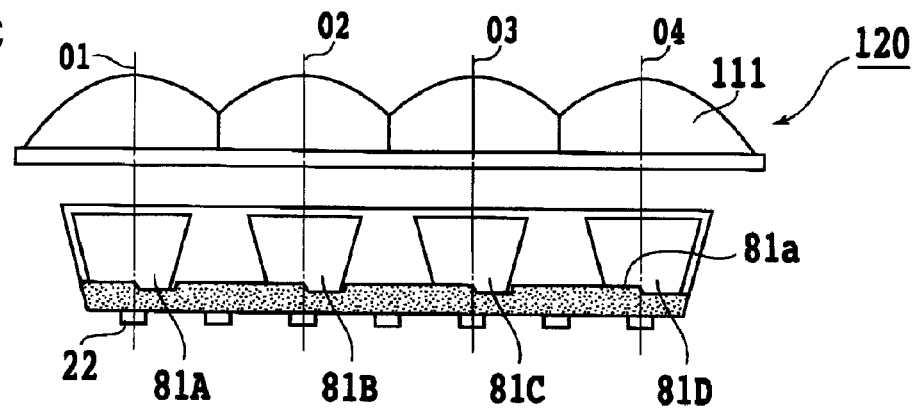
Figure 22D:
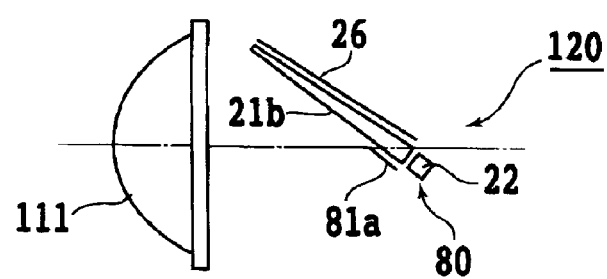

Each of the light guide plates 81A, 81B, 81C, and 81D, as shown in FIG. 22C, can be formed in the form of a trapezoid having a wider side on the light emission side than on the light source side (when viewed from the light emission surface 21b side).

The light guide plates 81A, 81B, 81C, and 81D each can have a side wall extending obliquely. In this case, the side wall can form an angle with respect to the associated optical axis O1, O2, O3, or O4 such that the light emitted from the associated LED 22 on the corresponding optical axis O1, O2, O3, or O4 enters the side wall at an angle of incidence greater than the critical angle.

When the light guide plate is formed of a common transparent resin material having a refractive index of 1.5 or so, the critical angle is approximately 40 degrees.

In this case, the light emitted from the LED 22 on the optical axis O1, O2, O3, or O4 can be totally reflected by the side wall of the corresponding light guide plate 81A, 81B, 81C, or 81D, and then guided to the corresponding convex lens portion 111a, 111b, 111c, or 111d without entering the adjacent convex lenses.

The vehicle headlamp 120 having such a configuration provides the same operation as that of the vehicle headlamp 110 shown in FIGS. 19A, 19B, 19C, and 19D. In addition to this, the light emitted from each LED 22 on the optical axis O, O2, O3, or O4 can be guided to the corresponding convex lens portion 111a, 111b, 111c, or 111d without entering the adjacent convex lenses. In this manner the light distribution pattern might not be unnecessarily spread laterally, meaning the utilization efficiency of light from LEDs 22 can be enhanced.

Figure 23:
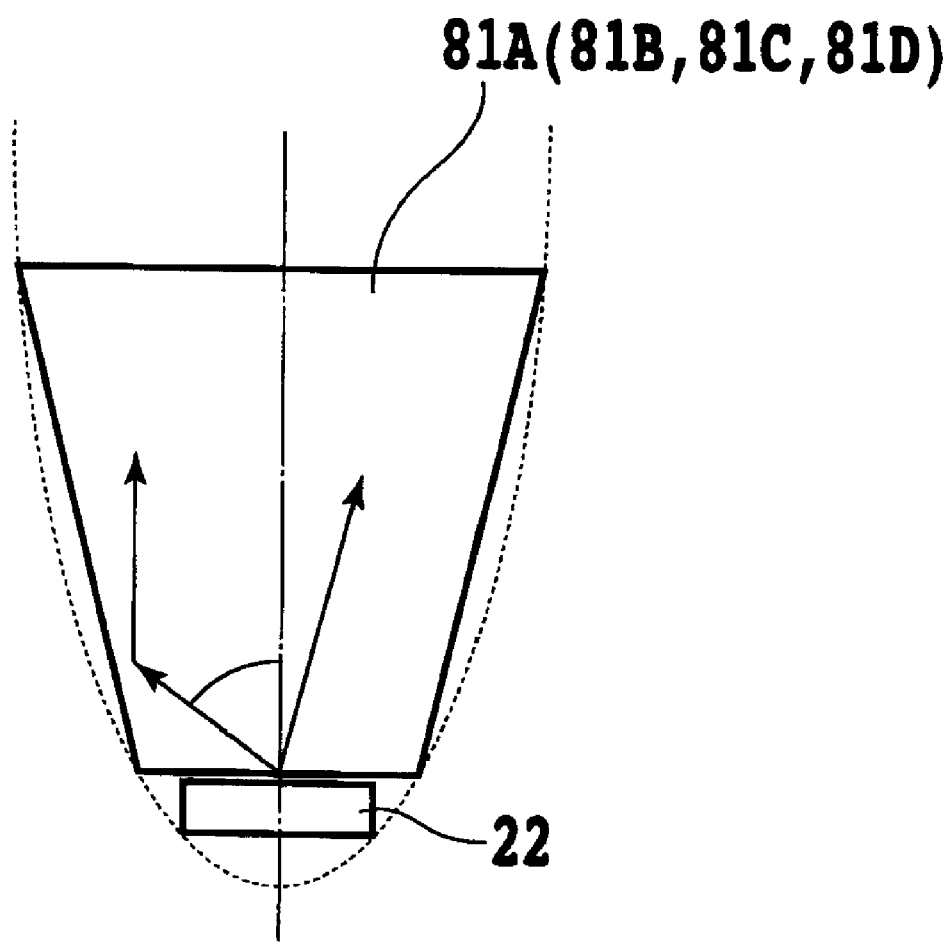
FIG. 23 is an enlarged bottom view showing the divided light guide plate part in the vehicle headlamp of FIG. 22.

FIG. 23 shows a cross-sectional view of the light guide plate 81A (81B, 81C, 81D), which has the straight side wall indicated by a solid line. Alternatively, as indicated by a dotted line in FIG. 23, the side wall can be formed to have a parabolic or elliptic cross section having a focus (or a first focus) on or near the crossing point between the light incident surface 21a and the optical axis O1 (O2, O3, O4). This configuration can guide the light after totally reflected by the side wall of the light guide plate 81A (81B, 81C, 81D) to the corresponding projection lens portion 111a (111b, 111c, 111d).

FIGS. 24A, 24B, 24C, and 24D show the configuration of the vehicle headlamp according to a twelfth exemplary embodiment of the presently disclosed subject matter.

In FIGS. 24A, 24B, 24C, and 24D, the vehicle headlamp 130 can be similar in configuration as that of the vehicle headlamp 120 of FIGS. 22A, 22B, 22C, and 22D. In these figures, the same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 120 of FIGS. 22A, 22B, 22C, and 22D, the vehicle headlamp 130 can have LEDs 22 in association with the inside optical axes O2 and O3, with the LEDs 22 being slightly shifted outward. Correspondingly to the shifted LEDs 22, the adjacent side walls of the corresponding light guide plates 81B and 81C can be inclined toward one another to define an included angle that can be greater than the included angle defined between the adjacent side walls of the light guide plates 81B and 81C of the vehicle headlamp of FIGS. 22A, 22B, 22C, and 22D.

Figure 24A:
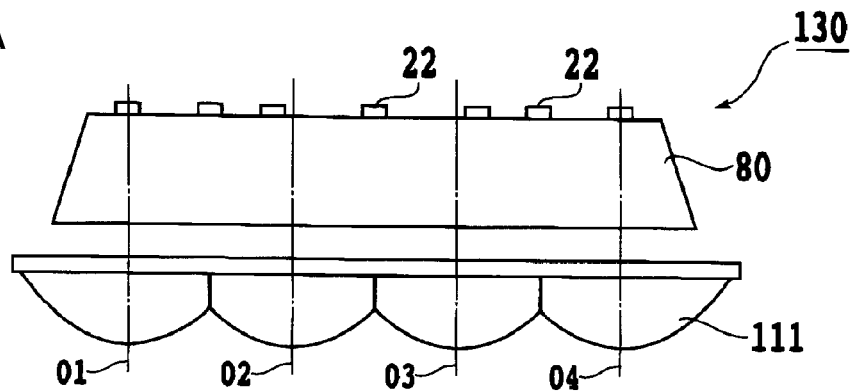
FIGS. 24A, 24B, 24C, and 24D are a schematic plan view, a schematic front view, a schematic bottom view, and a schematic cross-sectional view, respectively, showing the configuration of a twelfth exemplary embodiment of a vehicle headlamp made in accordance with principles of the presently disclosed subject matter.
Figure 24B:
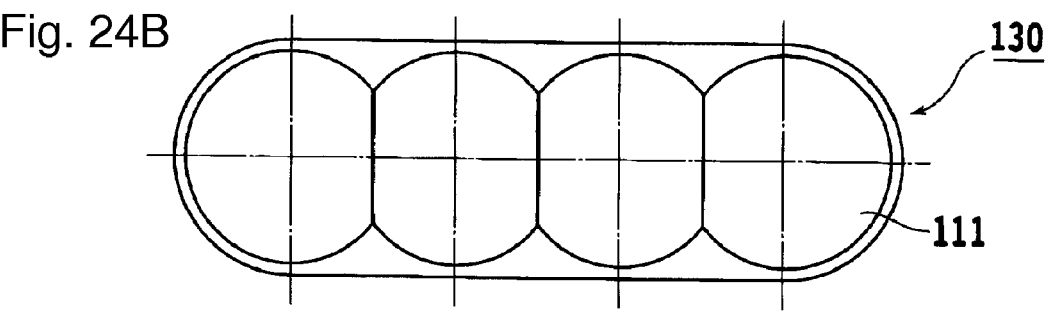
Figure 24C:
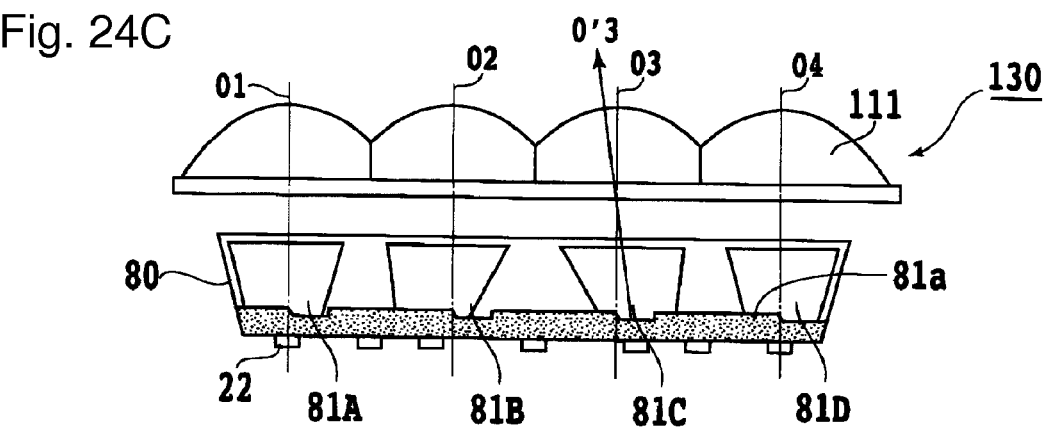
Figure 24D:
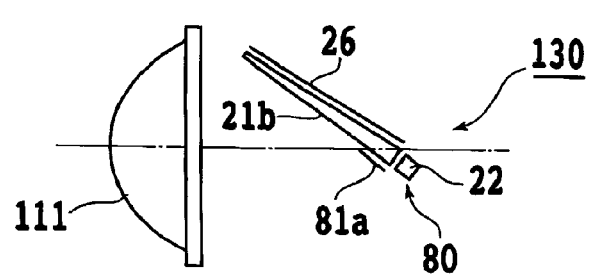
Figure 25A:
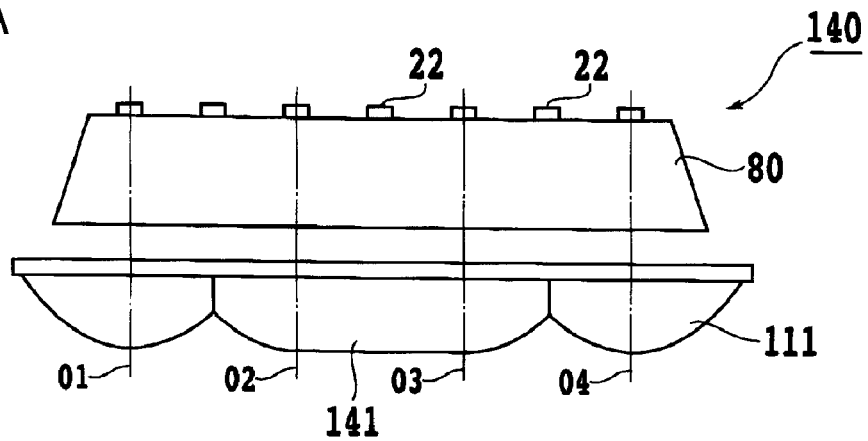
FIGS. 25A, 25B, 25C, and 25D are a schematic plan view, a schematic front view, a schematic bottom view, and a schematic cross-sectional view, respectively, showing the configuration of a thirteenth exemplary embodiment of a vehicle headlamp made in accordance with principles of the presently disclosed subject matter.
Figure 25B:
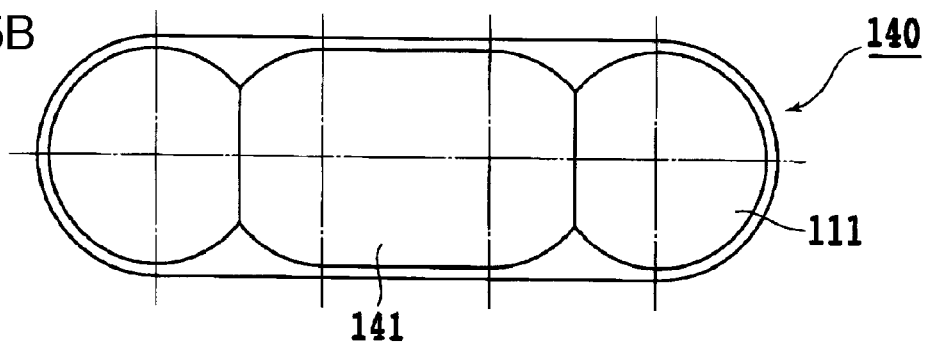
Figure 25C:
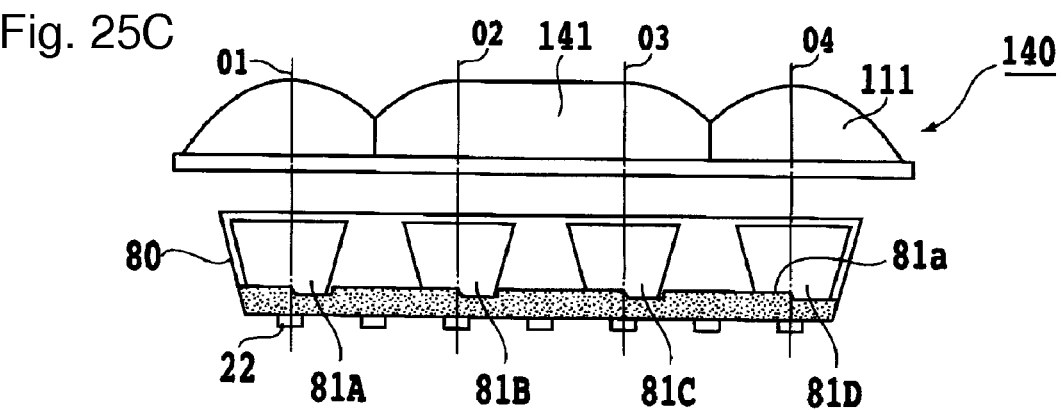
Figure 25D:
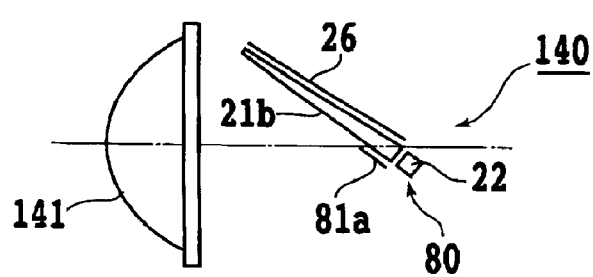
Figure 26A:
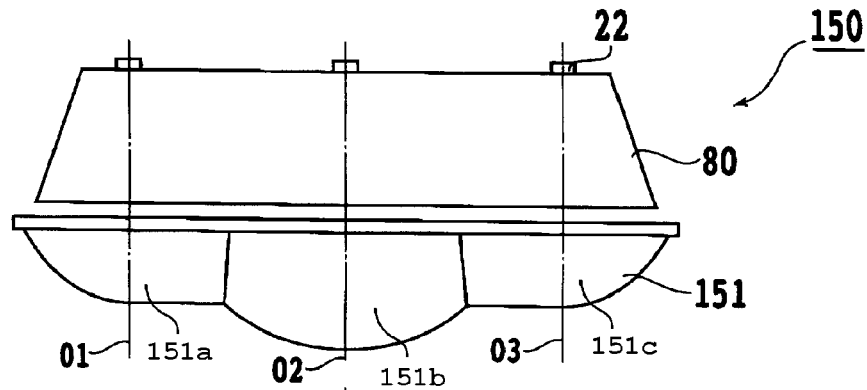
FIGS. 26A, 26B, 26C, and 26D are a schematic plan view, a schematic front view, a schematic bottom view, and a schematic cross-sectional view, respectively, showing the configuration of a fourteenth exemplary embodiment of a vehicle headlamp made in accordance with principles of the presently disclosed subject matter.
Figure 26B:
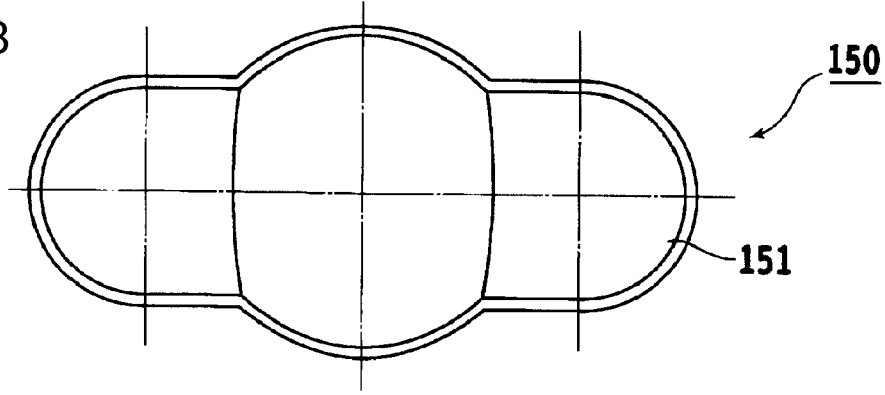
Figure 26C:
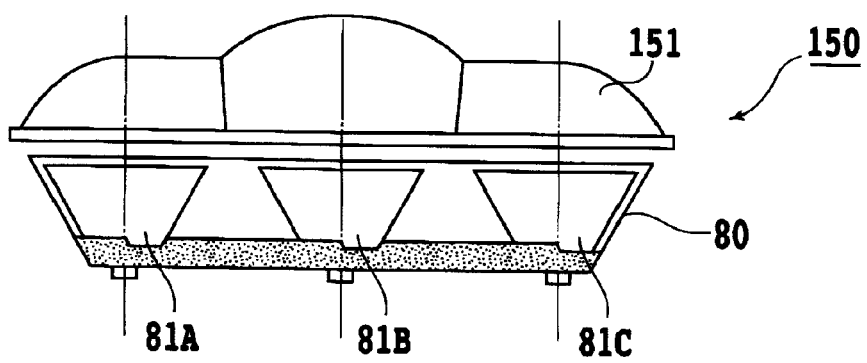
Figure 26D:
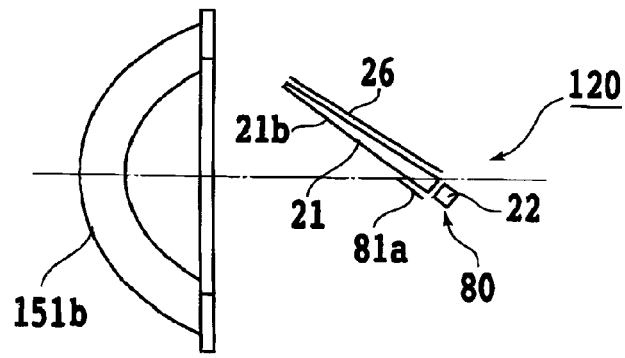

Accordingly, the actual optical axis O3' can be inclined from the center to the inside in the direction of light illumination by the shifted LED 22 and the associated light guide plate 81C specifically designed, as indicated by a solid arrow in FIG. 24C.

The vehicle headlamp 130 having such a configuration can provide the same operation as that of the vehicle headlamp 120 shown in FIGS. 22A, 22B, 22C, and 22D. In addition to this, the light emitted from each LED 22 in association with each of the optical axes O2 and O3 can be projected inwardly forward in the direction of light illumination. This configuration can form a light distribution pattern of which the center high brightness area being laterally spread by this projection lens 111.

FIGS. 25A, 25B, 25C, and 25D show the configuration of the vehicle headlamp according to a thirteenth exemplary embodiment of the presently disclosed subject matter.

In FIGS. 25A, 25B, 25C, and 25D, the vehicle headlamp 140 can have the same configuration as that of the vehicle headlamp 120 shown in FIGS. 22A, 22B, 22C, and 22D. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 120 shown in FIGS. 22A, 22B, 22C, and 22D, the vehicle headlamp 140 can have a projection lens 111 including a cylindrical lens portion 141 in place of the two convex lens portions 111b and 111c of the vehicle headlamp 120 in association with the inside optical axes O2 and O3.

The vehicle headlamp 140 having such a configuration can provide the same operation as that of the vehicle headlamp 120 shown in FIGS. 22A, 22B, 22C, and 22D. In addition to this, the light emitted from the LEDs 22 in association with the optical axes O2 and O3 can be projected forward in the direction of light illumination through the cylindrical lens portion 141. Accordingly, the light emitted from the LEDs 22 in association with the optical axes O2 and O3 might not laterally converge by convex lenses (in the previous exemplary embodiment, 111b and 111c), but can be laterally spread by the cylindrical lens portion 141. This vehicle headlamp 140 can provide a light distribution pattern laterally wider than those of the vehicle headlamp 120 of FIGS. 22A to 22D and of the vehicle headlamp 130 of FIGS. 24A to 24D.

FIGS. 26A, 26B, 26C, and 26D show the configuration of the vehicle headlamp according to a fourteenth exemplary embodiment of the presently disclosed subject matter.

In FIGS. 26A, 26B, 26C, and 26D, the vehicle headlamp 150 can have a similar configuration as that of the vehicle headlamp 120 of FIGS. 22A, 22B, 22C, and 22D. In these figures, the same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 120 of FIGS. 22A, 22B, 22C, and 22D, the vehicle headlamp 150 can have a projection lens 151 including three convex lens portions 151a, 151b, and 151c. Of these, the center convex lens portion 151b can be made larger than both the left and right convex lens portions 151a and 151c.

In this case, the projection lens 151 can have three parallel optical axes O1, O2, and O3.

In addition to this, the light source unit 80 can have three light guide plates 81A, 81B, and 81C corresponding to the optical axes O1, O2, and O3 of the respective convex lens portions 151a, 151b, and 151c of the projection lens 151.

The vehicle headlamp 150 having such a configuration can provide the same operation as that of the vehicle headlamp 120 shown in FIGS. 22A, 22B, 22C, and 22D. Namely, the light emitted from the LEDs 22 in association with the respective optical axes O1, O2, and O3 can be guided by the respective light guide plates 81A, 81B, and 81C to the projection lens 151. Then, the light entering the lens 151 can be converged by the respective convex lens portions 151a, 151b, and 151c to be projected forward in the direction of light illumination with a predetermined light distribution pattern.

In this case, since the center convex lens portion 151b can have a wider diameter than the other convex lens portions 151a and 151c, a design different from the vehicle headlamp 120 of FIGS. 22A to 22D can be provided.

As described above, the vehicle headlamps 110 to 150 as shown in FIGS. 19A to 26D can provide a plurality of high brightness areas, intersecting the respective optical axes O1, O2, O3, and O4, of the light emission surface 21b of the light guide plate 21 of the light source unit 20 or 80 by converging the light from the respective LEDs 22. Then, the light can enter the corresponding projection lens portions of the projection lens 111 (151), namely, the respective convex lens portions 111a to 111d or 151a to 151c, or the cylindrical lens portion 141 in association with the respective optical axes O1 to O4. Accordingly, even if each LED 22 can emit light with relatively low luminous intensity, the vehicle headlamp can form a high brightness light distribution pattern as a whole.

Figure 1:
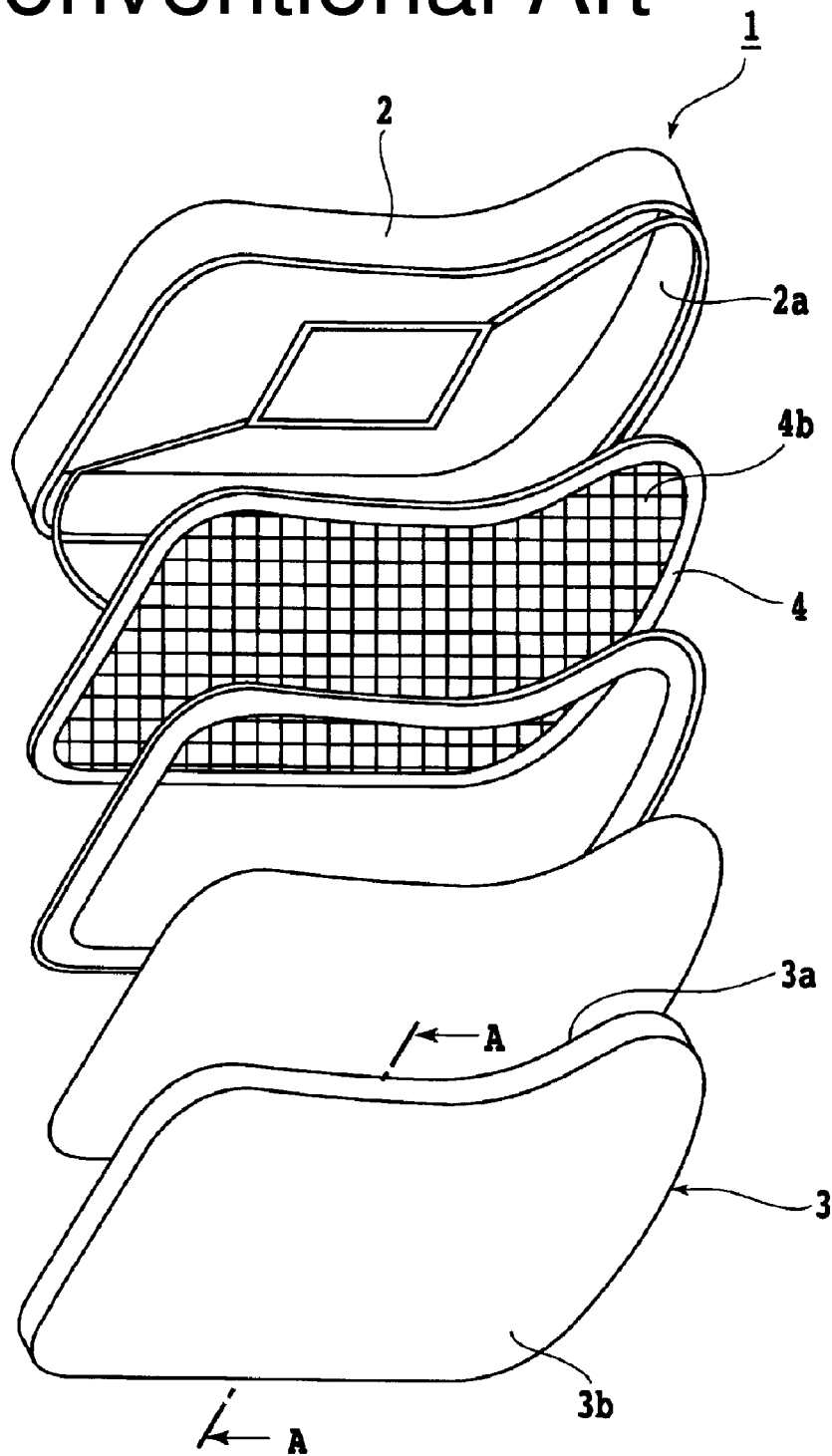
FIG. 1 is an exploded perspective view of a light source, showing an example configuration of a conventional vehicle lamp.
Figure 2:
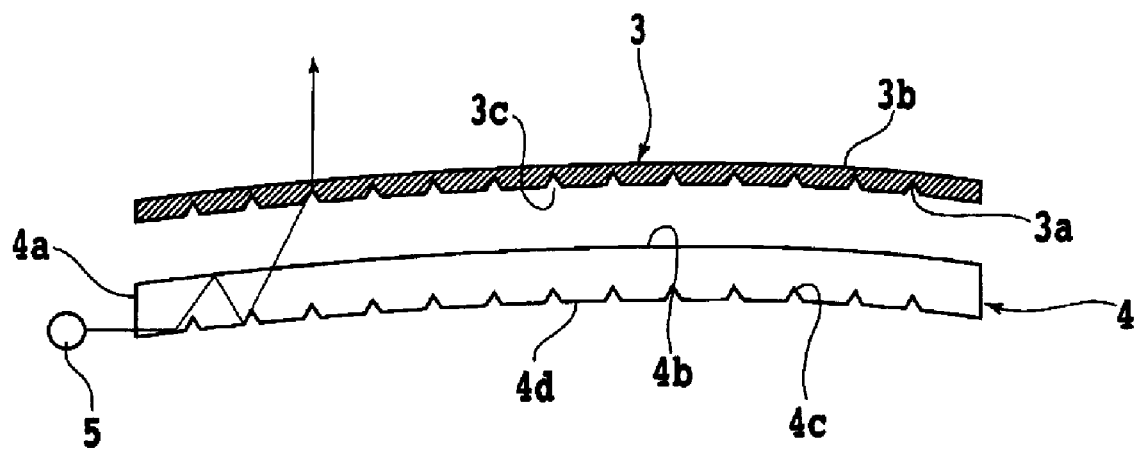
FIG. 2 is a partial cross-sectional view showing details of certain components of the vehicle lamp of FIG. 1.
Figure 3:
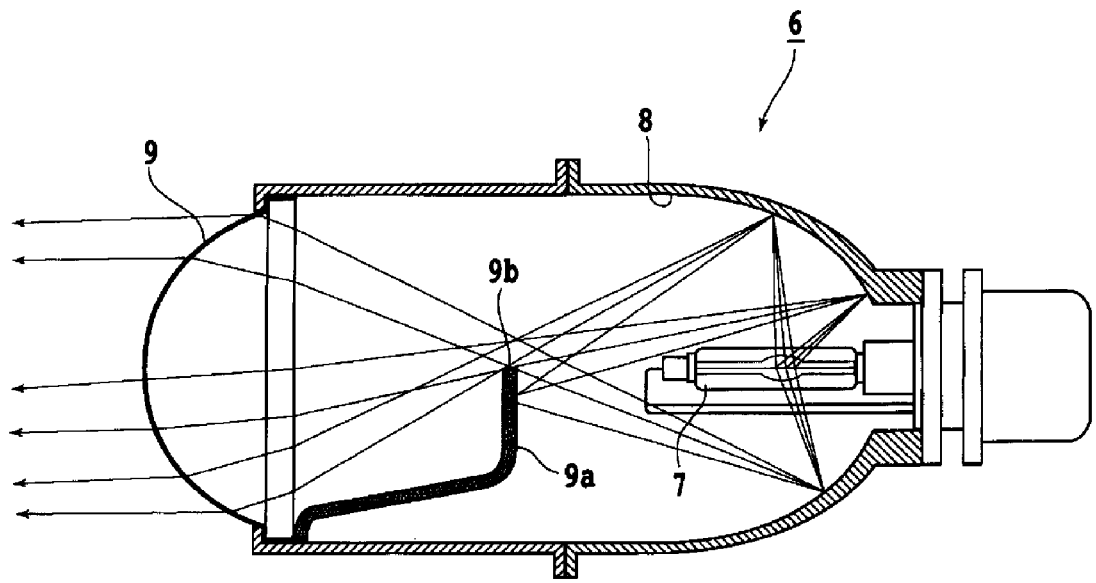
FIG. 3 is a schematic cross-sectional view showing an example configuration of a conventional headlamp.
Figure 4:
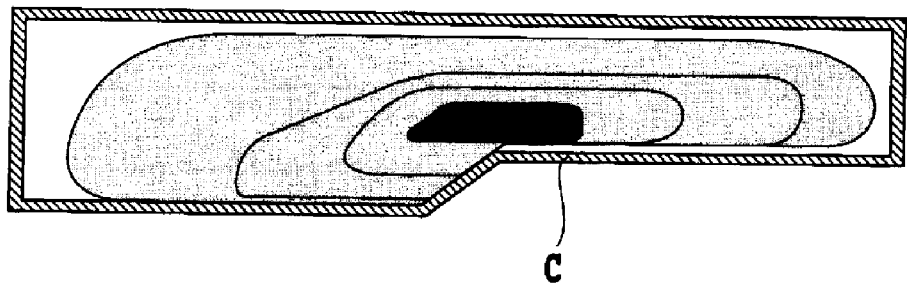
FIG. 4 is a graph showing a light distribution pattern formed by the headlamp of FIG. 3.

In the vehicle lamp 1 as disclosed in Japanese Translation of PCT Patent Application No. 2006-509343, light is scattered with the scatter pattern 4c before taken out of the light guide plate 4 as shown in FIG. 2. A light distribution pattern is formed by the plurality of separate lens patterns 3c. This can complicate the optical configuration of each individual lens pattern 3c.

For example, some lens patterns can be irradiated with the scattered light from the light guide plate 4 from peripheral areas of the lens patterns other than the focal position. This can make it extremely difficult to produce a given distribution pattern or cutoff line forward through the lens patterns 3c.

The light distribution pattern is determined by the lens patterns. This conventional vehicle lamp 1 has thus been unable to switch light distribution patterns.

When using the vehicle lamp 1 for DRL as well, the light source 5 can be either reduced in emission intensity or lighted only in part.

In either case, the light distribution control can still be effected by the cover member 3 which has the lens patterns 3c. Known vehicle headlamps have thus been unable to achieve a light distribution pattern dedicated to DRL purpose, aside from that of the traveling beam or passing-by beam.

As for the vehicle headlamps described above in accordance with the presently disclosed subject matter, the light distribution control on the light emission surface of the light guide plate can produce a light distribution pattern near the focal point of the projection lens. This light distribution pattern can be projected forward in the direction of light illumination through the projection lens. When using the vehicle headlamp for a DRL, the light source unit might also need to be either reduced in emission intensity or lighted only in part for the purpose of creating a DRL distribution pattern.

The light distribution control can still be effected by the brightness control element on the surface and/or rear surface of the light guide plate. That is, known vehicle headlamps have also been unable to achieve a light distribution pattern dedicated to DRL, different from that of the high beam or low beam.

In view of the foregoing, one aspect of the presently disclosed subject matter may be to provide a vehicle headlamp which can create a DRL distribution pattern easily with a simple configuration through the use of a light guide plate. In the description below, each embodiment of a vehicle lamp can include same or similar components of the vehicle headlamps discussed above. Accordingly, same or similar components of each of the embodiments described below will thus be designated with the same reference numerals.

Figure 27:
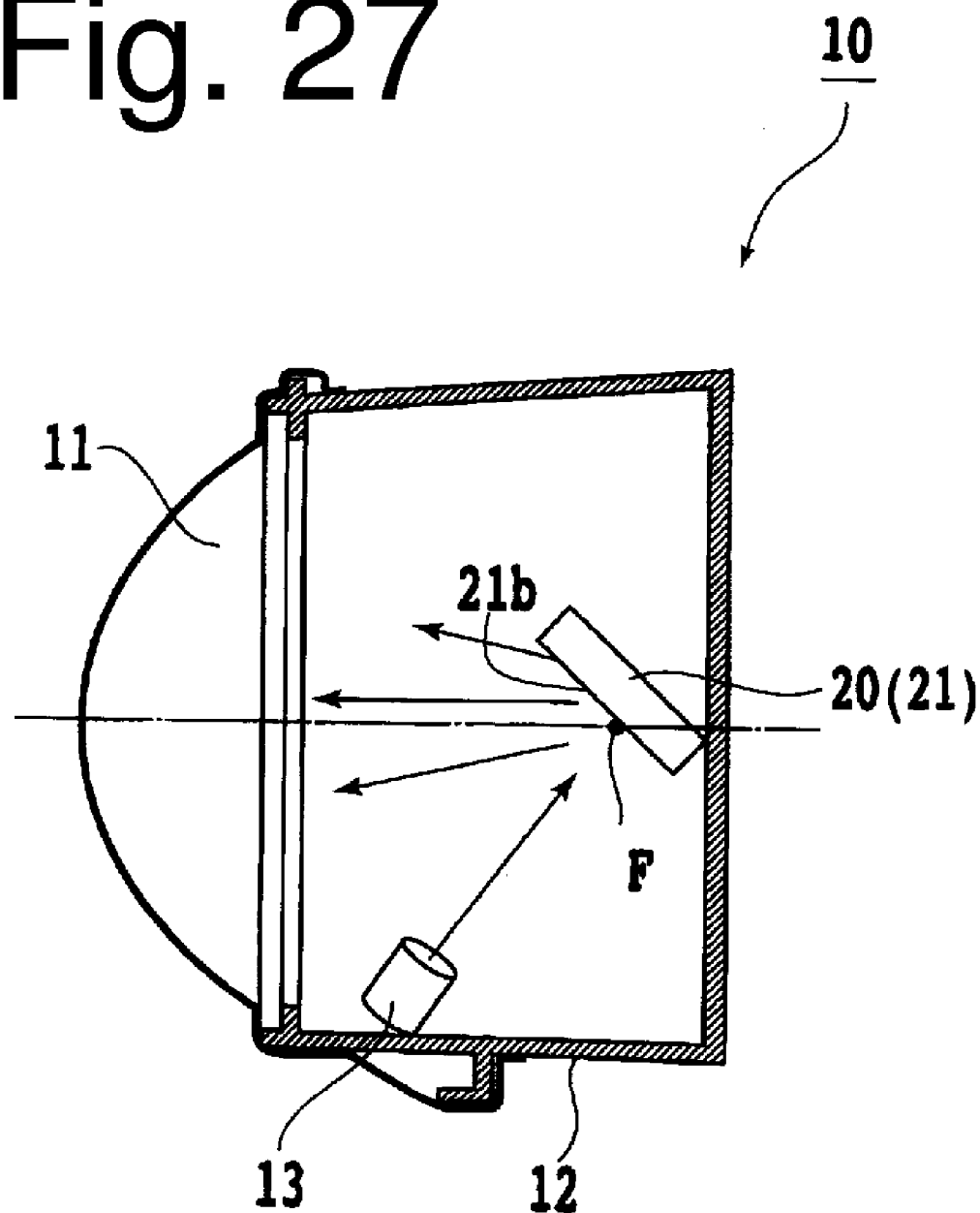
FIG. 27 is a schematic longitudinal cross-sectional view showing the configuration of a fifteenth exemplary embodiment of a vehicle headlamp made in accordance with principles of the presently disclosed subject matter.

FIG. 27 shows the configuration of a fifteenth exemplary embodiment of the vehicle headlamp according to the presently disclosed subject matter.

In FIG. 27, the vehicle headlamp 10 can include a light source unit 20, a projection lens 11 configured to converge light from the light source unit 20, a casing 12, and an additional light source 13.

The configuration of the light source unit 20 will be described later. The light source unit 20 can be arranged near the center of the rear end of the box-shaped casing 12, which is opened to the front of the vehicle headlamp 10, so as to emit light forward in the direction of light illumination.

The projection lens 11 can be made of a convex lens, and can be arranged so that its focal position F on the side of the light source unit 20 falls on the light emission surface of the light source unit 20.

Figure 28:
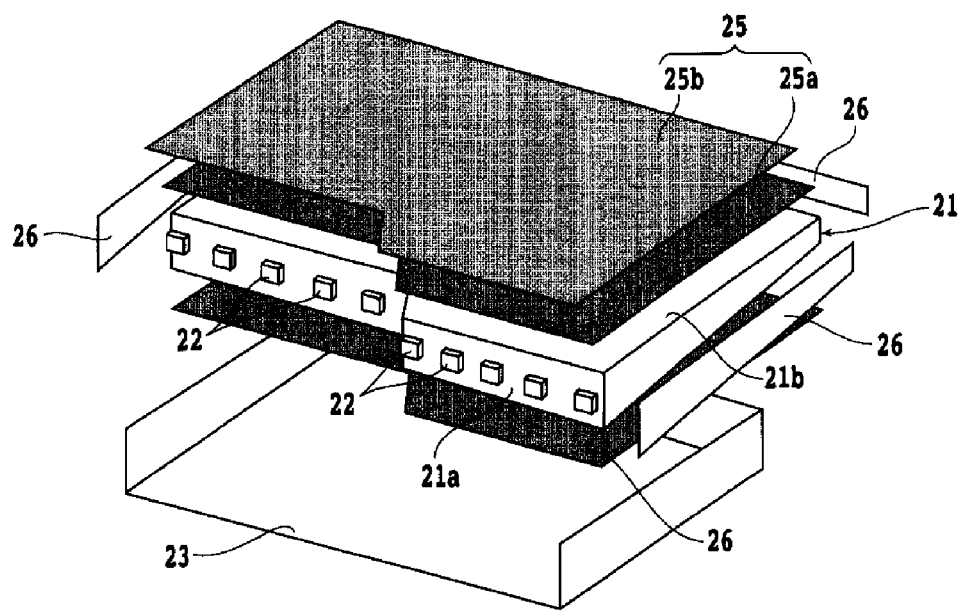
FIG. 28 is an enlarged exploded perspective view showing a light source unit in the vehicle headlamp of FIG. 27.

As shown in FIG. 28, the light source unit 20 can include a light guide plate 21 and a plurality of LEDs 22 each serving as a light source.

In the shown case, the light guide plate 21 can be formed as a flat plate made of an optically transparent material, i.e., a material that is transparent to visible light.

For example, the above light guide plate 21 can be made of glass or a transparent resin that is commonly used for optical applications, such as polycarbonate and acrylic resin.

The light guide plate 21 can have a light incident surface 21a at one end, or front end face in FIG. 28, and a light emission surface 21b at the top. The rear surface (bottom) and both the right and left sides can be covered with a casing 23 which is made of a light-shielding material.

In the shown case, the light guide plate 21 can be shaped into a wedge-like section so that it gradually decreases in thickness from the foregoing light incident surface 21a to the opposite end face. However, the presently disclosed subject matter is not limited to this, and the light guide plate 21 can be formed with a constant thickness.

For improved incidence efficiency, the light incident surface 21a of the light guide plate 21 can have a fine pattern consisting, or comprising, of rows of prismatic or circular configurations, for example. Alternatively, it may be given surface roughening.

The light emission surface 21b of the light guide plate 21 can have a prismatic or lenticular configuration for the purpose of providing enhanced brightness or well-ordered light distribution.

As shown in FIG. 28, the light emission surface 21b of the light guide plate 21 can be also shaped so as to correspond to the light distribution pattern to be projected, i.e., to a reduced inversion of this light distribution pattern. For example, the light emission surface 21b can be shaped to the cutoff pattern of a passing-by beam of the vehicle headlamp.

For that purpose, the front end face 21a of the light guide plate 21 can be formed into a step near the center as shown in FIG. 28.

Furthermore, the light guide plate 21 can also have a prism array on the rear surface (bottom). Examples of the prism array include those shown in the previous exemplary embodiments described above, and the details are not shown in the drawings hereinafter.

For example, this prism array can be formed to extend with a serrated cross section from the light incident surface 21a to the opposite end face, and in a corrugate configuration laterally.

The individual prism surfaces of the prism array can be obliquely formed so that when light enters the light guide plate 21 from the light incident surface 21a and impinges on the prism surfaces, the light is totally reflected into small angles of incidence to the emission surface.

Consequently, a large portion of the light that can enter the light guide plate 21, and repeat reflections, being totally reflected at the inner surfaces of the individual prisms of the prism array and being totally reflected at the top of the light guide plate 21.

This reflected light gradually decreases in the angle of incidence with respect to the light guide plate 21, and emerges upward from the light emission surface 21b of the light guide plate 21 when the angle of incidence falls below the critical angle.

The light source unit 20 can be obliquely arranged so that the reflected light by the prism array 24 of the light guide plate 21 is emitted from the light emission surface 21b in the direction coincident with the optical axis of the projection lens 11. In the shown case, the light source unit 20 can be inclined with the top edge forward.

The light source unit 20 can be situated so that the focal position F of the projection lens 11 on the side of the light source unit 20 comes near the position where the light incident surface 21a of the light guide plate 21 forms a cutoff line.

In order to enhance the brightness and/or adjust the light distribution characteristic of the light to be emitted from the surface, the light guide plate 21 can have an optical sheet or sheets 25 (in the shown case, two optical sheets 25a and 25b) on the surface.

Through the optical effect of the optical sheets 25, the light emitted from the light emission surface 21b of the light guide plate 21 can be adjusted in direction and in directional characteristics appropriately, whereby the light emitted from the light guide plate 21 is guided toward the projection lens 11 with reliability.

These optical sheets 25a and 25b can be prism sheets, diffusion films, or the like that are used in typical surface light source units.

The prism sheets and the diffusion sheets can be manufactured by the foregoing methods in the previous exemplary embodiment as described above.

The light guide plate 21 can also have reflecting films 26, which can be adjacent to or abutting the end face opposite from the light incident surface 21a, the rear surface, and both the right and left sides of the light guide plate 21, respectively. One feature of the reflecting films 26 can be the return of light that might leak out of the rear surface and lateral sides into the light guide plate 21, thereby improving the use efficiency of the light from the LEDs 22 serving as light sources.

The reflecting films 26 can be typically made of a film of silver or other high-reflectance metal which is deposited on the surface of a PET or other transparent resin substrate by sputtering. A high-reflectance white sheet and the like can also be used.

The high-reflectance white sheet can be manufactured employing a film or plate of polycarbonate resin or the like with a visible light diffusing and reflecting agent such as titanium oxide added thereto. It can otherwise be manufactured out of a resin film or resin plate that contains small pores dispersed by using a supercritical fluid, by micro foam molding, by foam molding with the aid of chemical foaming agents, and the like.

When the inner surfaces of the casing 23 are formed as reflecting surfaces, at least part of the inner surfaces of this casing 23 can be utilized for the reflecting films 26.

For example, in order to make the inner surfaces of the casing 23 into reflecting surfaces, a thin film of high-reflectivity metal can be deposited on the inner surfaces of the resin or metal casing 23 directly by vacuum deposition or sputtering.

The LEDs 22 can be opposed to the light incident surface 21a of the light guide plate 21 in a row.

The LEDs 22 need not be arranged at regular intervals, but can be arranged at appropriate intervals along the light incident surface 21a of the light guide plate 21 so that the light emission surface 21b of the light guide plate 21 can produce a predetermined brightness distribution.

While the LEDs 22 are arranged in a single row in the shown example, they are not limited to this arrangement but can be arranged in a plurality of rows.

The additional light source 13 can be an LED or other light source device. The additional light source 13 can be arranged between the light source unit 20 and the projection lens 11, in front of and below the light source unit 20 so that its optical axis can cross the surface of the light guide plate 21 near the focal position of the projection lens 11 on the side of the light source unit 20.

The light emitted from the additional light source 13 can travel along the optical axis, and impinge on the projection-lens-side surface of the light source unit 20. The light incident on the light emission surface 21b can enter the light guide plate 21 of the light source unit 20. Some portion of the light can be totally reflected by a brightness control element on the rear surface of the light guide plate 21. The remaining large portion of the light can be refracted and transmitted through the brightness control element on the rear surface, and reflected by the reflecting film 26 on the rear surface of the light source unit back into the light guide plate. The return light can be refracted and transmitted through the light emission surface 21b to form a second brightness distribution, and projected forward in the direction of light illumination through the projection lens 11.

The light source unit 20 can be arranged to be inclined forward. The light coming from the additional light source 13 arranged in front of and below the light source unit 20 can thus be reflected by the light source unit 20 and projected forward in the direction of light illumination without being shielded by the additional light source 13.

For example, the additional light source 13 is can be made of an LED lamp having a molded or other built-in lens so that the light can converge into a horizontally oblong rectangular or elliptic beam based on the lens shape.

Irradiated with the horizontally-oblong converged beam, the light source unit 20 can produce the second brightness distribution, which can be projected forward as part of a light distribution pattern in the direction of light illumination through the projection lens 11. The additional light source 13 of this configuration can thus be used to achieve, for example, a European standard DRL distribution pattern which is bright at the center and is wider horizontally than vertically.

The vehicle headlamp 10 according to the present exemplary embodiment has the above configuration. A description will initially be given of the case where it is used as an ordinary vehicle headlamp for an ordinary low beam or the like.

In this case, a drive voltage is applied to the LEDs 22 of the light source unit 20 from a not-shown external drive circuit. The LEDs 22 are thereby driven to emit light. The additional light source 13 is not driven at this time.

The light emitted from the LEDs 22 can enter the light guide plate 21 through the light incident surface 21a. The light can be totally reflected at the surface, rear surface, and both lateral sides of this light guide plate 21 and is returned into the light guide plate 21 by the reflecting films 26 repeatedly before emitted toward the projection lens 11 from the light emission surface 21b.

This configuration can diffuse the incident light inside the light guide plate 21, substantially across the entire interior of the light guide plate 21, so that the entire light emission surface 21b of the light guide plate 21 emits light.

In addition, the prism array can be formed on the rear surface. This can allow the incident light from the light incident surface 21a of the light guide plate 21 to reach the light emission surface 21b efficiently so that the light emission surface 21b emits light with higher brightness.

The emission shape on the light emission surface 21b of this light guide plate 21 can be projected forward in the direction of light illumination through the projection lens 11.

The emission shape on this light emission surface 21b can be magnified and inverted when projected forward in the direction of light illumination.

As shown in FIG. 28, the light emission surface (top surface) of the light guide plate 21 can be shaped to the cutoff pattern at the edge on the side of the light incident surface 21a. This can create the emission shape corresponding to the light distribution pattern that is suitable for the low beam of the vehicle headlamp.

Accordingly, this emission shape can be projected forward in the direction of light illumination through the projection lens 11, whereby the light distribution pattern suitable for the low beam of the vehicle can be formed.

The light emission surface 21b of the light guide plate 21 in the light source unit 20 has the emission shape corresponding to the light distribution pattern. This can eliminate the need for a reflecting surface configured to create a light distribution pattern or a light shielding member configured to form the cutoff line as in vehicle headlamps of conventional projector type.

Consequently, the entire vehicle headlamp 10 can be significantly reduced in length in the front-to-rear direction, so that it can be configured with a smaller size and lighter weight.

The absence of need for the light shielding member can contribute to a small parts count, with a significant reduction in parts cost and assembly cost.

The light emission surface 21b of the light guide plate 21 can be shaped to the cutoff pattern at the side of the incident surface 21a. This can make it possible for the light emission surface 21b to provide high brightness at the side of the light incident surface 21a easily.

As a result, the cutoff line or bright-dark boundary of the light distribution pattern formed on the side of this light incident surface 21a can be projected clearly with high brightness.

The LEDs 22 can be arranged at smaller intervals in the area where higher brightness is desired in the light distribution pattern. This can facilitate providing high brightness.

A description will now be given of the case where the vehicle headlamp 10 is used as a DRL.

The additional light source 13 can be driven to emit light. The light emitted from the additional light source 13 can be reflected by the light source unit. The reflected light can be transmitted through the projection lens 11 to travel forward in the direction of light illumination.

In this instance, the reflected light can be converge by the projection lens 11 and projected forward in the direction of light illumination with a DRL distribution pattern.

This DRL distribution pattern can be formed by the lens shape of the additional light source 13 and the brightness control element of the light guide plate 21. The light can be then projected in the light distribution pattern optimum for DRL, different from that of ordinary vehicle headlamps.

Figure 29:
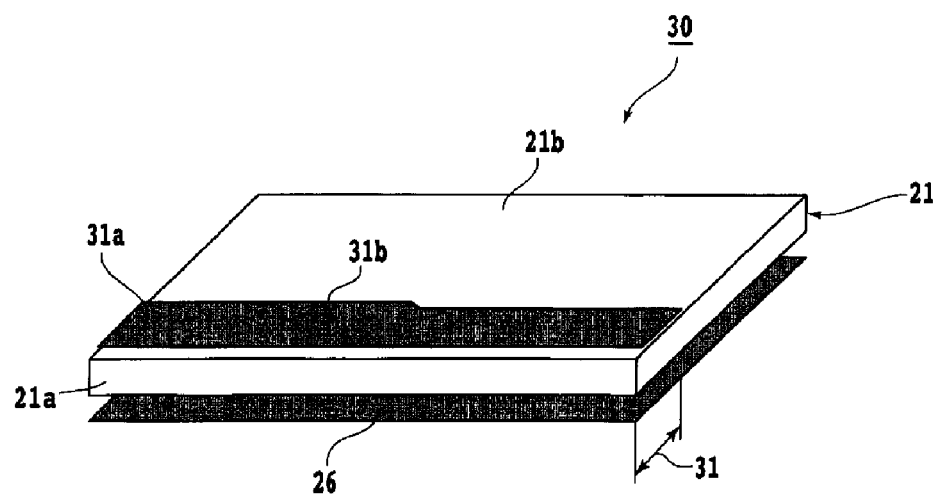
FIG. 29 is a schematic perspective view showing the light source unit in a sixteenth exemplary embodiment of a vehicle headlamp made in accordance with principles of the presently disclosed subject matter.

FIG. 29 shows the configuration of the light source unit of the vehicle headlamp according to a sixteenth exemplary embodiment of the presently disclosed subject matter. In this drawing, some components being the same or similar components as those in the previous exemplary embodiments are omitted in the drawings (for example, LEDs 22).

In FIG. 29, the vehicle headlamp has the same configuration as that of the vehicle headlamp shown in FIG. 27 except that the light source unit 30 can be substituted for the light source unit 20.

When compared with the light source unit 20 shown in FIG. 28, this light source unit 30 has a light emission surface 21*b* that is not shaped to have the cutoff pattern. Instead, a light guide part 31 with a predetermined width can be formed in the edge area on the side of the light incident surface 21*a*.

This light guide part 31 can be formed by a reflection sheet 31*a* which is placed on the surface of the light guide plate 21 in that area. The reflection sheet 31*a* can have a reflecting surface not only on the side in contact with the light guide plate 21 but also on the projection lens side.

This reflection sheet 31*a* can be shaped to have the cutoff line at the edge 31*b* opposite from the light incident surface 21*a*.

The reflection sheet 31*a* can be covered with a retainer casing (not shown). In this case, the projection lens side of the casing can also be shaped the same as the edge 31*b* is, at the edge opposite from the light incident surface 21*a*. The casing can also have a reflecting surface on the projection lens side.

According to the light source unit 30 of the vehicle headlamp having such configuration, the light that enters the light guide plate 21 through the light incident surface 21*a* can be reflected repeatedly in the light guide part 31, between the rear surface of the light guide plate 21 or the reflecting film 26 and the reflection sheet 31*a*. As a result, the incident light can be sufficiently diffused inside the light guide plate 21, in the horizontal directions in particular. This can reduce brightness variations ascribable to the distances between the LEDs 22, and a desired cutoff pattern can be formed by the outline of the edge 31*b* of the reflection sheet 31*a*.

In this case, the surface 21*b* of the light guide plate 21 and the reflecting film 26 need not be shaped to have this cutoff line.

Figure 30:
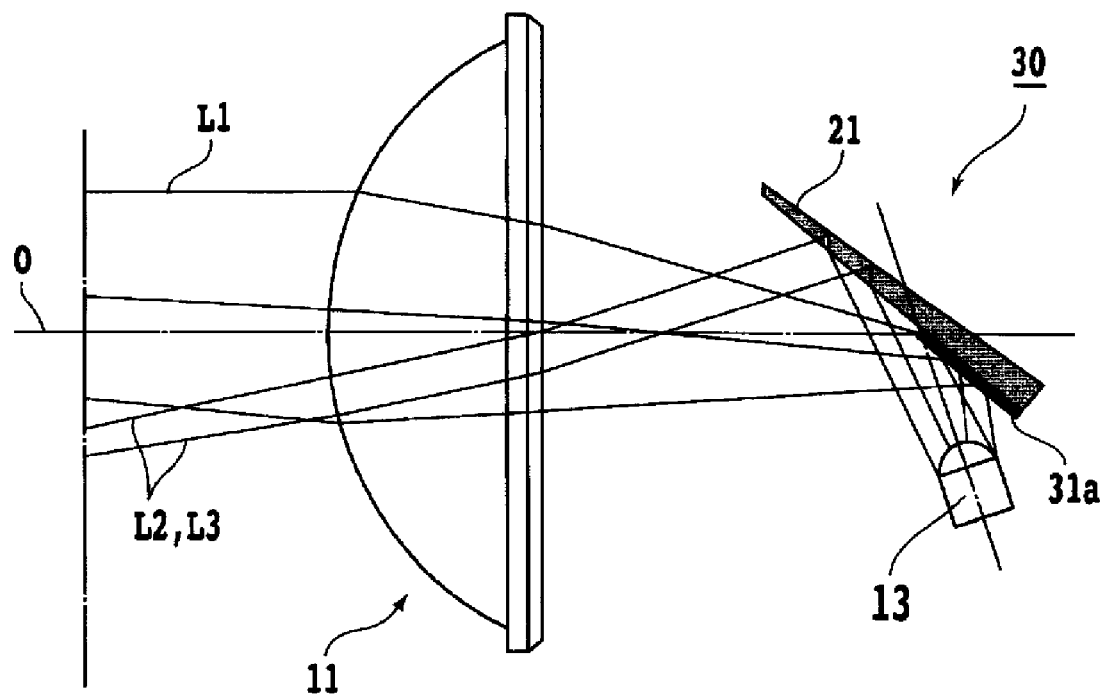
FIG. 30 is a ray tracing diagram of the vehicle headlamp of FIG. 29 when used as a DRL.

FIG. 30 is a diagram for explaining the ray traces of the additional light source 13 in the present exemplary embodiment. The light source unit 30 can be inclined toward the light incident-surface side of the projection lens so that the focal position of the projection lens 11 falls on the edge 31*b* of the reflection sheet, which forms the cutoff line of the passing-by beam, and so that the maximum luminous intensity of the passing-by beam from the light guide plate coincides with the optical axis.

The additional light source 13 can be obliquely arranged under the light source unit 30 so that the optical axis of the additional light source 13 passes near the focal point of the projection lens 11.

Light L1 emitted from the additional light source 13 can initially impinge on the reflection sheet 31*b* of the light source unit 30 or the casing which retains the same. This light L1 can be regularly reflected at the reflection sheet 31*b* or the surface of the casing, and can be focused and projected through the projection lens 11 as a light beam above the cutoff line. Light L2 emitted from the additional light source 13 can initially impinge on the light emission surface 21*b* of the light source unit 30. This light L2 can enter once the light guide plate 21, can be reflected by the reflection film 26, and can emerge from the light emission surface 21*b* again. The emitted light can be in a direction different from that of regular reflection due to the effect of the brightness control element. The resulting second pattern appearing on the light source unit can be converged and projected through the projection lens 11 as a light beam below the cutoff line. The combination of L1 and L2 can provide forward illumination of a vertically-continuous second light distribution pattern.

As mentioned previously, the second light distribution pattern can be determined by the illumination distribution with which the additional light source 13 irradiates the light source unit 30. When using a single additional light source 13, it can be possible to irradiate the light source unit 30 with an illumination distribution corresponding to the reduced inversion of the horizontally-wide DRL distribution pattern if the additional light source 13 is made of an LED having a semi-elliptic top, for example. Two or more additional light sources 13 can be used.

In the following exemplary embodiments, light source units designated by the reference numeral 20 shall also cover the structures of the light source units 30 and 100 of FIGS. 29 and 37.

Figure 31A:
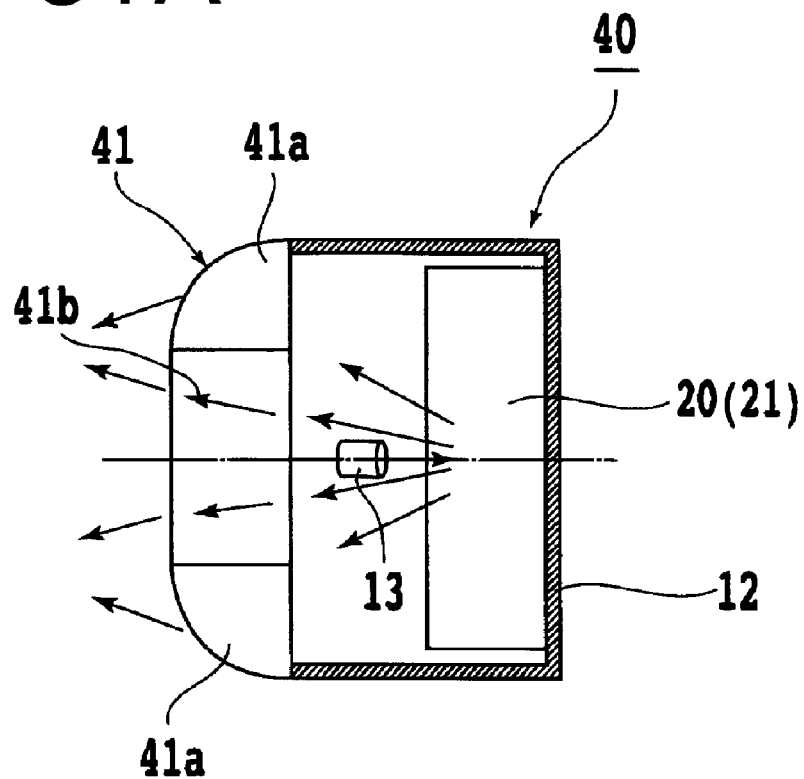
FIGS. 31A and 31B are a schematic cross-sectional view and a schematic longitudinal cross-sectional view, respectively, showing the configuration of a seventeenth exemplary embodiment of a vehicle headlamp made in accordance with principles of the presently disclosed subject matter.
Figure 31B:
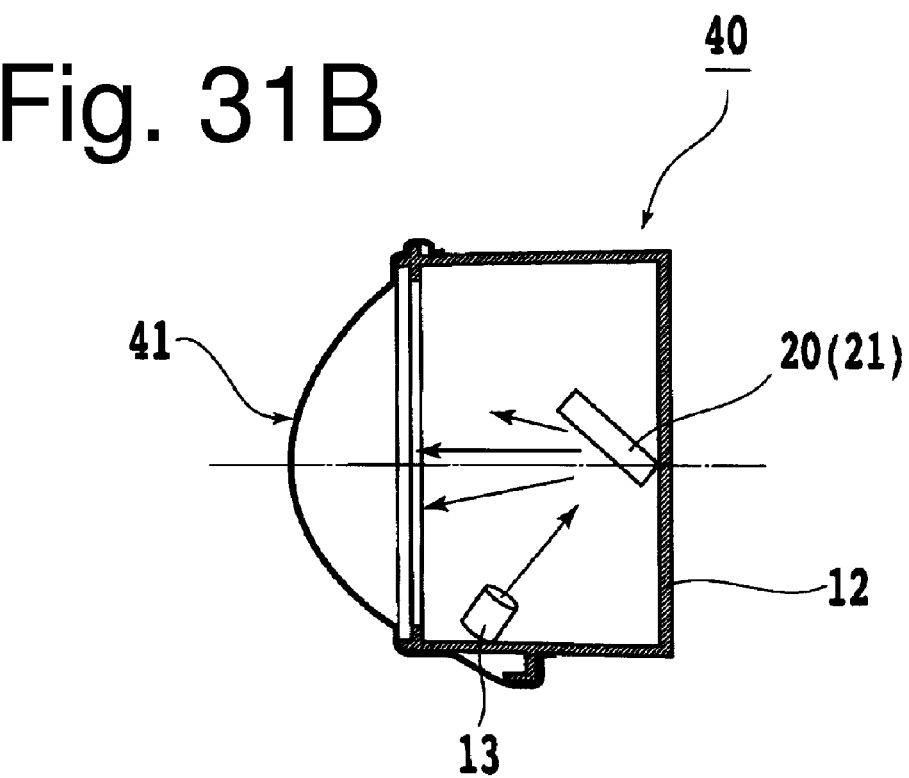

FIGS. 31A and 31B show a seventeenth exemplary embodiment of the vehicle headlamp according to the presently disclosed subject matter.

In FIGS. 31A and 31B, the vehicle headlamp 40 can have a similar configuration as that of the vehicle headlamp 10 shown in FIGS. 27 and 28. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

One difference can be that the vehicle headlamp 40 can have a projection lens 41 of laterally oblong shape corresponding to the laterally long light source unit 20, in place of the projection lens 11.

As shown in FIG. 31A, the projection lens 41 can include two convex lenses 41*a* and a cylindrical lens 41*b*. The convex lenses 41*a* can be formed by splitting the foregoing projection lens 11, i.e., a convex lens into two at the center, and separated from each other according to the lateral length of the light guide plate 21. The cylindrical lens 41*b* can connect these two convex lenses 41*a*.

The vehicle headlamp 40 having such a configuration can provide the same operation as that of the vehicle headlamp 10 shown in FIGS. 27 and 28.

Since the projection lens 41 can include the cylindrical lens 41*b* with a laterally long incident surface, it can form a horizontally wide light distribution pattern.

For the purpose of providing a DRL distribution, the additional light source 13 therefore need not irradiate the light source unit 20 with a horizontally wide pattern but can illuminate it with a dome-topped LED, for example. The cylindrical lens 41*b* of horizontally wide shape can have the effect of high incidence efficiency. In addition, the dome-shaped LED can be typically inexpensive when compared to the LED of semi-elliptic shape which has been described in the previous exemplary embodiment.

The light incident on the cylindrical lens 41*b* can be somewhat diffused in the horizontal directions, forming a horizontally wide distribution pattern. This can suppress brightness variations in the distribution pattern ascribable to the distances between the LEDs.

As with the predetermined light distribution pattern, this effect also can apply to the second light distribution pattern formed by the additional light source 13.

The light incident on the convex lenses 41*a* at both right and left ends of the projection lens 41 can be refracted horizontally inward and projected forward in the direction of light illumination. This can increase the luminous intensity at and near the center of the light distribution pattern.

As with the predetermined light distribution pattern, this effect also can apply to the second light distribution pattern formed by the additional light source 13.

Figure 32A:
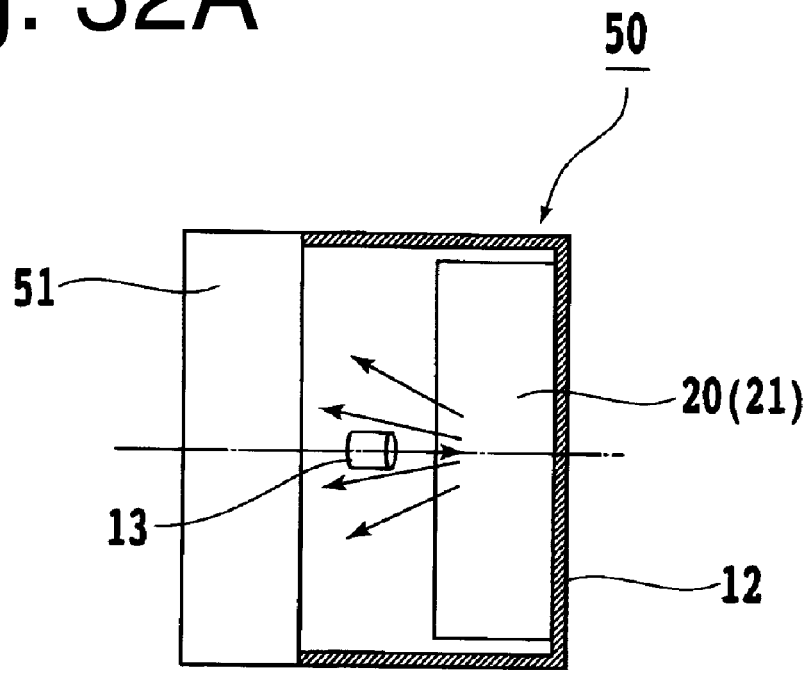
FIGS. 32A and 32B are a schematic cross-sectional view and a schematic longitudinal cross-sectional view, respectively, showing the configuration of a eighteenth exemplary embodiment of a vehicle headlamp made in accordance with principles of the presently disclosed subject matter.
Figure 32B:
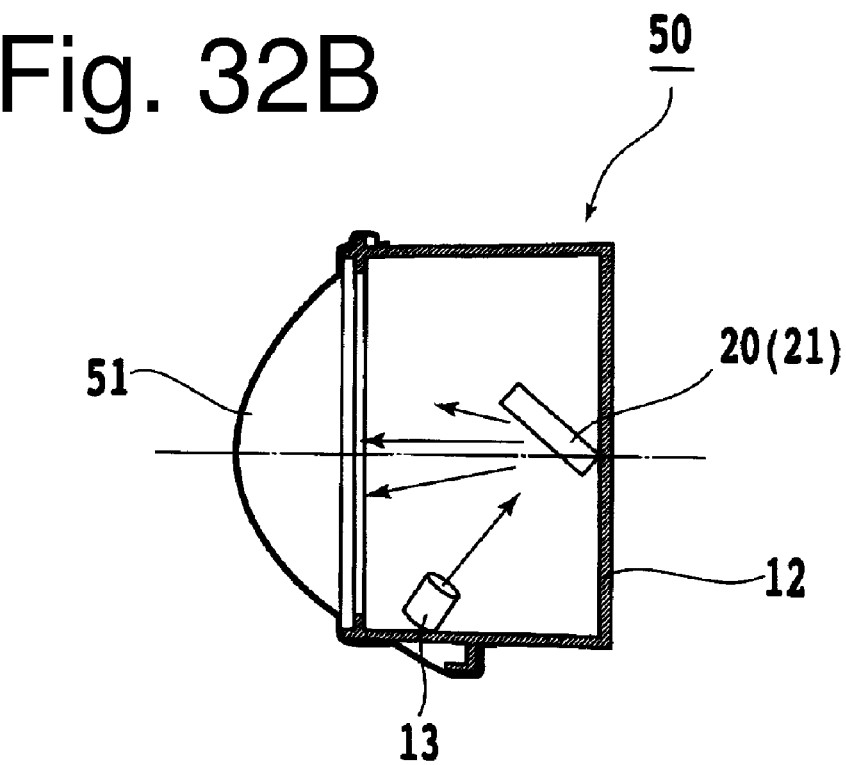

FIGS. 32A and 32B show the configuration of an eighteenth exemplary embodiment of a vehicle headlamp according to the disclosed subject matter.

In FIGS. 32A and 32B, the vehicle headlamp 50 can have a similar configuration as that of the vehicle headlamp 40 shown in FIGS. 31A and 31B. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 40 shown in FIGS. 31A and 31B, this vehicle headlamp 50 can include a projection lens 51 in place of the projection lens 41.

The projection lens 51 can include a single cylindrical lens having an axis extending horizontally.

The vehicle headlamp 50 having such configuration can provide the same operation as that of the vehicle headlamp 40 shown in FIGS. 31A and 31B.

The projection lens 51 can lack a convex lens near either right or left end. Light emitted to the right and left from the light guide plate 21 might therefore not converge to near the center of the light distribution pattern by convex lenses but can be reflected laterally inward by internal reflection, contributing to the formation of the light distribution pattern.

This can make it possible to provide a desired light distribution pattern for a fog lamp and the like where the maximum luminous intensity is not of particular significance.

Even in this exemplary embodiment, the additional light source intended for a DRL distribution need not irradiate the light source unit 20 with a horizontally wide pattern but can illuminate it with, for example, a dome-topped LED as in the previous exemplary embodiment.

Figure 33A:
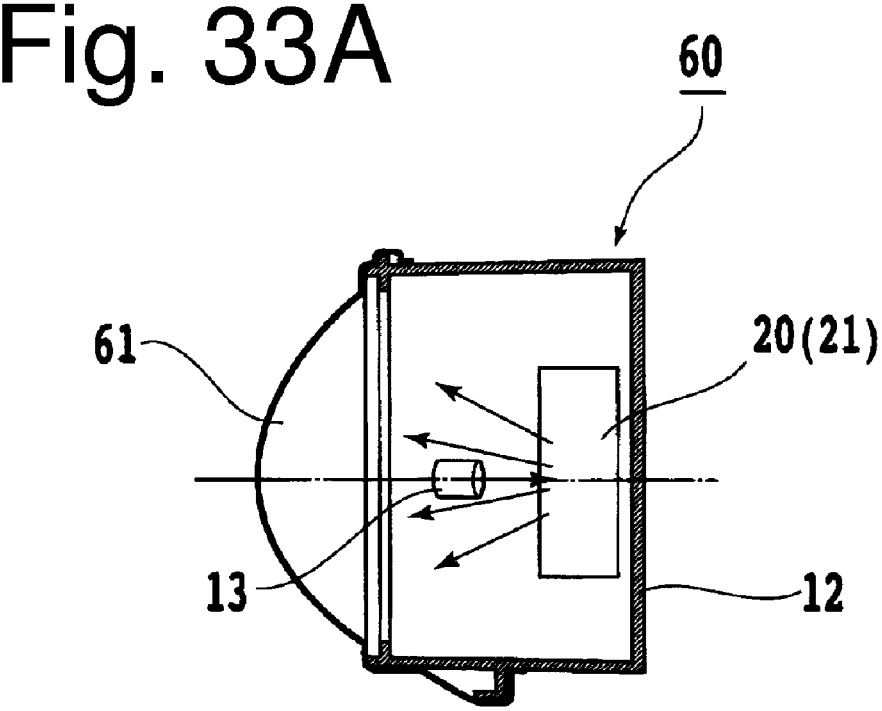
FIGS. 33A and 33B are a schematic cross-sectional view and a schematic longitudinal cross-sectional view, respectively, showing the configuration of a nineteenth exemplary embodiment of a vehicle headlamp made in accordance with principles of the presently disclosed subject matter.
Figure 33B:
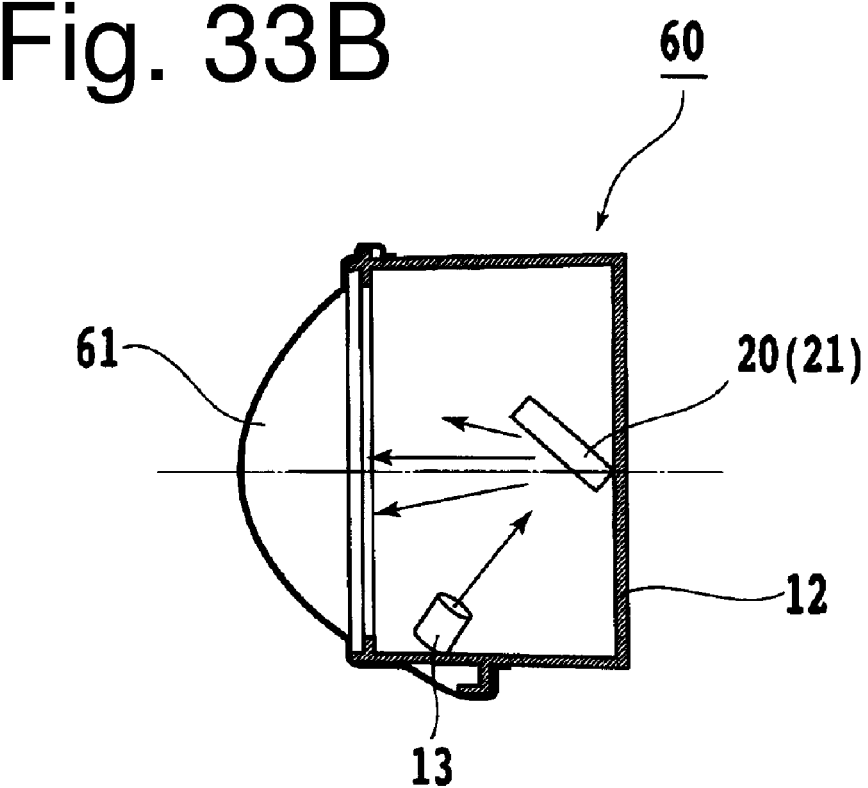

FIGS. 33A and 33B show the configuration of a nineteenth exemplary embodiment of the vehicle headlamp according to the presently disclosed subject matter.

In FIGS. 33A and 33B, the vehicle headlamp 60 can have a similar configuration as that of the vehicle headlamp 40 shown in FIGS. 31A and 31B. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 40 shown in FIGS. 31A and 31B, this vehicle headlamp 60 can include a projection lens 61 in place of the projection lens 41.

The projection lens 61 can be made of a single convex lens.

This exemplary embodiment shows a most basic configuration of the presently disclosed subject matter.

The vehicle headlamp 60 having such configuration can provide the same operation as that of the vehicle headlamp 40 shown in FIGS. 31A and 31B.

The use of a single convex lens for the projection lens 61 can suppress the lens cost.

Figure 34:
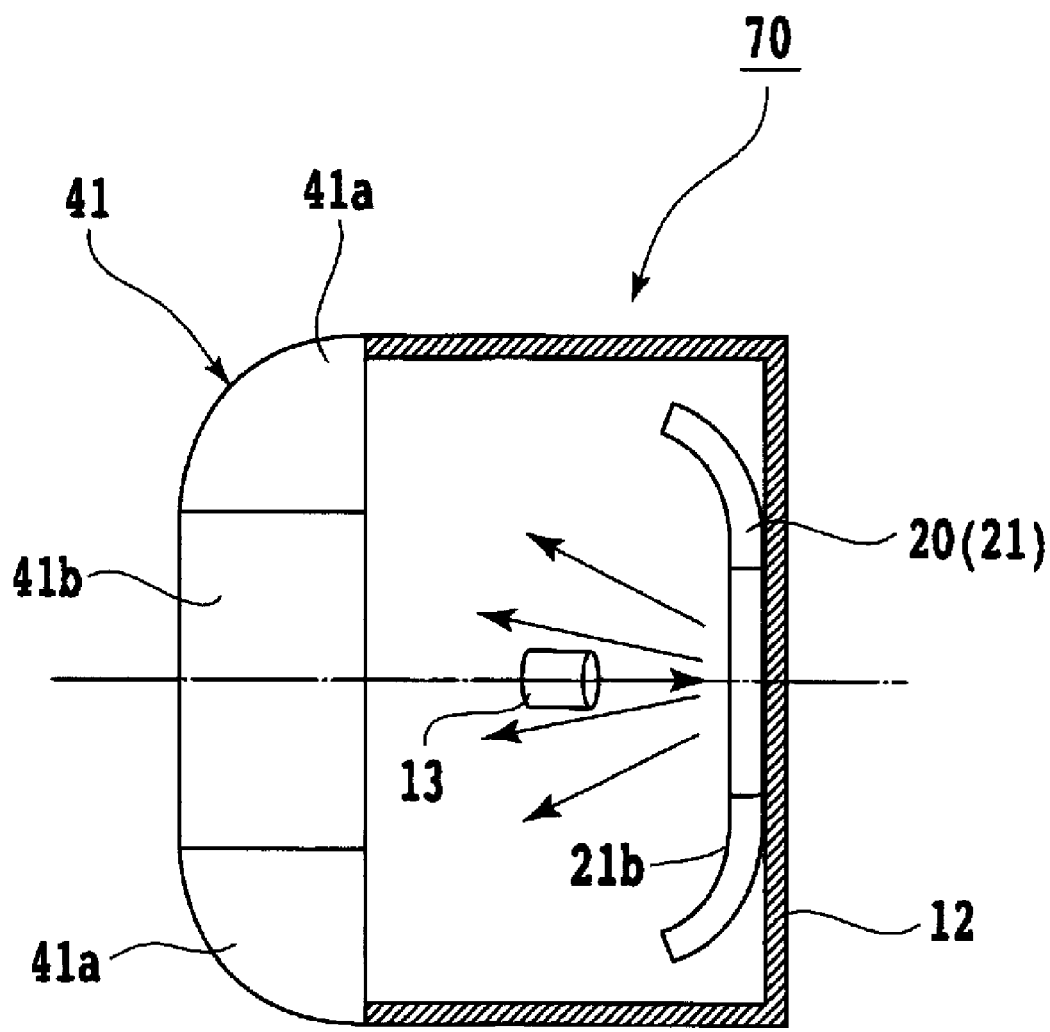
FIG. 34 is a schematic cross-sectional view showing the configuration of a twentieth exemplary embodiment of a vehicle headlamp made in accordance with principles of the presently disclosed subject matter.

FIG. 34 shows the configuration of a twentieth exemplary embodiment of the vehicle headlamp according to the presently disclosed subject matter.

In FIG. 34, the vehicle headlamp 70 can have a similar configuration as that of the vehicle headlamp 40 shown in FIGS. 31A and 31B. The same or similar components will thus be designated with the same reference numerals and the descriptions thereof will be omitted here.

In this vehicle headlamp 70, the light guide plate 21 of the light source unit 20 can be shaped to be curved so as to correct the spherical aberrations of the convex lenses 41a of the projection lens 41 for projecting the light emission surface 21b. More specifically, the light guide plate 21 can be curved at areas corresponding to the right and left convex lenses 41a, in accordance with the directions of the spherical aberrations of the respective convex lenses 41a.

The vehicle headlamp 70 having such configuration can provide the same operation as that of the vehicle headlamp 40 shown in FIGS. 31A and 31B.

In addition, the light guide plate 21 can be shaped to be curved at both side areas so as to correspond to the spherical aberrations of the convex lenses 41a of the projection lens 41. The curvatures of this light guide plate 21 can then correct the spherical aberrations of the convex lenses 41a of the projection lens 41.

Aside from the correction of the spherical aberrations, the present exemplary embodiment also can have the effect that the curved portions of the light source unit 21 can collect the reflected light of the additional light source 13 horizontally, thereby increasing the efficiency of incidence on the projection lens 41.

Figure 35:
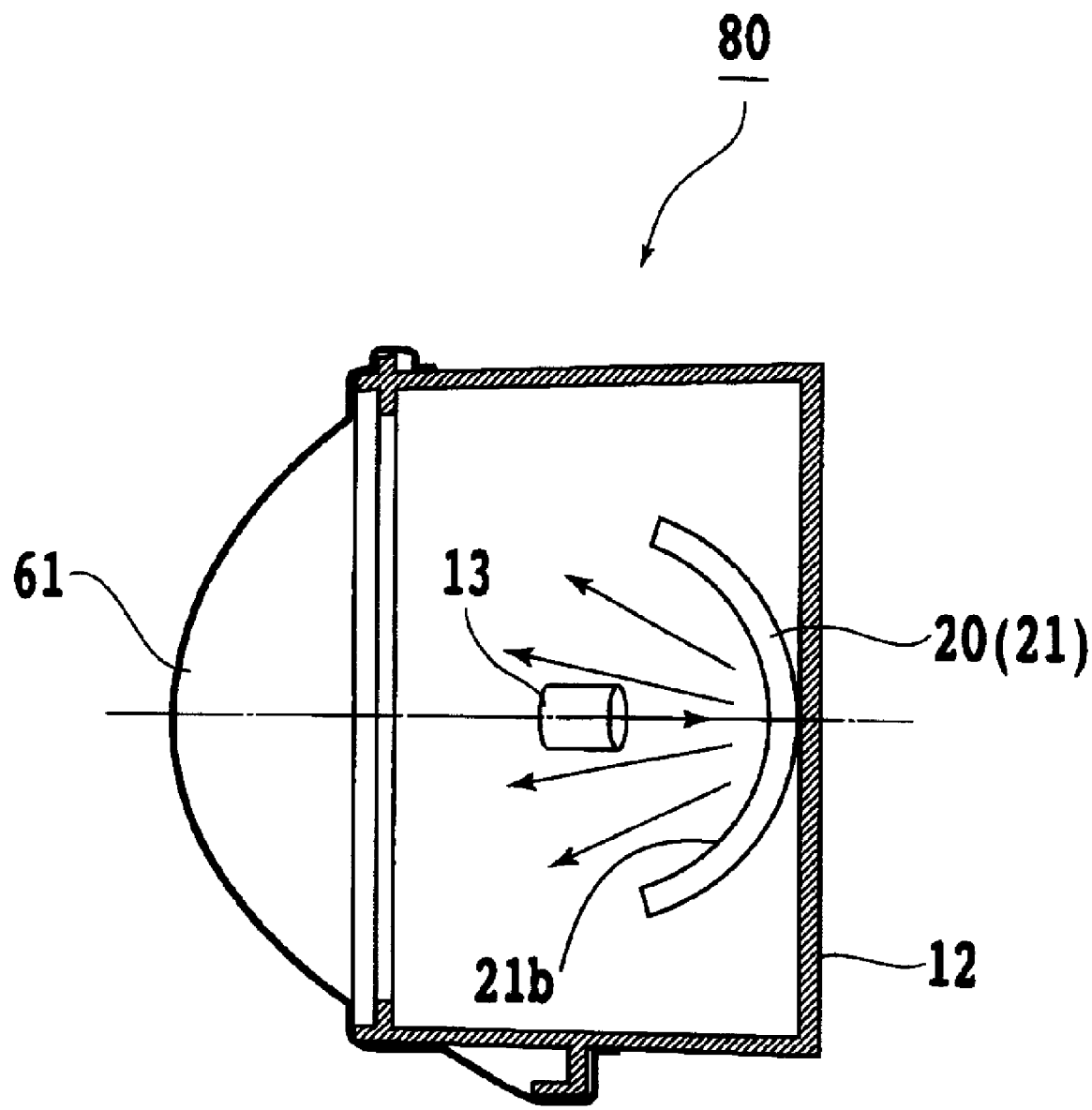
FIG. 35 is a schematic cross-sectional view showing the configuration of a twenty-first exemplary embodiment of a vehicle headlamp made in accordance with principles of the presently disclosed subject matter.

FIG. 35 shows the configuration of a twenty-first exemplary embodiment of a vehicle headlamp according to the disclosed subject matter.

In FIG. 35, the vehicle headlamp 80 can have a similar configuration as that of the vehicle headlamp 60 shown in FIGS. 33A and 33B. The same or similar components will thus be designated with the same reference numerals and the descriptions thereof will be omitted here. In addition to this, some components being the same or similar components as those in the previous exemplary embodiments are omitted in the drawings for facilitating the understanding of the presently subject matter.

When compared with the vehicle headlamp 60 shown in FIGS. 33A and 33B, this vehicle headlamp 80 can differ in that the entire light guide plate 21 can be formed to be curved horizontally. More specifically, the entire light guide plate 21 can be curved in accordance with the direction of the spherical aberration of the projection lens 61 configured to project the image of the light emission surface 21b, so as to correct this spherical aberration.

As in the previous exemplary embodiment, the present exemplary embodiment also can provide the effect that the curved portions of the light source unit 21 can collect the reflected light of the additional light source 13 horizontally, thereby increasing the efficiency of incidence on the projection lens 61, aside from the effect of correcting the spherical aberration.

Figure 36:
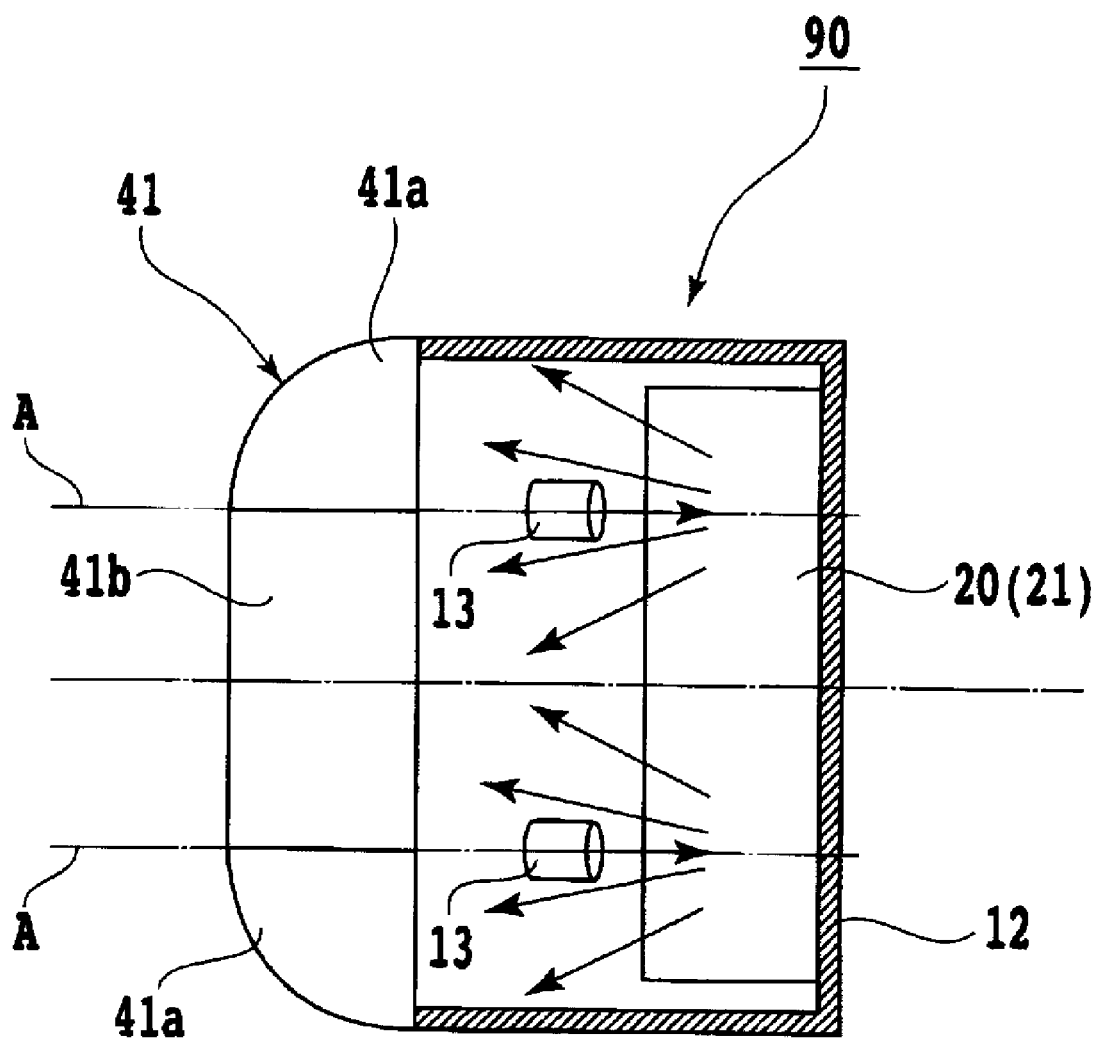
FIG. 36 is a schematic cross-sectional view showing the configuration of a twenty-second exemplary embodiment of a vehicle headlamp made in accordance with principles of the presently disclosed subject matter.

FIG. 36 shows the configuration of a twenty-second exemplary embodiment of a vehicle headlamp according to the presently disclosed subject matter.

In FIG. 36, the vehicle headlamp 90 can have a similar configuration as that of the vehicle headlamp 40 shown in FIGS. 31A and 31B. The same or similar components will thus be designated with the same reference numerals and the descriptions thereof will be omitted here. In addition to this, some components being the same or similar components as those in the previous exemplary embodiments are omitted in the drawings for facilitating the understanding of the presently disclosed subject matter.

The vehicle headlamp 90 can be configured with a difference in that two additional light sources 13 can be arranged on respective planes A that are perpendicular to the axis of the cylindrical lens 41b of the projection lens 41 and pass the borders with the convex lenses 41a.

The vehicle headlamp 90 having such a configuration can provide the same operation as that of the vehicle headlamp 40 shown in FIGS. 31A and 31B.

The additional light sources 13 can be arranged on the optical axes of the respective convex lenses 41a of the projection lens 41. The light beams from the additional light sources 13 can be thus reflected at the surface of the light guide plate 21, and then converged through the corresponding convex lenses 41a. This can produce the effect of focusing the light beams from the respective additional light sources 13 efficiently, thereby increasing the maximum luminous intensity.

Figure 37:
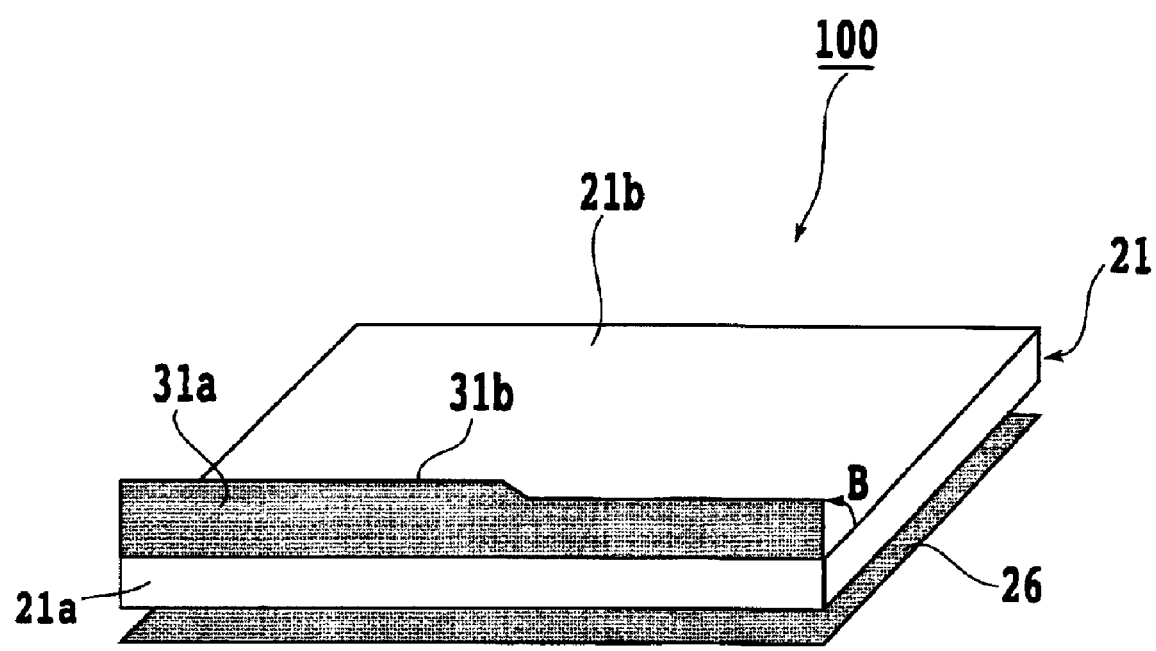
FIG. 37 is a schematic perspective view showing the configuration of the light source unit in a twenty-third exemplary embodiment of a vehicle headlamp made in accordance with principles of the presently disclosed subject matter.

FIG. 37 shows the configuration of the light source unit according to a twenty-third exemplary embodiment of a vehicle headlamp according to the presently disclosed subject matter. In the drawing, some components being the same or similar components as those in the previous exemplary embodiments are omitted in the drawings (for example, LEDs).

In FIG. 37, the vehicle headlamp can have the same configuration as that of the vehicle headlamp shown in FIG. 29, except that a light source unit 100 may be substituted for the light source unit 30.

When compared with the light source unit 30 shown in FIG. 29, the light source unit 100 can differ in that the reflection sheet 31a can be swingably supported on the light guide plate 21 at the side of the light incident surface 21a, so as to be retractable from the surface of the light guide plate 21 as shown by the arrow B.

This reflection sheet 31a can be configured so that it is retracted to the shown retracted position by a not-shown drive mechanism for the DRL function.

With the vehicle headlamp of such a configuration, the reflection sheet 31a can be situated in contact with the surface 21b of the light guide plate 21 when the light source unit 100 is in ordinary use, i.e., as a low beam or the like. This can provide the same operation as that of the light guide plate 30 shown in FIG. 29.

When used as a DRL, on the other hand, the reflection sheet 31a can be retracted from the surface of the light guide plate 21 to the retracted position shown in FIG. 37. Consequently, the light incident on the surface of the light guide plate 21 from the additional light source 13 can enter the light guide plate 21 through the entire surface. The light can be then reflected at the reflection film 26 which can be arranged on the rear surface of the light guide plate 21, and can emerge from the surface of the light guide plate 21 again.

The light reflected at the surface of the light guide plate 21 or emitted from inside the same can be projected forward in the direction of light illumination through the projection lens, thereby forming a DRL distribution pattern.

This can eliminate the need for the reflection at the reflection sheet 31a or at the projection-lens side of the retainer casing in the foregoing light source unit 30.

The foregoing exemplary embodiments have dealt with the cases where the vehicle headlamp has a light distribution characteristic intended for a low beam of a right-hand drive car. That is, the cutoff pattern may be configured not to project light to above the horizontal level on the left side of the vehicle as viewed forward, so as not to cast glare to oncoming cars. The present is not limited thereto, however. The vehicle headlamps can also provide the same effects for left-hand drive cars if their cutoff pattern is horizontally inverted.

The foregoing exemplary embodiments have also dealt with the cases where a plurality of point sources such as LEDs 22 can be used as the light sources. The presently disclosed subject matter is not limited thereto, however. Other types of point sources such as semiconductor laser devices can also be used. Line sources can also be used as far as the light guide plate 21 can internally define the predetermined brightness distribution on the light emission surface 21b by means of the brightness control element 24.

The vehicle lamp according to the presently disclosed subject matter is not limited to a front headlamp, but can also be applied to any kind of vehicle light including a fog lamp, a driving lamp, and other auxiliary lamps or headlamps.

According to the presently disclosed subject matter, there can be provided a vehicle headlamp which can produce two or more light distribution patterns for illumination, such as "headlamp+DRL" and "fog lamp+DRL."

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A vehicle lamp comprising:
 a light source unit including,
  a light source including at least one of a point light source and a line light source,
  a light guide plate transparent to visible light and including,
   a light emission surface,
   a first end face facing the light source,
   a second end face opposite to the first end face,
   a rear surface, and
   a prism array adjacent the rear surface, extending with a serrated cross section from the first end face of the light guide plate to the second end face, and extending in a direction parallel with the first end face and including a plurality of prism surfaces, with each of the prism surfaces obliquely formed such that when light enters the light guide plate from the first end face and impinges on the prism surfaces, the light is reflected into small angles of incidence to the light emission surface; and
 a projection lens configured to focus light emitted from the light source unit and to project the same forward in a direction of light illumination, the projection lens including a focus located substantially on the light emission surface, wherein the projection lens is configured as a cylindrical lens having a longitudinal axis extending in a lateral direction, and the projection lens further includes a pair of convex lenses and the cylindrical lens extends therebetween.

2. The vehicle lamp according to claim 1, wherein each of the prism surfaces of the prism array and the light emission surface of the light guide plate form an angle of 0 degrees to 45 degrees.

3. The vehicle lamp according to claim 2, wherein the light emission surface of the light guide plate includes a cutoff portion configured to provide a predetermined cutoff pattern.

4. The vehicle lamp according to claim 3, wherein the first end face of the light guide plate is adjacent the cutoff portion.

5. The vehicle lamp according to claim 2, further comprising:
a light guide part adjacent an edge of the light guide plate and on a light source side of the light guide plate, the light guide part configured to reflect light from the light guide plate.

6. The vehicle lamp according to claim 5, further comprising:
a reflection sheet configured to reflect light from the light guide plate back into the light guide plate and having a shape configured to provide a cutoff pattern, the reflection sheet located adjacent an edge of the light guide plate adjacent the light source.

7. The vehicle lamp according to claim 6, wherein the light guide plate is configured to correct a spherical aberration of the projection lens.

8. The vehicle lamp according to claim 7, wherein the light guide plate is curved.

9. The vehicle lamp according to claim 8, wherein the light guide plate is disposed obliquely with respect to an optical axis of the projection lens by a predetermined angle in order to maximize the light entering the projection lens.

10. The vehicle lamp according to claim 8, further comprising:
an optical sheet configured so that a direction of a maximum luminous intensity of light emitted from the light guide plate coincides with a direction of an optical axis of the projection lens, with the optical sheet being disposed near the light emission surface of the light guide plate.

11. The vehicle lamp according to claim 1, further comprising:
a light guide part adjacent an edge of the light guide plate and on a light source side of the light guide plate, the light guide part configured to reflect light from the light guide plate.

12. The vehicle lamp according to claim 11, further comprising:
a reflection sheet configured to reflect light from the light guide plate back into the light guide plate and having a shape configured to provide a cutoff pattern, the reflection sheet located adjacent an edge of the light guide plate adjacent the light source.

13. The vehicle lamp according to claim 1, wherein the light guide plate is configured to correct a spherical aberration of the projection lens.

14. The vehicle lamp according to claim 13, wherein the light guide plate is curved.

15. The vehicle lamp according to claim 1, wherein the light guide plate is disposed obliquely with respect to an optical axis of the projection lens by a predetermined angle in order to maximize light entering the projection lens.

16. The vehicle lamp according to claim 1, wherein the lamp is configured as a headlamp for a vehicle.

17. A vehicle lamp comprising:
a light source unit including,
a light source including at least one of a point light source and a line light source,
a light guide plate transparent to visible light and including,
a light emission surface,
a first end face facing the light source,
a second end face opposite to the first end face,
a rear surface, and
a prism array adjacent the rear surface, extending with a serrated cross section from the first end face of the light guide plate to the second end face, and extending in a direction parallel with the first end face and including a plurality of prism surfaces, with each of the prism surfaces obliquely formed such that when light enters the light guide plate from the first end face and impinges on the prism surfaces, the light is reflected into small angles of incidence to the light emission surface; and
a projection lens configured to focus light emitted from the light source unit and to project the same forward in a direction of light illumination, the projection lens including a focus located substantially on the light emission surface, wherein the projection lens has at least two optical axes parallel with each other and includes a surface defined by a solid of revolution centered about a respective optical axis.

18. The vehicle lamp according to claim 17, wherein the light source unit includes a plurality of the light sources, and at least one of the light sources is disposed on a respective one of the optical axes of the projection lens.

19. The vehicle lamp according to claim 17, wherein the light guide plate includes a plurality of light guide plate parts divided by respective ones of the optical axes of the projection lens, each of the light guide plate parts being formed in the shape of a trapezoid having a first side that is wider than a second side wherein the first side lies closer to the light emission surface than to the light source.

20. The vehicle lamp according to claim 19, wherein lateral sides of each light guide plate part includes at least one of a substantially parabolic shape and an elliptic shape.

21. A vehicle lamp comprising:
a light source unit including,
a light source including at least one of a point light source and a line light source,
a light guide plate transparent to visible light and including,
a light emission surface,
a first end face facing the light source,
a second end face opposite to the first end face,
a rear surface, and
a prism array adjacent the rear surface, extending with a serrated cross section from the first end face of the light guide plate to the second end face, and extending in a direction parallel with the first end face and including a plurality of prism surfaces, with each of the prism surfaces obliquely formed such that when light enters the light guide plate from the first end face and impinges on the prism surfaces, the light is reflected into small angles of incidence to the light emission surface; and
a projection lens configured to focus light emitted from the light source unit and to project the same forward in a direction of light illumination, the projection lens including a focus located substantially on the light emission surface, wherein the light emission surface of the light guide plate includes a cutoff portion configured to provide a predetermined cutoff pattern.

22. The vehicle lamp according to claim 21, wherein the first end face of the light guide plate is adjacent the cutoff portion.

23. A vehicle lamp comprising:
a light source unit including,
a light source including at least one of a point light source and a line light source,
a light guide plate transparent to visible light and including,
a light emission surface,
a first end face facing the light source, a second end face opposite to the first end face,
a rear surface, and
a prism array adjacent the rear surface, extending with a serrated cross section from the first end face of the light guide plate to the second end face, and extending in a direction parallel with the first end face and including a plurality of prism surfaces, with each of the prism surfaces obliquely formed such that when light enters the light guide plate from the first end face and impinges on the prism surfaces, the light is reflected into small angles of incidence to the light emission surface;
a projection lens configured to focus light emitted from the light source unit and to project the same forward in a direction of light illumination, the projection lens including a focus located substantially on the light emission surface; and
an optical sheet configured so that a direction of a maximum luminous intensity of light emitted from the light guide plate coincides with a direction of an optical axis of the projection lens, with the optical sheet being disposed near the light emission surface of the light guide plate.

24. A vehicle lamp, comprising:
a light source unit configured to provide a predetermined light distribution pattern and including,
a light guide plate transparent to visible light and including a light emission surface, a rear surface, and an end face,
at least one of a point light source and a line light source adjacent the end face of the light guide plate, and
a brightness control element located adjacent at least one of the light emission surface and rear surface of the light guide plate;
a projection lens configured to focus light emitted from the light emission surface of the light guide plate and to project the light forward in a direction of light illumination; and
at least one additional light source adjacent one of the light source unit and the projection lens, wherein light from the additional light source is reflected at the light source unit and projected forward in the direction of light illumination through the projection lens, thereby forming a second light distribution pattern different from the predetermined light distribution pattern, wherein
the light source unit further comprises a projection-lens-side surface facing the projection lens and the light from the additional light source produces a day-time running light distribution pattern on the projection-lens-side surface of the light source unit,
the projection lens has an optical axis and the light source unit is disposed obliquely by a predetermined angle with respect to the optical axis so that a direction of a maximum luminous intensity of the light emitted from the light guide plate coincides with the direction of the optical axis of the projection lens,
the projection lens comprises a pair of convex lenses and a cylindrical lens extending therebetween, the cylindrical lens having a longitudinal axis extending in a lateral direction,
the additional light source is disposed on a plane perpendicular to the longitudinal axis of the cylindrical lens, and the plane passes through a border between the cylindrical lens and at least one of the convex lenses.

25. The vehicle lamp according to claim 24, wherein the light emission surface of the light guide plate has a shape configured to produce a cutoff pattern.

26. The vehicle lamp according to claim 24, wherein the light guide plate further includes a plurality of edges adjacent the light source and a light-source-side surface adjacent to the plurality of edges; and
the lamp further comprising:
a light guide part configured to reduce brightness variations of light from the light source, the light guide part located adjacent the plurality of edges of the light guide plate; and
at least one of a reflection sheet and a light shielding sheet configured to reflect light from the surface of the light guide plate back into the light guide plate, the sheet having a shape corresponding to a desired cutoff pattern and located adjacent a portion of the light-source-side surface adjacent to at least one of the plurality of edges, wherein
at least one of the reflection sheet the light shielding sheet, and a casing for retaining the at least one of the reflection sheet and the light shielding sheet has a reflecting surface on a side adjacent the projection lens, the reflecting surface configured to reflect the light from the additional light source toward the projection lens.

27. The vehicle lamp according to claim 24, wherein the light guide plate further includes a plurality of edges adjacent the light source and a light-side-source surface adjacent the plurality of edges; and
the lamp further comprising:
a light guide part configured to reduce brightness variations of light from the light source, the light guide part located adjacent the plurality of edges of the light guide plate; and
at least one of a reflection sheet and a light shielding sheet configured to reflect light from the surface of the light guide plate back into the light guide plate, the sheet having a shape corresponding to a cutoff pattern and located adjacent at least one of the plurality of edges adjacent the light source, the at least one of the reflection sheet and the light shielding sheet retractably mounted to the light emission surface of the light guide plate.

28. The vehicle lamp according to claim 27, wherein the light guide plate is formed with a curve corresponding to an aberration of the projection lens.

29. The vehicle lamp according to claim 24, wherein the light guide plate is formed with a curve corresponding to an aberration of the projection lens.

30. The vehicle lamp according to claim 24, wherein the light guide plate comprises a wedge-shaped cross-section.

31. The vehicle lamp according to claim 24, wherein the lamp is configured as a headlamp for a vehicle.

32. A vehicle lamp, comprising:
a light source unit configured to provide a predetermined light distribution pattern and including,
a light guide plate transparent to visible light and including a light emission surface, a rear surface, and an end face,
at least one of a point light source and a line light source adjacent the end face of the light guide plate, and
a brightness control element located adjacent at least one of the light emission surface and rear surface of the light guide plate;

a projection lens configured to focus light emitted from the light emission surface of the light guide plate and to project the light forward in a direction of light illumination;

at least one additional light source adjacent one of the light source unit and the projection lens, wherein light from the additional light source is reflected at the light source unit and projected forward in the direction of light illumination through the projection lens, thereby forming a second light distribution pattern different from the predetermined light distribution pattern, wherein the projection lens comprises a pair of convex lenses and a cylindrical lens extending therebetween, the cylindrical lens having a longitudinal axis extending in a lateral direction; and the additional light source is disposed on a plane perpendicular to the longitudinal axis of the cylindrical lens, and the plane passes through a border between the cylindrical lens and at least one of the convex lenses.

33. A vehicle lamp, comprising:
a light source unit configured to provide a predetermined light distribution pattern and including,
    a light guide plate transparent to visible light and including a light emission surface, a rear surface, and an end face,
    at least one of a point light source and a line light source adjacent the end face of the light guide plate, and
    a brightness control element located adjacent at least one of the light emission surface and rear surface of the light guide plate;
a projection lens configured to focus light emitted from the light emission surface of the light guide plate and to project the light forward in a direction of light illumination; and
at least one additional light source adjacent one of the light source unit and the projection lens, wherein light from the additional light source is reflected at the light source unit and projected forward in the direction of light illumination through the projection lens, thereby forming a second light distribution pattern different from the predetermined light distribution pattern, wherein the light emission surface of the light guide plate has a shape configured to produce a cutoff pattern.

34. A vehicle lamp, comprising:
a light source unit configured to provide a predetermined light distribution pattern and including,
    a light guide plate transparent to visible light and including a light emission surface, a rear surface, and an end face,
    at least one of a point light source and a line light source adjacent the end face of the light guide plate, and
    a brightness control element located adjacent at least one of the light emission surface and rear surface of the light guide plate;
a projection lens configured to focus light emitted from the light emission surface of the light guide plate and to project the light forward in a direction of light illumination;
at least one additional light source adjacent one of the light source unit and the projection lens, wherein light from the additional light source is reflected at the light source unit and projected forward in the direction of light illumination through the projection lens, thereby forming a second light distribution pattern different from the predetermined light distribution pattern, wherein the light guide plate further includes a plurality of edges adjacent the light source and a light-source-side surface adjacent to the plurality of edges; and
the lamp further comprising:
    a light guide part configured to reduce brightness variations of light from the light source, the light guide part located adjacent the plurality of edges of the light guide plate; and
    at least one of a reflection sheet and a light shielding sheet configured to reflect light from the surface of the light guide plate back into the light guide plate, the sheet having a shape corresponding to a desired cutoff pattern and adjacent a portion of the light-source-side surface adjacent to at least one of the plurality of edges, wherein
    at least one of the reflection sheet and the light shielding sheet, and a casing for retaining the at least one of the reflection sheet and the light shielding sheet has a reflecting surface on a side adjacent the projection lens, the reflecting surface configured to reflect light from the additional light source toward the projection lens.

35. A vehicle lamp, comprising:
a light source unit configured to provide a predetermined light distribution pattern and including,
    a light guide plate transparent to visible light and including a light emission surface, a rear surface, and an end face,
    at least one of a point light source and a line light source adjacent the end face of the light guide plate, and
    a brightness control element located adjacent at least one of the light emission surface and rear surface of the light guide plate;
a projection lens configured to focus light emitted from the light emission surface of the light guide plate and to project the light forward in a direction of light illumination;
at least one additional light source adjacent one of the light source unit and the projection lens, wherein light from the additional light source is reflected at the light source unit and projected forward in the direction of light illumination through the projection lens, thereby forming a second light distribution pattern different from the predetermined light distribution pattern, wherein the light guide plate further includes a plurality of edges adjacent the light source and a light-side-source surface adjacent the plurality of edges; and
the lamp further comprising:
    a light guide part configured to reduce brightness variations of light from the light source, the light guide part adjacent the plurality of edges of the light guide plate; and
    at least one of a reflection sheet and a light shielding sheet configured to reflect light from the surface of the light guide plate back into the light guide plate, the sheet having a shape corresponding to a cutoff pattern and adjacent at least one of the plurality of edges adjacent the light source, the at least one of the reflection sheet and the light shielding sheet retractably mounted to the light emission surface of the light guide plate.

* * * * *